US008069634B2

(12) United States Patent
Livingston et al.

(10) Patent No.: US 8,069,634 B2
(45) Date of Patent: Dec. 6, 2011

(54) LIFTING SYSTEM AND APPARATUS FOR CONSTRUCTING AND ENCLOSING WIND TURBINE TOWERS

(75) Inventors: Tracy Livingston, Heber, UT (US); James Goldhardt, Heber City, UT (US); Terry Schrader, Southlake, TX (US); James Lott, Newburgh, IN (US); David Oliphant, Heber City, UT (US); Harry Daugherty, Whitehouse, OH (US)

(73) Assignee: General Electric Company, Schenectady, NY (US)

( * ) Notice: Subject to any disclaimer, the term of this patent is extended or adjusted under 35 U.S.C. 154(b) by 359 days.

(21) Appl. No.: 11/906,771

(22) Filed: Oct. 2, 2007

(65) Prior Publication Data

US 2008/0078128 A1    Apr. 3, 2008

Related U.S. Application Data

(60) Provisional application No. 60/848,725, filed on Oct. 2, 2006, provisional application No. 60/848,726, filed on Oct. 2, 2006, provisional application No. 60/932,731, filed on Jun. 1, 2007.

(51) Int. Cl.
*E04B 1/00*    (2006.01)
(52) U.S. Cl. .............. 52/745.17; 52/40; 52/120; 52/296; 52/848
(58) Field of Classification Search ........... 52/40, 169.3, 52/745.13, 745.17, 296, 848, 115, 116, 120; 254/4 R; 29/281.1
See application file for complete search history.

(56) References Cited

U.S. PATENT DOCUMENTS

| | | | |
|---|---|---|---|
| 877,587 | A | 1/1908 | Noyes |
| 889,395 | A | 6/1908 | Noyes |
| RE12,842 | E | 8/1908 | Noyes |
| 1,506,984 | A | 9/1924 | Marshall |

(Continued)

FOREIGN PATENT DOCUMENTS

DE    194961    2/1908

(Continued)

OTHER PUBLICATIONS

Argyriadis et al; "Determination of Fatigue Loading on a Wind Turbine with Oil Damping Device;" Germanischer Lloy AG, 2004.

*Primary Examiner* — William Gilbert
(74) *Attorney, Agent, or Firm* — Dority & Manning, P.A.

(57) ABSTRACT

An apparatus and method for mounting a wind turbine and blade assembly on the upper end of a wind turbine tower. In one aspect the apparatus generally includes a ginpole that is used to assemble the tower and a lifting frame or truss that is removably secured to a top bay assembly of the tower using the ginpole. The lifting frame or truss is operated using either cables or hydraulic rams and extends fore of the tower when the frame or truss is in a first position and generally above the tower when in a second position. When in the first position, a wind turbine or blade assembly can be hoisted to the top of the tower. The wind turbine or blade assembly is then moved into position for mounting to the tower as the frame or truss is pivoted to a second position. When the turbine and blade assembly are secured to the tower, the frame or truss is disconnected from the tower and lowered to the ground followed by the ginpole being lowered to the ground.

49 Claims, 47 Drawing Sheets

U.S. PATENT DOCUMENTS

| | | |
|---|---|---|
| 2,014,784 A | 9/1935 | Schuler |
| 2,135,631 A * | 11/1938 | Amesbury ..................... 212/176 |
| 2,145,232 A | 1/1939 | Bauer |
| 2,246,151 A | 6/1941 | Vrooman |
| 2,756,952 A | 7/1956 | Gazley |
| 2,945,231 A | 7/1960 | Scheldorf |
| 2,950,576 A | 8/1960 | Rubenstein |
| 3,079,277 A | 2/1963 | Painter |
| 3,100,555 A | 8/1963 | Ashton |
| 3,119,471 A | 1/1964 | Turner |
| 3,219,214 A | 11/1965 | Baer |
| 3,276,762 A | 10/1966 | Thomas |
| 3,277,614 A | 10/1966 | Marie |
| 3,371,458 A | 3/1968 | Sturgill |
| 3,456,972 A | 7/1969 | Drotar |
| 3,485,005 A | 12/1969 | Kutchai |
| 3,561,711 A | 2/1971 | Dodge |
| 3,574,982 A | 4/1971 | Wakonig |
| 3,618,928 A | 11/1971 | Taylor |
| 3,634,989 A | 1/1972 | Rogers |
| 3,650,078 A | 3/1972 | Jennings |
| 3,650,081 A | 3/1972 | McCracken |
| 3,659,490 A | 5/1972 | Buck |
| 3,710,674 A | 1/1973 | Tabor |
| 3,742,662 A | 7/1973 | Ballou |
| 3,763,617 A | 10/1973 | Nell |
| 3,812,771 A | 5/1974 | Yokoyama et al. |
| 3,892,398 A | 7/1975 | Marsh |
| 3,939,988 A * | 2/1976 | Wellman ..................... 212/297 |
| 4,039,050 A | 8/1977 | Bowling et al. |
| 4,226,554 A | 10/1980 | Vandiver et al. |
| 4,254,847 A | 3/1981 | Kamman et al. |
| 4,261,441 A | 4/1981 | Wood |
| 4,272,929 A * | 6/1981 | Hanson ..................... 52/40 |
| 4,278,726 A | 7/1981 | Wieme |
| 4,297,076 A | 10/1981 | Donham et al. |
| 4,311,434 A | 1/1982 | Abe |
| 4,312,162 A | 1/1982 | Medney |
| 4,320,602 A | 3/1982 | Richardson |
| 4,403,916 A | 9/1983 | Skelskey |
| 4,406,558 A | 9/1983 | Kochendorfer et al. |
| 4,411,114 A | 10/1983 | Wurtinger et al. |
| 4,420,692 A | 12/1983 | Kos et al. |
| 4,435,647 A | 3/1984 | Harner et al. |
| 4,457,500 A | 7/1984 | Drachenberg et al. |
| 4,515,525 A | 5/1985 | Doman |
| 4,565,929 A | 1/1986 | Baskin et al. |
| 4,674,954 A | 6/1987 | Kenfield |
| 4,694,630 A | 9/1987 | McGinnis |
| 4,743,141 A | 5/1988 | Simensen et al. |
| 4,783,937 A | 11/1988 | Sato |
| 4,807,840 A | 2/1989 | Baker et al. |
| 4,856,662 A * | 8/1989 | Marvin et al. ............... 212/176 |
| 4,921,224 A | 5/1990 | Fukumura et al. |
| 4,987,711 A | 1/1991 | Noji et al. |
| 5,070,663 A | 12/1991 | Sakai et al. |
| 5,203,435 A | 4/1993 | Dolgin |
| 5,213,470 A | 5/1993 | Lundquist |
| 5,219,051 A | 6/1993 | Davis |
| 5,239,789 A | 8/1993 | Uno et al. |
| 5,327,700 A | 7/1994 | Sorenson et al. |
| 5,347,771 A | 9/1994 | Kobori et al. |
| 5,775,049 A | 7/1998 | Fricke |
| 5,820,348 A | 10/1998 | Fricke |
| 5,832,688 A | 11/1998 | Crissey et al. |
| 5,905,771 A | 5/1999 | Erbes et al. |
| 5,946,866 A | 9/1999 | Weglewski et al. |
| 5,956,915 A | 9/1999 | Piper et al. |
| 6,048,426 A | 4/2000 | Pratt |
| 6,287,664 B1 | 9/2001 | Pratt |
| 6,354,576 B1 | 3/2002 | Jacobs et al. |
| 6,397,528 B1 | 6/2002 | Rahimian |
| 6,408,587 B2 | 6/2002 | Cronin et al. |
| 6,438,905 B2 | 8/2002 | Constantinou |
| 6,453,962 B1 | 9/2002 | Pratt |
| 6,463,709 B2 | 10/2002 | Meguro et al. |
| 6,467,521 B1 | 10/2002 | Pratt |
| 6,522,025 B2 | 2/2003 | Willis et al. |
| 6,578,339 B1 | 6/2003 | McGinnis |
| 6,614,125 B2 | 9/2003 | Willis et al. |
| 6,626,642 B1 | 9/2003 | Veldkamp et al. |
| 6,672,837 B1 | 1/2004 | Veldkamp et al. |
| 6,695,588 B1 | 2/2004 | Nielsen |
| 6,701,680 B2 | 3/2004 | Fanucci et al. |
| 6,745,539 B1 | 6/2004 | Heim |
| 6,782,667 B2 | 8/2004 | Henderson |
| 6,784,566 B2 | 8/2004 | Thomas |
| 6,789,309 B2 | 9/2004 | Kondo |
| 6,837,010 B2 | 1/2005 | Powell et al. |
| 6,840,016 B1 | 1/2005 | Mualla |
| 7,015,872 B1 | 3/2006 | Little |
| 7,040,583 B1 | 5/2006 | Holland et al. |
| 7,062,883 B1 | 6/2006 | Langholz et al. |
| 7,075,189 B2 | 7/2006 | Heronemus et al. |
| 7,220,104 B2 | 5/2007 | Zheng et al. |
| 2002/0084142 A1 | 7/2002 | Brennan et al. |
| 2003/0071468 A1 | 4/2003 | Platt |
| 2003/0183594 A1 * | 10/2003 | Torres Martinez ........... 212/196 |
| 2005/0186076 A1 | 8/2005 | Hessel |
| 2006/0090571 A1 | 5/2006 | Krampitz et al. |
| 2006/0120809 A1 * | 6/2006 | Ingram et al. .............. 405/195.1 |
| 2006/0147306 A1 | 7/2006 | Zeng et al. |
| 2006/0213145 A1 * | 9/2006 | Haller ....................... 52/651.01 |
| 2007/0243063 A1 | 10/2007 | Schellstede |

FOREIGN PATENT DOCUMENTS

| | | |
|---|---|---|
| DE | 9414643 U1 | 11/1994 |
| DE | 19647515 | 11/1996 |
| DE | 19741988 | 9/1997 |
| EP | 1 284 365 | 7/2002 |
| EP | 1 677 006 | 12/2005 |
| FR | 2500555 | 8/1982 |
| GB | 1008782 | 11/1965 |
| JP | 3-539 134078 | 1/1991 |
| JP | 10205430 | 8/1998 |
| SU | 1421959 | 9/1988 |
| WO | 96/10130 | 4/1996 |
| WO | 9721621 | 6/1997 |
| WO | WO 0077394 | 12/2000 |
| WO | WO 2006062390 | 6/2006 |

* cited by examiner

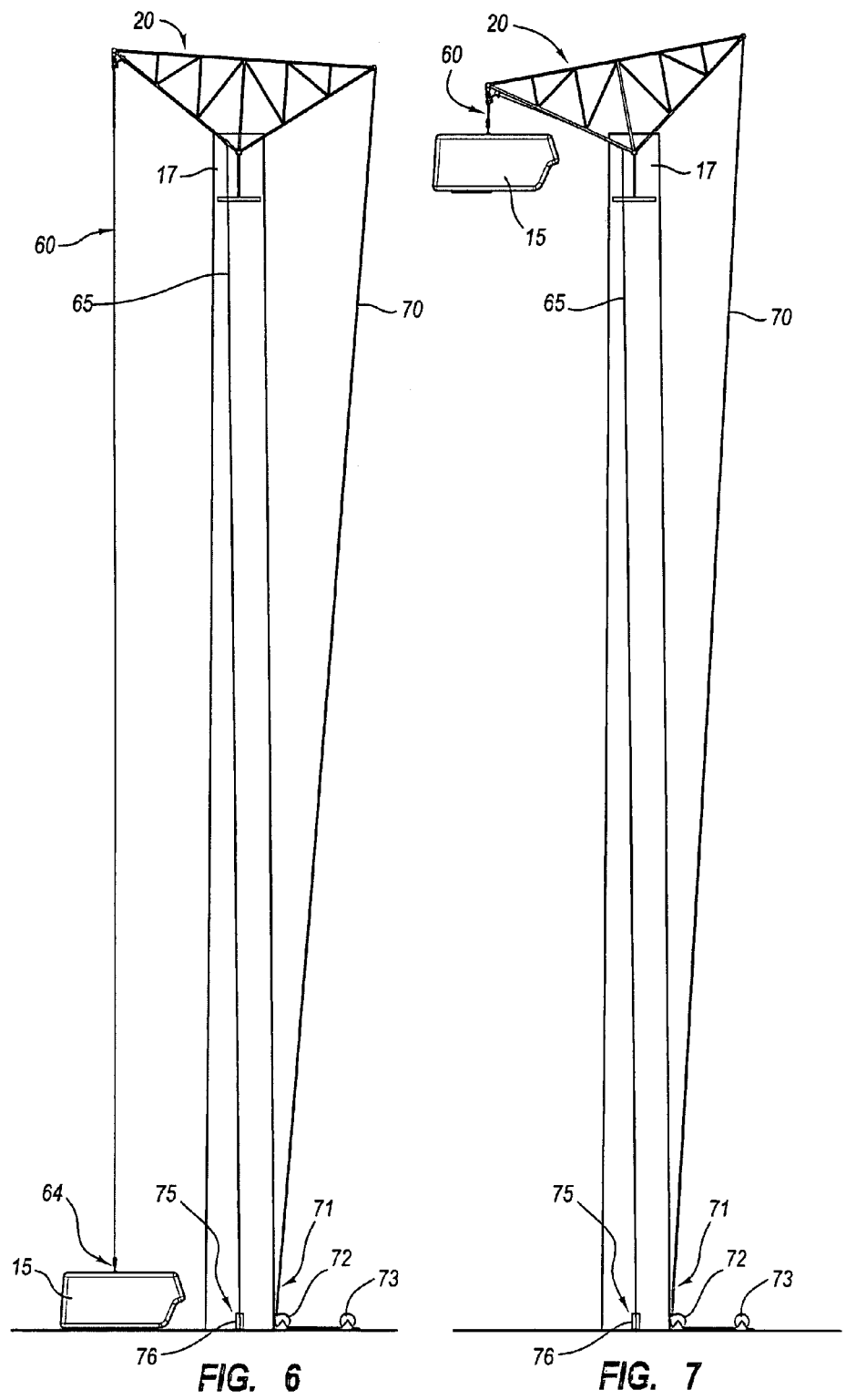

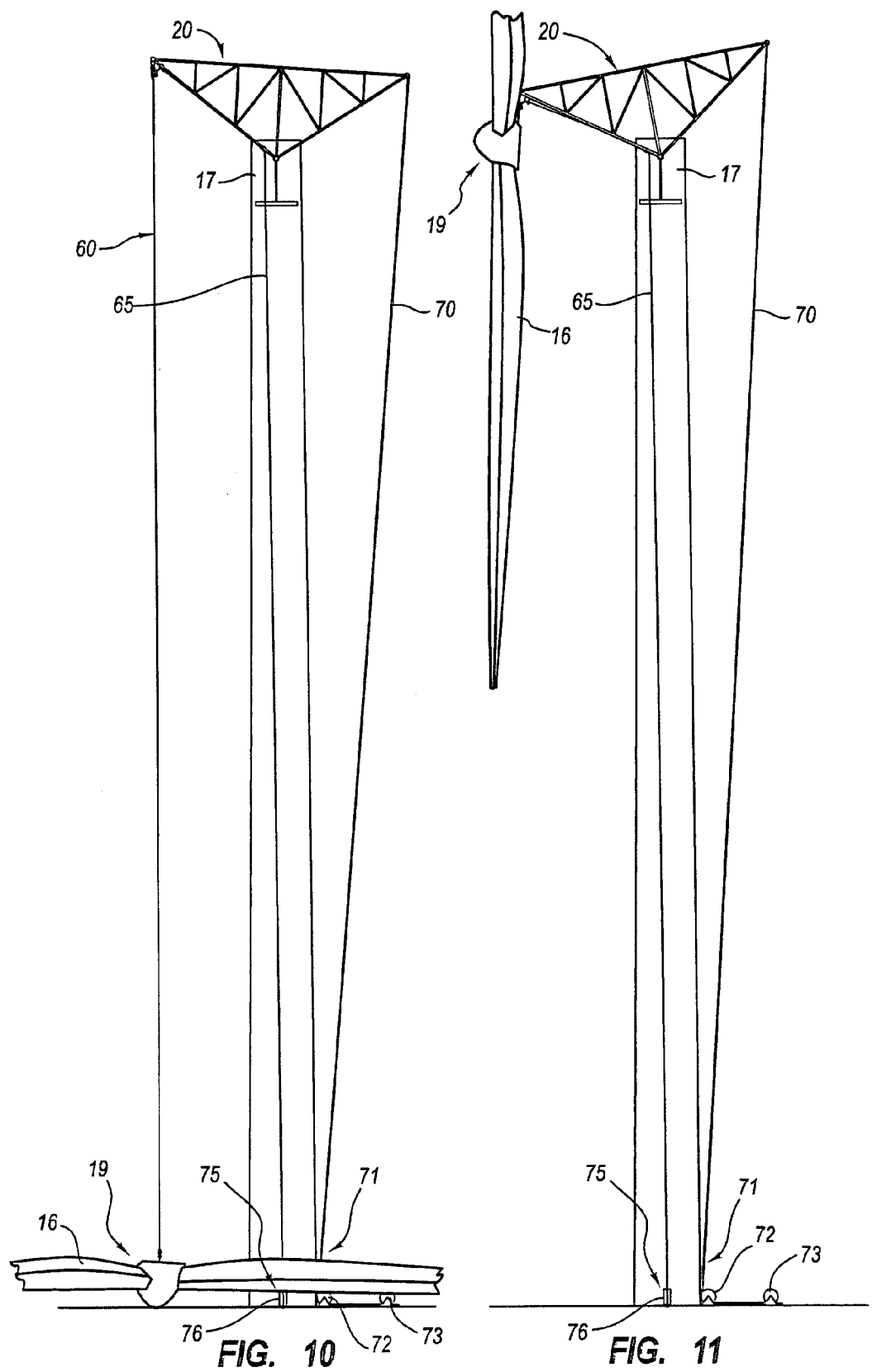

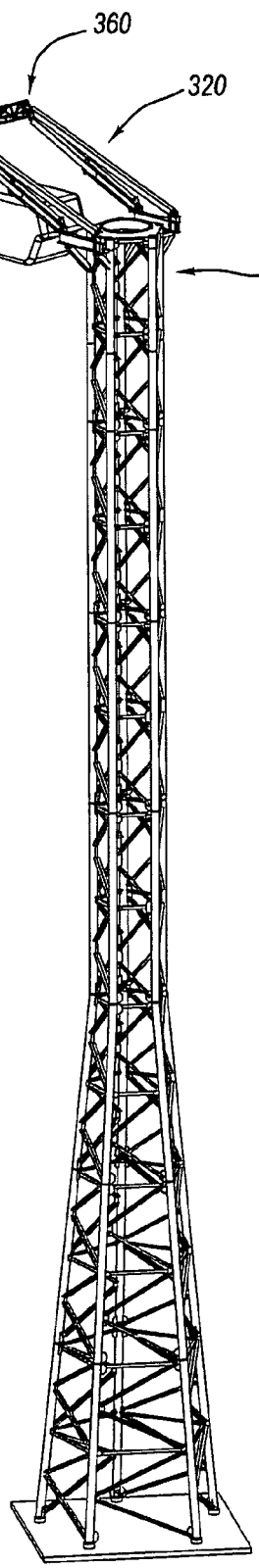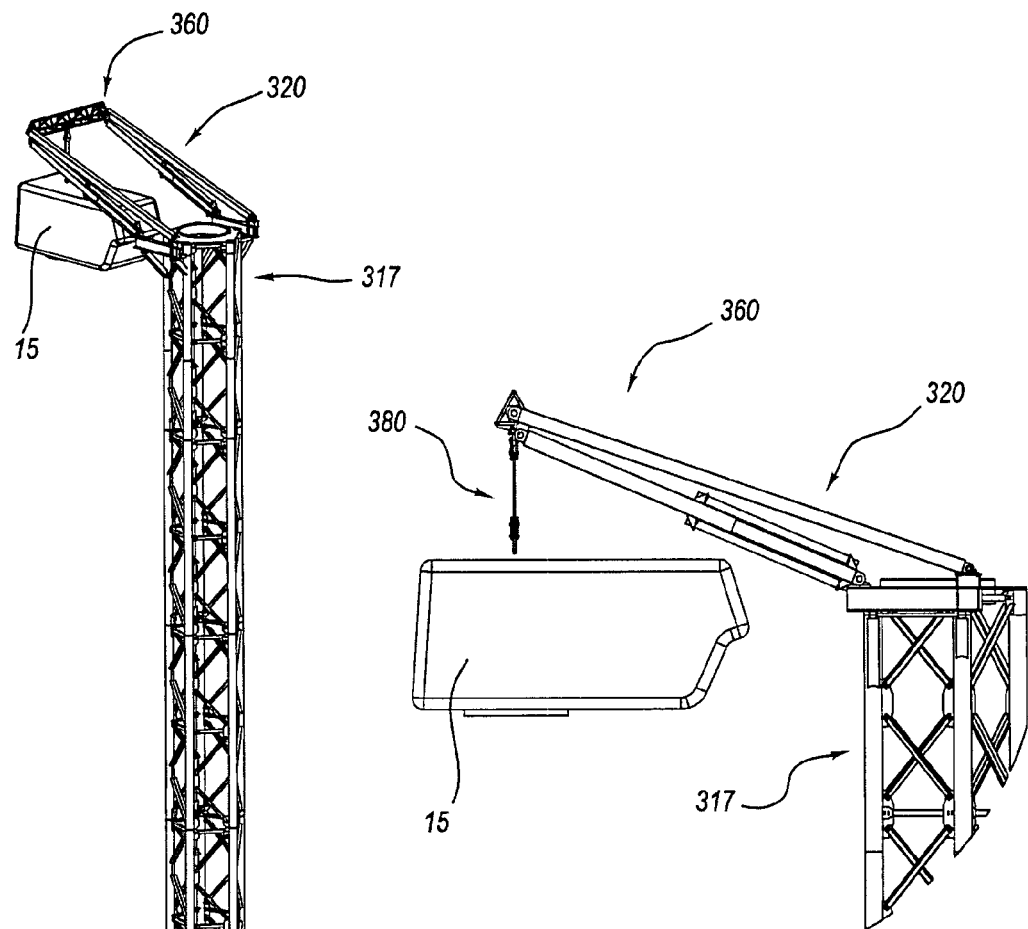
FIG. 18
FIG. 19

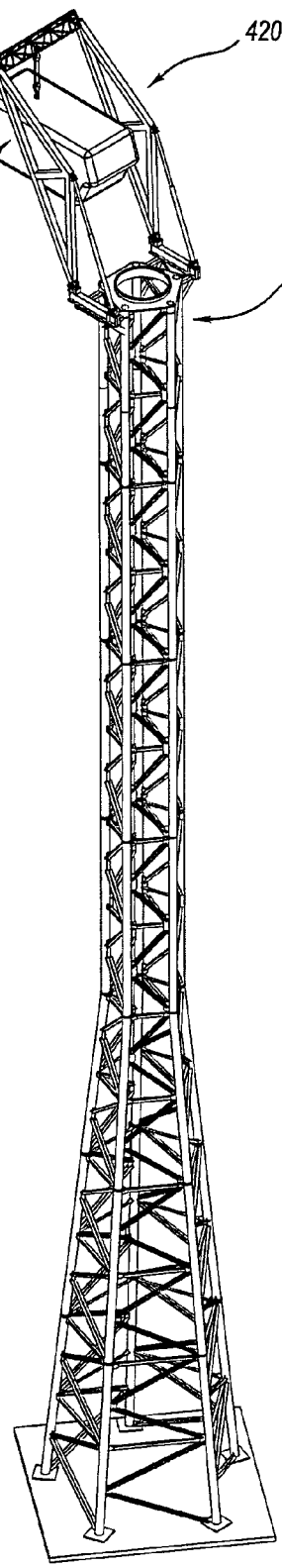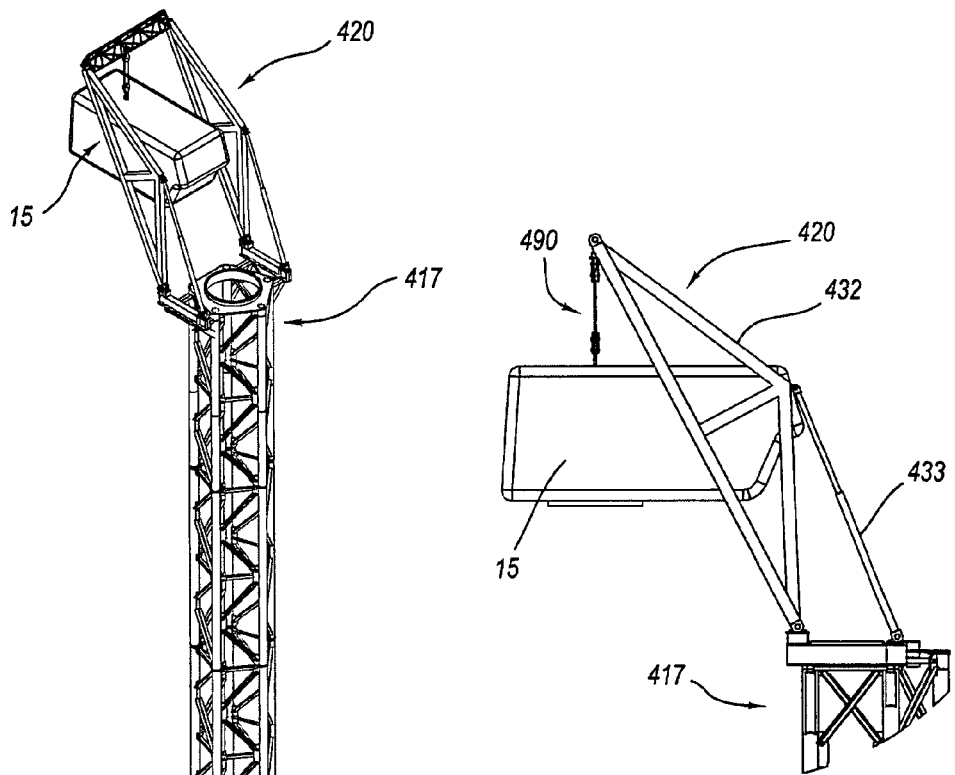
FIG. 25
FIG. 24

LIFTING SYSTEM AND APPARATUS FOR CONSTRUCTING AND ENCLOSING WIND TURBINE TOWERS

CROSS-REFERENCE TO RELATED APPLICATIONS

This application claims the benefit of U.S. Provisional Application No. 60/848,725, filed Oct. 2, 2006, entitled "LIFTING SYSTEM FOR WIND TURBINE AND STRUCTURAL TOWER," and also claims the benefit of U.S. Provisional Application No. 60/848,726, filed Oct. 2, 2006, entitled "CLADDING SYSTEM FOR A WIND TURBINE STRUCTURAL TOWER," and also claims the benefit of U.S. Provisional Application No. 60/932,731, filed Jun. 1, 2007, entitled "LIFTING SYSTEM AND APPARATUS FOR CONSTRUCTING AND ENCLOSING WIND TURBINE TOWERS."

All of the above-referenced applications are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

TECHNICAL FIELD

The present invention relates to wind turbines and structural towers and, more particularly, to equipment and methods used in assembling and enclosing high elevation structural towers for wind turbines and for mounting wind turbines and blades upon high elevation structural towers.

BACKGROUND

Wind turbines are an increasingly popular source of energy in the United States and Europe and in many other countries around the globe. In order to realize scale efficiencies in capturing energy from the wind, developers are erecting wind turbine farms having increasing numbers of wind turbines with larger turbines positioned at greater heights. In large wind turbine farm projects, for example, developers typically utilize twenty-five or more wind turbines having turbines capable of producing on the order of 1.2 Megawatts (MW) of power positioned at a height of fifty meters or higher above the ground. Providing wind turbines of these specifications typically provide scale efficiencies that reduce the cost of energy while making the project profitable to the developer. Placing larger turbines at greater heights enables each turbine to operate substantially free of boundary layer effects created through wind shear and interaction with near-ground irregularities in surface contours, e.g., rocks and trees. Greater turbine heights also lead to more steady operating conditions at higher sustained wind velocities, thereby producing, on average, more energy per unit time. Accordingly, there are economic and engineering incentives to positioning larger turbines at greater heights.

Positioning larger turbines at greater heights comes, however, with an added cost. The cost is associated with the larger and more massive towers that are required to withstand the additional weight of the larger turbines and withstand the wind loads generated by placing structures at the greater heights where wind velocities are also greater and more sustained.

An additional cost concerns the equipment that is required to erect the wind turbine. For example, the weight of conventional tube towers for wind turbines, e.g., towers having sectioned tube-like configurations constructed using steel or concrete—increases in proportion to the tower height raised to the 5/3 power. Thus, a 1.5 MW tower typically weighing 176,000 lbs at a standard 65 meter height will weigh approximately 275,000 lbs at an 85 meter height, an increase of about 56 percent. Towers in excess of 250,000 lbs, or higher than 100 meters, however, generally require specialized and expensive cranes to assemble the tower sections and to mount the turbine and blades on the assembled tower. Just the cost to transport and assemble one of these cranes needed to assemble a large tower and turbine can exceed $250,000 for a typical 1.5 MW turbine. In order to amortize the expense associated with such large cranes, wind turbine farm developers desire to pack as many wind turbines as possible onto the geographic area allocated to the towers and turbines, generally referred to as the "project footprint," thereby spreading the crane costs over many wind turbine installations. However, with sites having limited footprints, developers are forced to amortize transport and assembly costs of the crane across fewer turbines, which may be economically unfeasible. Further, projects installed on rough ground require cranes to be repeatedly assembled and disassembled, which may also be economically unfeasible. Projects located on mountain top ridges or other logistically difficult sites may, likewise, be all but eliminated due to unfeasible economics, in addition to engineering difficulties associated with locating a crane at such sites.

In view of the forgoing, it will be appreciated that it would be an advantage over the previously available systems to be able to assemble high-elevation structural towers and to mount heavy wind turbines on the top of such towers without relying on relatively large and prohibitively expensive crane equipment. It would be another advantage over the previously available systems to provide an apparatus and method for assembling high elevation structural towers and mounting wind turbines on top of such assembled towers without the need for large and prohibitively expensive crane equipment. The illustrative embodiments described herein overcome these disadvantages as will become more apparent with an understanding of the below provided description.

BRIEF DESCRIPTION OF THE DRAWINGS

FIG. 6 illustrates the embodiment of the present invention depicted in FIG. 3 arranged for hoisting a turbine to the top of a tower;

FIG. 7 illustrates the embodiment of the present invention depicted in FIG. 3 after hoisting a turbine to the top of a tower;

FIG. 10 illustrates the embodiment of the present invention depicted in FIG. 3 arranged for hoisting a blade assembly to the top of a tower;

FIG. 11 illustrates the embodiment of the present invention depicted in FIG. 3 after hoisting a blade assembly to the top of a tower;

FIG. 18 illustrates the embodiment of the present invention depicted in FIG. 17 after hoisting a turbine to the top of a tower;

FIG. 19 illustrates a close-up side view of the embodiment of the present invention depicted in FIG. 17 after hoisting a turbine to the top of a tower;

FIG. 24 illustrates the embodiment of the present invention depicted in FIG. 23 after hoisting a turbine to the top of a tower;

FIG. 25 illustrates a close-up side view of the embodiment of the present invention depicted in FIG. 23 after hoisting a turbine to the top of a tower;

DETAILED DESCRIPTION

Figure 1:
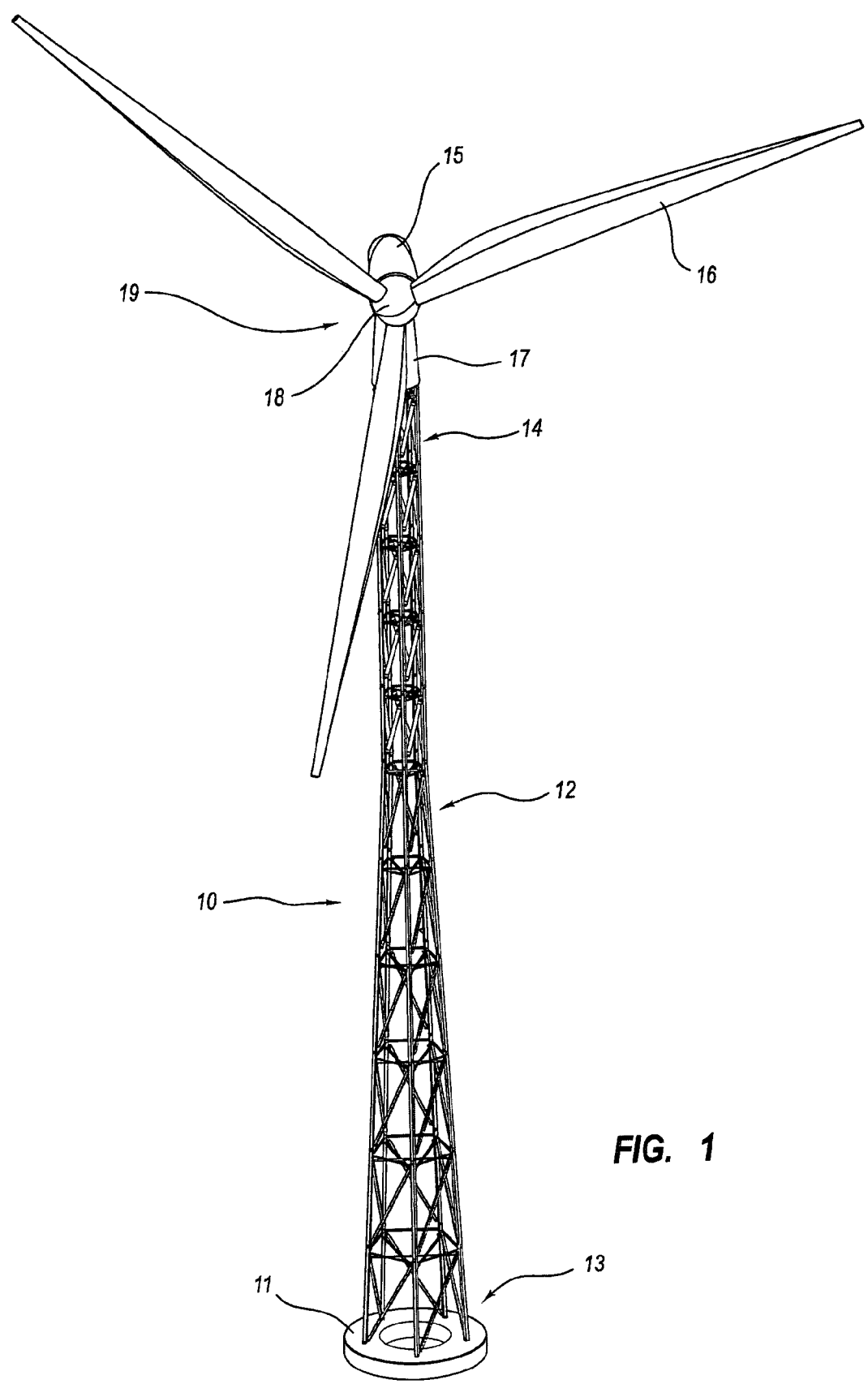
FIG. 1 illustrates a perspective view of an illustrative multiple-bay structural tower having a wind turbine assembly mounted thereon.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

The present disclosure generally relates to apparatus and methods used to assemble or construct high elevation structural towers supporting heavy loads, as in structural towers supporting wind turbines. In further detail, the present disclosure generally relates to an apparatus and method for lifting and positioning a wind turbine and associated blades on the top of a previously constructed and, assembled structural tower. In yet further detail, the present disclosure generally relates to a system and method for assembling and constructing a high elevation structural tower and for lifting and positioning a wind turbine and associated blades on the top of the previously constructed and assembled structural tower. The present disclosure also relates in particular to wind turbine applications, where the wind turbine is elevated to heights approaching in the range from about 80 to about 100 meters or higher and where rotor diameters approach 70 meters or greater.

In accordance with the present disclosure, an apparatus and method for lifting a wind turbine assembly to the top of a high-elevation structural tower is disclosed. One embodiment of the apparatus comprises a pivot shaft positioned and connected proximate an upper end of a structural tower. A first lifting truss is pivotally connected to the shaft, the first lifting truss having a first distal end extending away from the shaft and a second distal end extending in a direction away from the first distal end. A second lifting truss is pivotally connected to the shaft, the second lifting truss having a first distal end extending away from the shaft and a second distal end extending in a direction away from the first distal end. A first transverse beam connects the first distal ends of the first and second lifting trusses, and a rigging assembly is connected to the transverse beam and configured for hoisting a turbine to the upper end of the tower. A pivot control cable connected to the first lifting truss proximate the second distal end for controlling pivot movement of the first and second lifting trusses about the pivot shaft. All of the forgoing provides that wind towers can be constructed more efficiently than previously possible.

In further illustrative embodiments, the first lifting truss is triangular in shape and includes first and second members pivotally connected to the pivot shaft. The first member is positioned at an angle with respect to the second member with a portion of the pivot shaft being proximate the vertex of the angle, and with the angle being in the range from about 95 degrees to about 180 degrees. In yet a further illustrative embodiment, the first lifting truss includes third and fourth members pivotally connected to the pivot shaft.

In still further illustrative embodiments, the rigging assembly may comprise a block and tackle assembly; the first lifting truss may be pivotally connected to the pivot shaft using a bearing; and a second transverse beam may be disposed between and connected to the second distal ends with the pivot control cable being connected to the second transverse shaft.

In yet another illustrative embodiment, an apparatus for lifting a wind turbine assembly to the top of a high-elevation structural tower comprises a support frame connected to the tower and a first lifting truss pivotally connected to the support frame, with the first lifting truss having a distal end extending away from the support frame. A rigging assembly is connected proximate the distal end and configured for hoisting a turbine to the upper end of the tower, while an hydraulic ram having a first end connected to the support frame and a second end connected to the first lifting truss controls pivoting movement of the lifting truss. A second lifting truss may also be pivotally connected to the support frame, with the second lifting truss having a distal end extending away from the support frame. A transverse beam may extend between the distal ends of the first and second lifting trusses and have the rigging assembly connected to the beam. A second hydraulic ram may have a first end connected to the support frame and a second end connected to the second lifting truss. The lifting trusses may be triangular in shape, may be a straight single piece member, or take on a variety of other shapes, including square, semicircular or circular.

Also disclosed is a method for erecting a high-elevation multiple-bay structural tower and associated wind turbine equipment on a foundation, the method comprising the steps of securing a base bay assembly to the foundation; positioning an intermediate bay assembly on top of the base bay assembly using a crane or ginpole; positioning a top bay assembly on top of the first intermediate bay assembly using a crane or ginpole; positioning one of the apparatus disclosed herein for lifting a wind turbine proximate the top bay assembly using a crane or ginpole; and hoisting and positioning a wind turbine and blades on top of the top bay assembly using one of the apparatus disclosed herein for lifting a wind turbine.

In yet another aspect of the present disclosure, a tower structure holding a wind turbine is disclosed which has an outer covering to protect the internal area of the tower from wind, snow, rain and allows for air venting of the internal area of the tower. The disclosed covering also provides additional security for equipment located near the base of the tower and also provides additional security for controlling access to the internal structures used by humans and equipment to ascend and descend the tower.

The disclosed covering can include a personnel access door as well as one or more access ports into the area inside the tower base perimeter. Such access doors and access ports can preferably accommodate construction equipment, such as a small forklift or maintenance vehicle In accordance with another aspect of the present disclosure, the wind tower structure can include four or more vertical structural members interconnected with diagonal and horizontal structural members such that there is visible space along the perimeter or circumference of the tower structure. The visible spaces on said tower structure are concealed by in a method that does not provide significant structural support to the vertical, diagonal, or horizontal structural members of the tower. The covering can be fabricated from any number of canceling materials such as architectural fabrics, for example, PVC and fiberglass, sheet metal, organic fibers and similarly functioning materials. In the descried embodiments, the material can be continuous around the perimeter of the tower structure or it can be segmented and can be applied or attached to the outside of the structural tower members thus the concealing material both hides the visible spaces and also hides the structural members of the tower from someone standing outside of the tower.

In the described embodiments, the concealing material can be applied or attached to the structural tower members so that the structural tower members are visible to a person standing outside of the tower but the visible spaces have been filled so that there are no visible spaces remaining. In some of the described embodiments, there are windows or orifices in the concealing material for allowing equipment or other items to pass through the plane of, or the surface of, the concealing material which have a covering so that when the equipment is not passing through the window or orifice in the concealing material, the orifice does not create a visible space in the tower face.

One wind tower structure in accordance with the present disclosure is assembled in multiple sections and is covered wherein the covering for the structure can be applied to the sections of the wind tower structure before the sections are vertically connected to each other and the covering is an architectural fabric, preferably coated on the outer surface with TEDLAR® or with PVC or another material to prolong the life of the fabric on the tower. Moreover, the vertical structural members of the tower can have a friction reducing material applied to them in the long predominantly vertical areas that the tower structure covering would contact or touch the vertical structural members to prolong the life of the covering material.

Features from any of the illustrative embodiments mentioned herein may be used in combination with one another in accordance with the present disclosure. In addition, other features and advantages will become apparent to those of ordinary skill in the art through consideration of the ensuing description, the accompanying drawings, and the appended claims.

Details of such exemplary embodiments of the invention are set forth herein.

FIG. 1 illustrates a perspective view of an exemplary structural tower and wind turbine combination that is constructed and assembled using the principles of the present disclosure. Generally speaking, the structural tower 10 comprises a plurality of space frame sections also commonly called bay assemblies or bay sections 12, 13, 14 that are assembled, one on top of the other, to the desired height of the structural tower 10. The lowermost bay assembly 13 of the structural tower 10 is secured to a foundation 11. A series of intermediate 12 and upper 14 bay sections are assembled one on top of another to the desired height. The top bay section 17 may comprise a conventional tube-like bay section (as illustrated) or a space frame section (e.g., an upper bay section 14) and connects a wind turbine 15 to the top of the tower 10 using connections readily known to those skilled in the art. The wind turbine 15 carries a plurality of blades 16 mounted on a rotor 18 to form a blade assembly 19 that rotates in typical fashion in response to wind. Rotation of the blades 16 drives a generator (not explicitly illustrated) that is integral to the wind turbine 14 and typically used to generate electricity. As those skilled in the art will appreciate, the rotating plurality of blades 16 can be used for purposes other than generating electricity, such as, for example, driving a pump for pumping water or driving a mill for grinding grain.

Further details of the components making up such structural towers for wind turbine applications are presented in commonly-owned and pending U.S. patent application Ser. No. 11/433,147, filed Jun. 1, 2007, entitled "STRUCTURAL TOWER," commonly-owned and pending U.S. Provisional Patent Application Ser. No. 60/899,492, filed Feb. 5, 2007, entitled "WIND TURBINE SYSTEMS WITH DAMPING MEMBERS," commonly-owned and pending U.S. patent application Ser. No. 11/649,033, filed Jan. 3, 2007, entitled "LIFTING SYSTEM AND APPARATUS FOR CONSTRUCTING WIND TURBINE TOWERS," commonly-owned and pending U.S. Provisional Patent Application Ser. No. 60/848,857, filed Oct. 2, 2006, entitled "DRIVE PIN SYSTEM FOR A WIND TURBINE STRUCTURAL TOWER," commonly-owned and pending U.S. Provisional Patent Application Ser. No. 60/899,470, filed Feb. 5, 2007, entitled "WIND TURBINE SYSTEMS WITH WIND TURBINE TOWER DAMPING MEMBERS," commonly-owned and pending U.S. patent application Ser. No. 11/906,758, filed Oct. 2, 2007, entitled "DRIVE PIN SYSTEM FOR A WIND TURBINE STRUCTURAL TOWER," commonly-owned and pending U.S. patent application Ser. No. 11/906,766, filed Oct. 2, 2007, entitled "EXPANSION PIN SYSTEM FOR A WIND TURBINE STRUCTURAL TOWER," all of the disclosures of which are now incorporated herein in their entireties by this reference. The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

Figure 2:
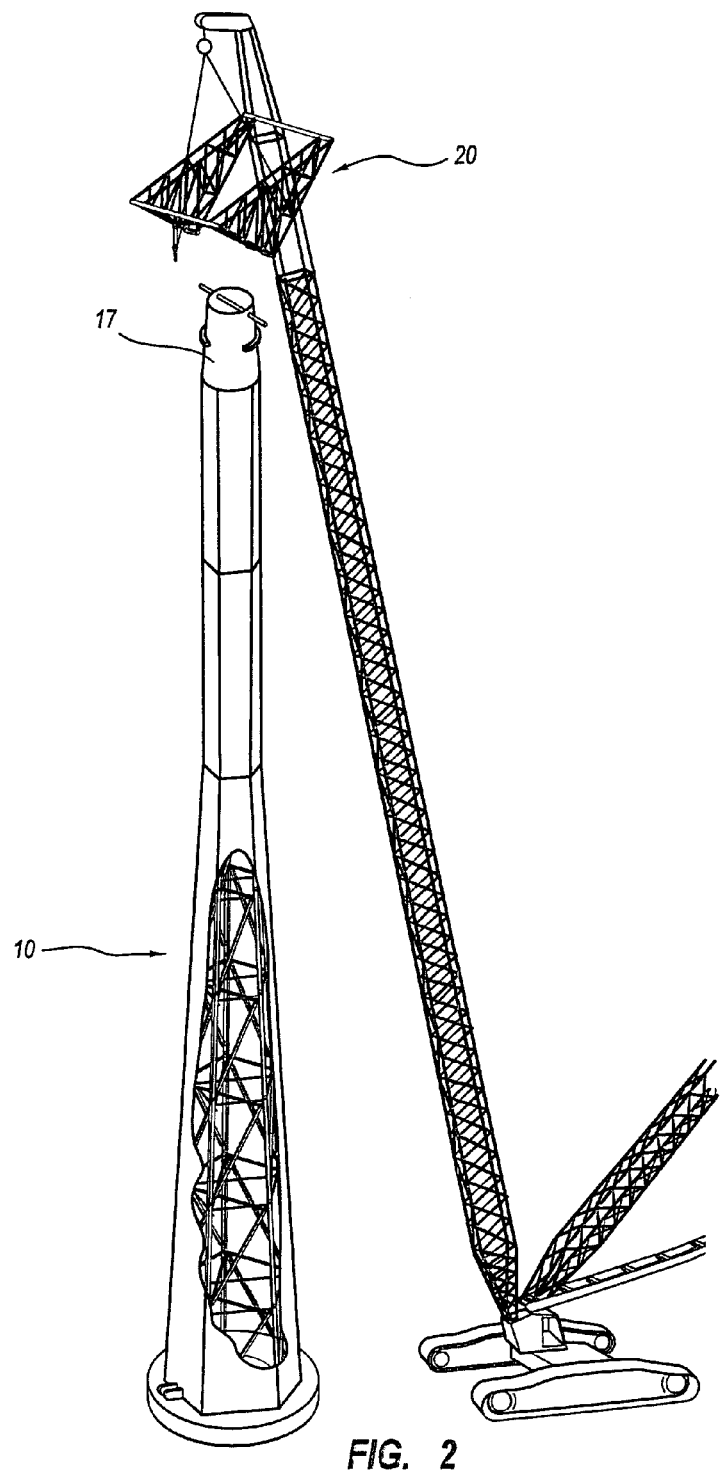
FIG. 2 illustrates a crane hoisting for assembly on top of the structural tower an illustrative embodiment of a lifting apparatus of the present invention.
Figure 3:
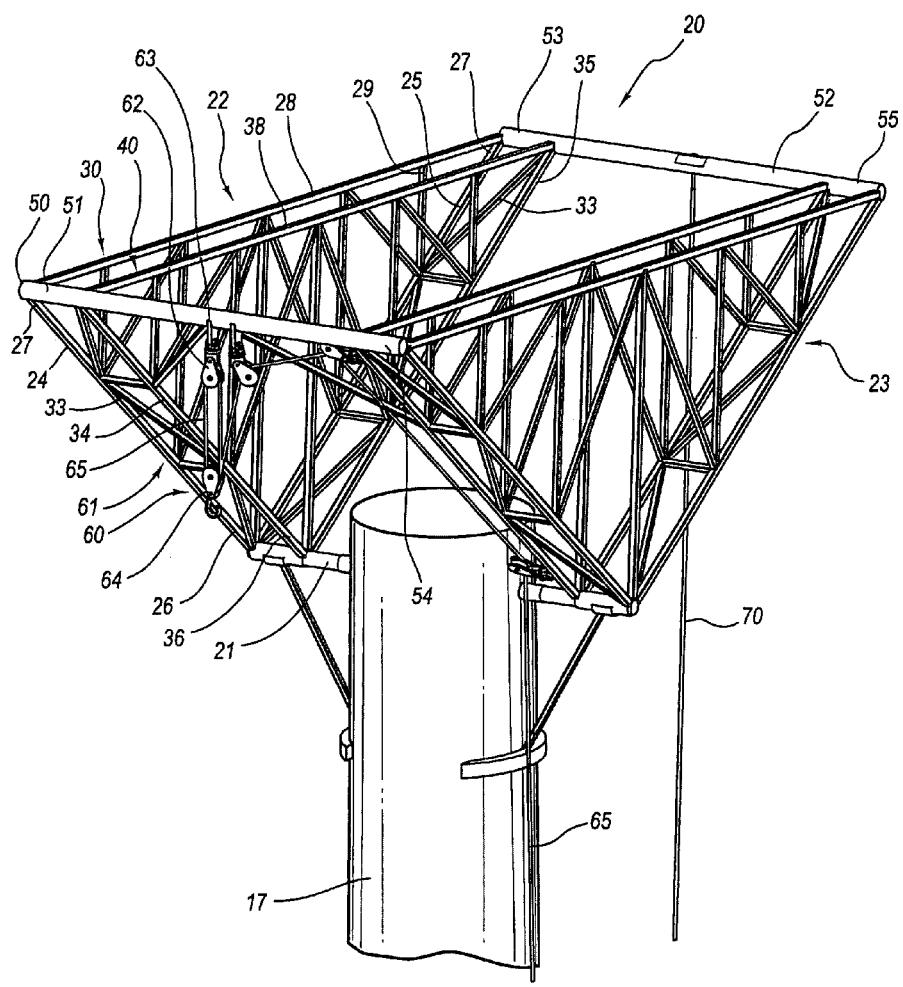
FIG. 3 illustrates an illustrative embodiment of a lifting apparatus of the present invention.
Figure 4:
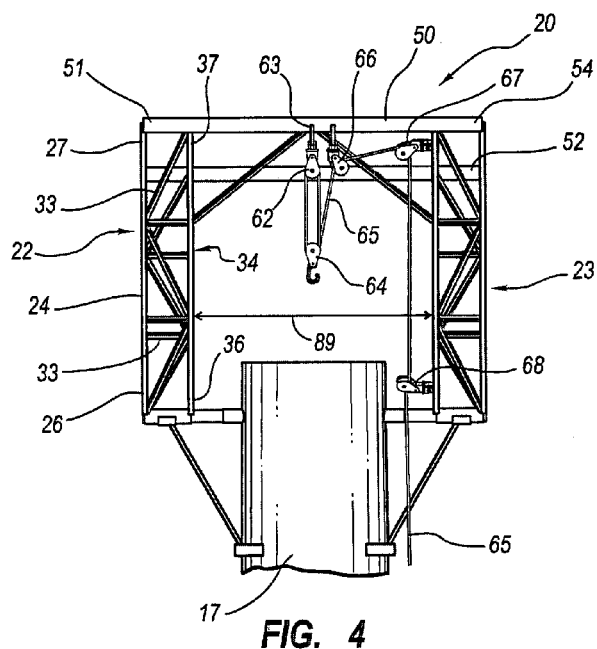
FIG. 4 illustrates a frontal view of the embodiment of the present invention depicted in FIG. 3.
Figure 5:
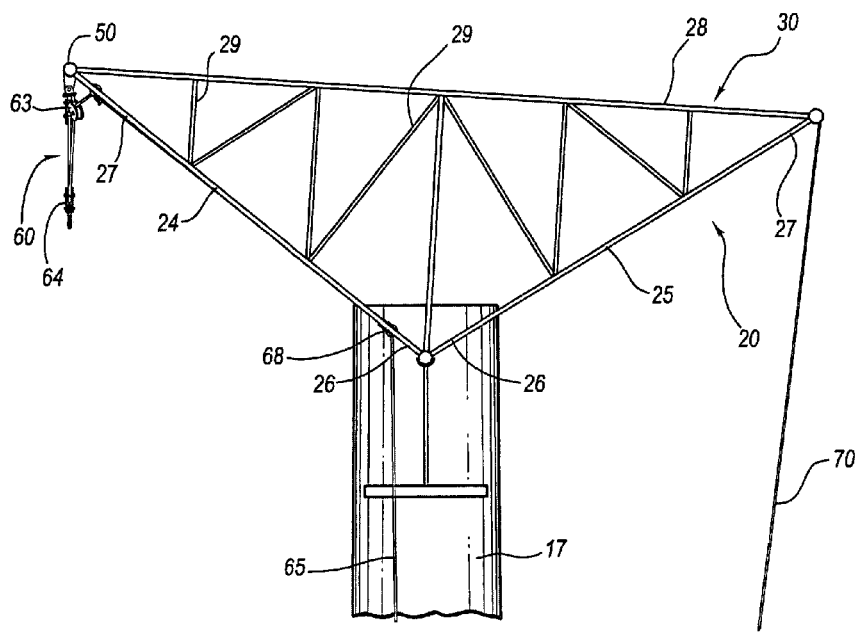
FIG. 5 illustrates a side view of the embodiment of the present invention depicted in FIG. 3.

FIG. 2 illustrates one embodiment of a lifting apparatus 20 of the present invention being hoisted by a crane for positioning upon the top bay section 17 of the structural tower 10. Referring more specifically to FIG. 3, the lifting apparatus is illustrated pivotally secured to the top bay section 17. The lifting apparatus 20 includes first 22 and second 23 lifting trusses that are mounted on a pivot shaft 21. The first 22 and second 23 lifting trusses are spaced on the pivot shaft 21 a distance 89 (FIG. 4) sufficient to permit the turbine 15 to pass between the lifting trusses when the lifting apparatus pivots about the shaft during the hoisting and positioning operations described below. The first lifting truss 22 includes first 24 and second 25 members having proximal ends 26 that are pivotally secured to the pivot shaft 21 and distal ends 27 that extend away from the pivot shaft 21; the distal end 27 of the first member 24 extending generally toward a fore direction (the hoisting side of the frame 20) and the distal end 27 of the second member 25 extending generally toward an aft direction of the frame 20. A third member 28 is secured to the distal ends 27 of the first 24 and second 25 members. Referring now to both FIGS. 3 and 5, the first 24 and second 25 members, together with the third member 28, are oriented generally in and comprise a first triangular structure 30. An array of internal truss elements 29 are disposed within and connected to the first 24 and second 25 members and the third member 28 that comprise the first triangular structure 30.

If desired, the first lifting truss 22 may also include third 34 and fourth 35 members having proximal ends 36 that are pivotally secured to the pivot shaft and distal ends 37 extending away from the pivot shaft 21 in manner and direction similar to their counterparts comprising the first triangular structure 30. A sixth member 38 is secured to the distal ends 37 of the third 34 and fourth 35 members. The third 34 and fourth 35 members, together with the sixth member 38, are oriented generally in and comprise a second triangular structure 40. An array of internal truss elements 39 are disposed within and connected to the third 34 and fourth 35 members and the sixth member 38 that comprise the second triangular structure 40. An array of secondary internal truss elements 33 are disposed between and connect the first 30 and second 40 triangular structures to comprise the first lifting truss 22.

The second lifting truss 23 is constructed in similar fashion to the first lifting truss 22. While construction details of the second lifting truss 23 are not explicitly repeated herein, those having skill in the art will appreciate that the first 22 and second 23 lifting trusses may, or need not, be assembled in precisely the same way or share the same geometry.

Furthermore, those skilled in the art will appreciate that each lifting truss 22 & 23 need not comprise both first and second triangular structures as described above, but could comprise a single triangular structure or two or more triangular structures, depending on the materials selected to construct the lifting apparatus 20 and the expected loads for the particular application. Finally, those skilled in the art will recognize that the lifting trusses need not assume triangular shapes as illustrated, but could be, for example, square, rectangular circular or semi-circular. With these qualifications in mind, this description will proceed generally with the embodiment illustrated in FIGS. 3-5.

Fore 50 and aft 52 transverse beams are positioned fore and aft of the first 22 and second 23 lifting trusses and connected thereto. The fore transverse beam 50 has a first end 51 positioned proximate the intersection of the first member 24 and the third member arm 28 of the first lifting truss 22 (and, if used, the intersection of the third 34 member and the sixth member 38). In similar fashion, the aft transverse beam 52 has a first end 53 positioned proximate the intersection of the second member 25 and the third member 28 of the first lifting truss 22 (and, if used, the intersection of the fourth 35 member and the sixth member 38). The fore 50 and aft 52 transverse beams have second ends 54, 55 that are positioned and connected to corresponding locations of the second lifting truss 23 in a manner similar to the positioning and connections of the first ends 51, 53 to the first lifting truss 22.

A rigging assembly 60 is secured to the fore transverse beam 50. The rigging assembly 60 comprises a block and tackle assembly 61 that is capable of affecting a mechanical advantage when lifting the turbine 15 and blades 16 (see FIGS. 6-9 and 10-12). More specifically, a first pulley assembly 62 is secured to a tab member 63 which is itself welded or otherwise securely attached to the fore transverse beam 50. A second pulley assembly 64 is positioned to hang downward from the first pulley assembly 62 when a cable 65 is threaded through the first 62 and second 64 pulley assemblies to form the block and tackle assembly 61. As those skilled in the art will appreciate, each of the first 62 and second 64 pulley assemblies may comprise any number of pulleys to affect the desired mechanical advantage (although, for clarity of description, only one pulley for each assembly is illustrated).

In the illustrated embodiment, the free end of the cable 65 is threaded through third 66, fourth 67 and fifth 68 pulleys. The third 66 and fourth 67 pulleys are positioned and connected to or adjacent the fore transverse beam 50, while the fifth pulley 68 is positioned and connected to the second truss assembly 23 adjacent the pivot shaft 21. Positioning of the fifth pulley 68 adjacent the pivot shaft as indicated permits the lifting apparatus 20 to pivot about the pivot shaft 21 without having to adjust the play on the cable 65 to compensate in response. A pivot control cable 70 is attached to the aft transverse beam 52. The pivot control cable 70 provides a means to hold the lifting apparatus 20 in a steady position while the turbine 15 or blades 16 (see FIGS. 10-12) are being hoisted by the rigging assembly 60 or to pivot the lifting apparatus 20 about the pivot shaft 21 to position the turbine 15 or blades 16 into place as described herein below.

Referring now more specifically to FIGS. 6-9, the rigging assembly 60 and corresponding cable 65 and the pivot control cable 70 are illustrated hoisting the turbine 15 into place on the top bay assembly 17. The pivot control cable 70 is removed of excess play and adjusted so the lifting apparatus 20 is set into proper orientation with respect to the tower 10. Proper orientation requires the fore transverse beam 50 (see FIG. 5) to extend radially outward from the tower 10 a distance sufficient to prevent the turbine 15 or blades 16 from contacting the tower 10 during the hoisting process. The pivot control cable 70 has a second end 71 that may extend through one or more wheels 72 that are rotatably secured to the foundation 11 or to an auxiliary foundation (not explicitly illustrated). The second end 71 ultimately extends to a winch 73 which reels in or out the pivot control cable 70, thereby pivoting the lifting apparatus 20 about the pivot shaft 21.

It will be appreciated that the structures and apparatus disclosed herein are merely one example of a means for securing a base bay assembly to the foundation, and it should be appreciated that any structure, apparatus or system for securing a structure to a foundation which performs functions the same as, or equivalent to, those disclosed herein are intended to fall within the scope of this recited element, including those structures, apparatus or systems which are presently known, or which may become available in the future. Anything which functions the same as, or equivalently to, means for securing a base bay assembly to the foundation, falls within the scope of this element.

Once the lifting apparatus 20 is positioned in proper orientation, the turbine 17 is placed into position proximate the base of the tower 10 using a crane or other suitable means. The rigging assembly 60 is then brought into position adjacent the turbine 15 and the second pulley assembly 64 is secured to the turbine 15. In a manner similar to the pivot control cable 70, the cable 65 corresponding to the rigging assembly 60 has a second end 75 that may extend through one or more wheels 76 that are rotatably secured to the foundation 11 or to an auxiliary foundation (not explicitly illustrated). The second end 75 ultimately extends to a winch (not explicitly illustrated) that reels in or out the cable 65, thereby operating the block and tackle assembly 61 and hoisting or lowering the second pulley assembly 64 with respect to the ground or the foundation 11.

Figure 8:
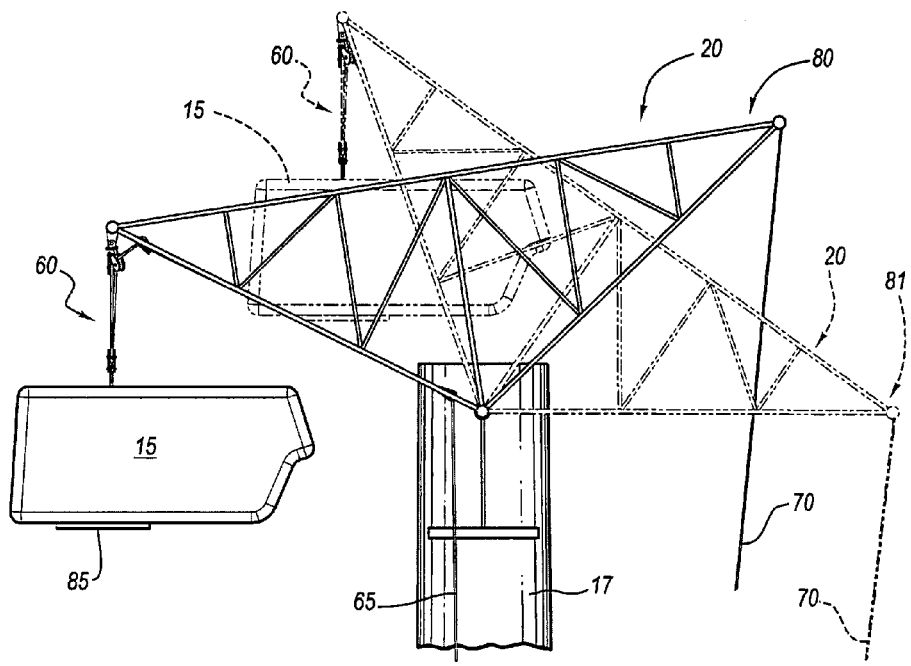
FIG. 8 illustrates the embodiment of the present invention depicted in FIG. 3 pivoting to bring the turbine into position for attachment to the structural tower.
Figure 9:
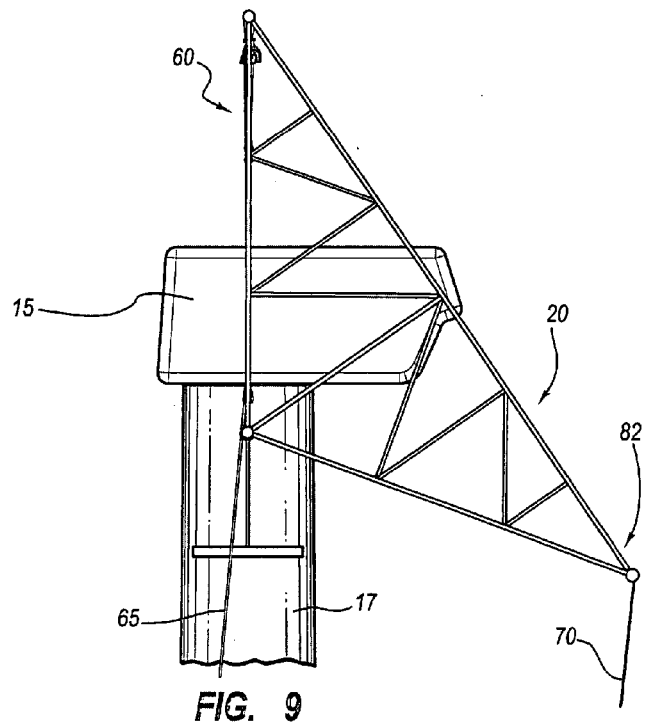
FIG. 9 illustrates the embodiment of the present invention depicted in FIG. 3 after lowering the turbine in position for attachment to the structural tower.

Referring now more specifically to FIGS. 8 and 9, the turbine 15 is illustrated being positioned upon the top bay assembly 17 through operation of the lifting apparatus 20. Referring to FIG. 8, the turbine is illustrated adjacent the fore side of the top bay assembly 17, following orientation of the lifting apparatus 20 and hoisting of the turbine 15 through operation of the pivot control cable 70 and rigging assembly 60 as previously described. As illustrated in FIGS. 8 and 9, following hoisting of the turbine 15, the pivot control cable 70 is reeled in through operation of the corresponding winch, thereby pivoting the lifting apparatus 20 from a first position 80 through an intermediate position 81 and then to a final position 82. At the final position 82, a mounting structure 85 at the base of the turbine 15 sits directly above the top bay assembly 17. The rigging assembly cable 65 is then reeled out through operation of its corresponding winch, thereby lowering the turbine 15 into position upon the top bay assembly 17. The turbine 15 is then secured to the top bay assembly 17 through the mounting structure 85 positioned at the base of the turbine 15 and corresponding mounting structure (not illustrated) positioned at the upper end of the top bay assembly 17. Once the turbine 17 is secured to the top bay assembly 17, the rigging assembly cable 65 is slackened and the second pulley 64 of the rigging assembly 60 removed from the turbine 15.

Figure 12:
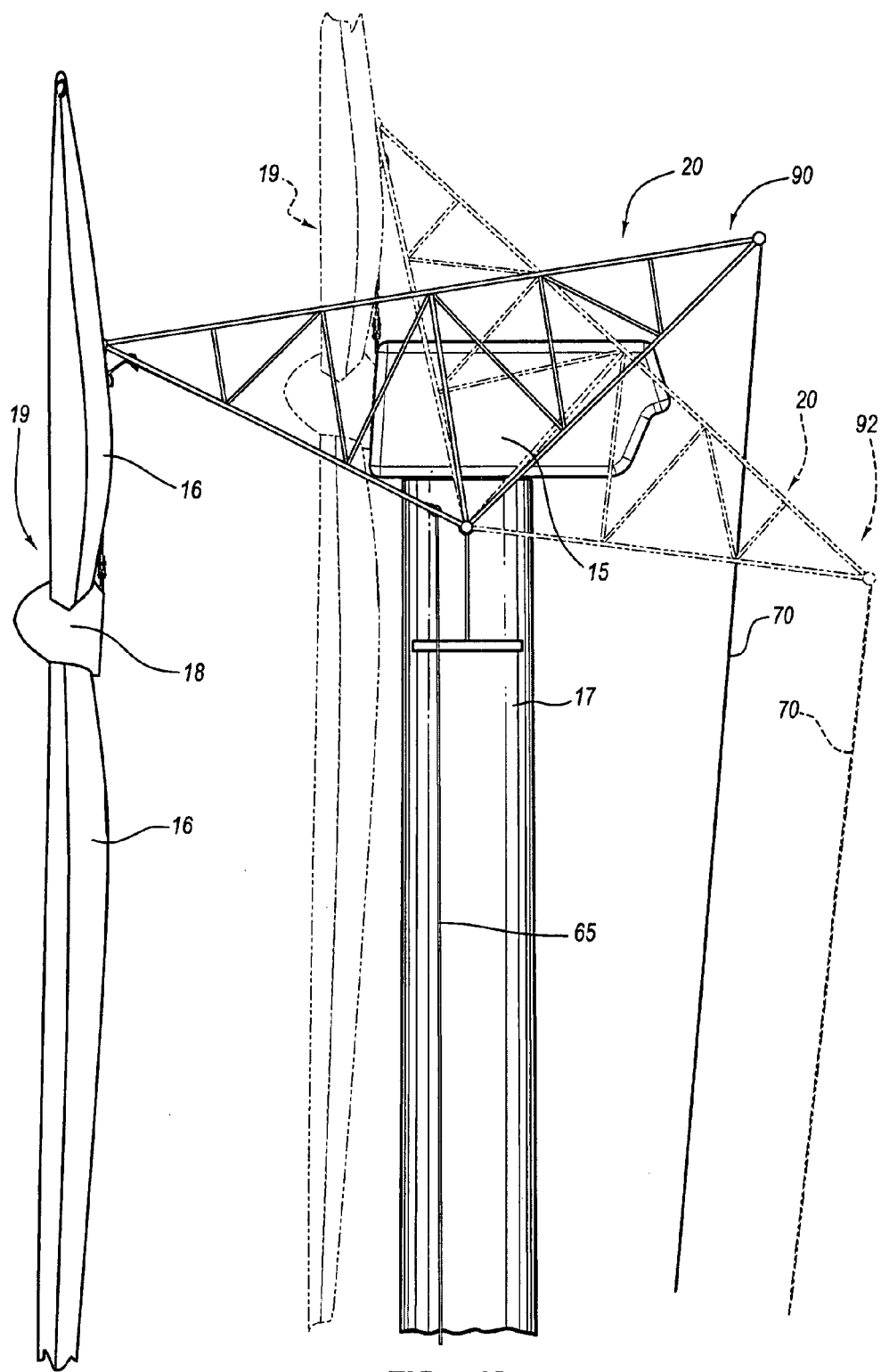
FIG. 12 illustrates the embodiment of the present invention depicted in FIG. 3 pivoting to bring the blade assembly into position for attachment to the driven shaft of the turbine.

Referring now more specifically to FIGS. 10-12, the rigging assembly 60 and corresponding cable 65 and the pivot control cable 70 are illustrated hoisting the blades 16 into place on the turbine 15. The steps are similar to those just described with respect to hoisting and positioning the turbine 15. The pivot control cable 70 is removed of excess play and adjusted so the lifting apparatus 20 is set into proper orientation with respect to the tower 10. Once the lifting apparatus 20 is positioned in proper orientation, the blades 16 are assembled onto the blade rotor 18 and the resulting blade assembly 19 is placed into position proximate the base of the tower 10 using a crane or other suitable means. The rigging assembly 60 is then brought into position adjacent the turbine 15 and the second pulley assembly 64 is secured to the blade assembly 19. The blade assembly 19 is then hoisted to the top of the tower 10 in a fashion similar to that above described respecting hoisting of the turbine 15.

Referring now to FIG. 12, the blade assembly 19 is illustrated being secured to the turbine 15 through operation of the lifting apparatus 20. Specifically, the blade assembly 19 is illustrated adjacent the fore end of the turbine 15, following orientation of the lifting apparatus 20 and hoisting of the blade assembly 19 through operation of the pivot control cable 70 and rigging assembly 60 as previously described. Following hoisting of the blade assembly 19, the pivot control cable 70 is reeled in through operation of the corresponding winch, thereby pivoting the lifting apparatus 20 from a first position 90 through an intermediate position and then to a final position 92. At the final position 92, the rotor 18 of the blade assembly 19 is secured to a driven shaft (not explicitly illustrated) protruding from the turbine 15. Once the blade assembly 19 is secured to the driven shaft on the turbine 15, the rigging assembly cable 65 is slackened and the second pulley 64 of the rigging assembly 60 removed from the blade assembly 19.

Following complete installation of the turbine 15 and blade assembly 19 and removal of the rigging apparatus 60, the lifting apparatus is removed using the same crane employed to construct the tower and hoist and install the lifting apparatus on the top bay assembly 17. Although a crane is suggested as one means for raising and lowering the lifting apparatus 20, those skilled in the art should appreciate that other means for accomplishing the raising and lowering the lifting apparatus 20 may be employed to that end. For example, a ginpole such as one commonly used in the telecommunications industry to erect communication towers could be used to not only erect the tower, but to raise and lower the lifting apparatus 20. Another suitable means is a helicopter equipped to lift appropriate loads. Such helicopters are used, for example, in the installation of heavy towers used in ski resorts where mountainous terrain makes access difficult and installation cumbersome and expensive using other means.

While the foregoing description provides details relating to lifting apparatuses mounted to structural towers using a pivot shaft or similar structure, the following description provides details relating to other illustrative embodiments of lifting apparatuses and means for attaching the lifting apparatuses to both tube-like and space-frame structural towers.

Figure 13:
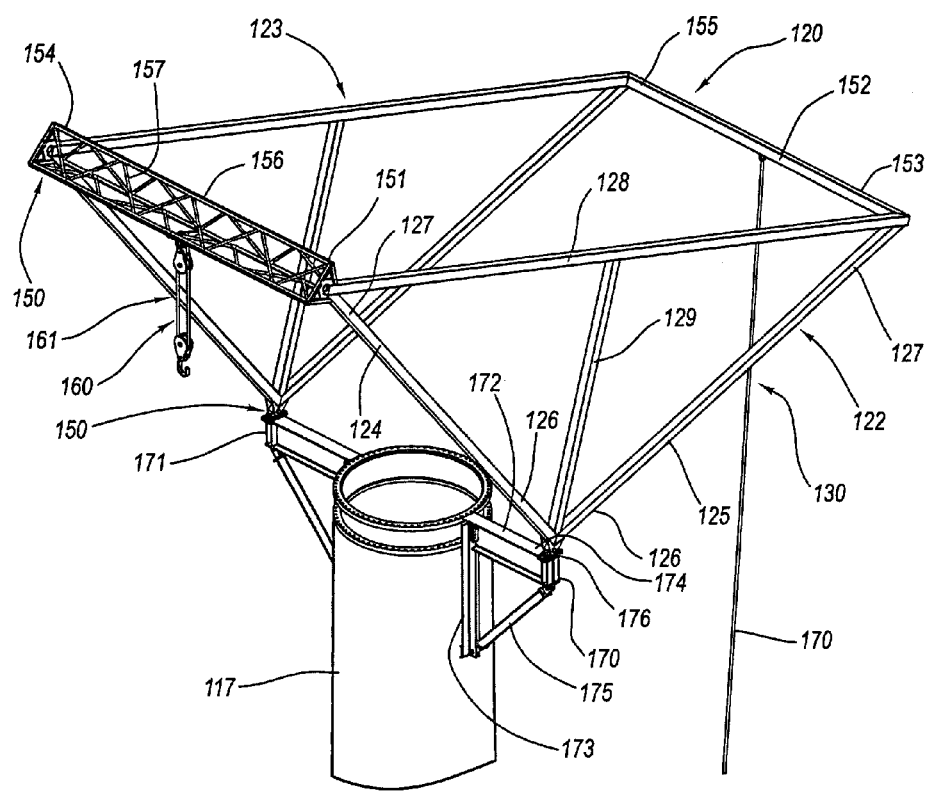
FIG. 13 illustrates a further embodiment of the lifting apparatus of the present invention

Referring now to FIG. 13, for example, a partially exploded view of a lifting apparatus secured to a pair of radially extending beams is provided. More specifically, a lifting apparatus 120 comprises a first 122 and second 123 lifting trusses. The first lifting truss 122 includes first 124 and second 125 members having proximal ends 126 that are secured to a bearing assembly 121 and distal ends 127 that extend away from the bearing assembly 150; the distal end 127 of the first member 124 extending generally toward a fore direction (the hoisting side of the apparatus 120) and the distal end 127 of the second member 125 extending generally toward an aft direction of the apparatus 120. A third member 128 is secured to the distal ends 127 of the first 124 and second 125 members. The first 124 and second 125 members, together with the third member 128, are oriented generally in and comprise a first triangular structure 130. An internal truss element 129 is disposed within and connects the proximal ends 126 of the first 124 and second 125 members and an intermediate portion of the third member 128 that comprise the first triangular structure 130.

The second lifting truss 123 is constructed in similar fashion to the first lifting truss 122. While construction details of the second lifting truss 123 are not repeated here, those having skill in the art will appreciate that the first 122 and second 123 lifting trusses may, or need not, be assembled in precisely the same way or share the exact same geometry. Further, those skilled in the art will appreciate that each lifting truss 122 & 123 need not comprise single triangular structures as described above, but could comprise a single triangular structure or two or more triangular structures, depending on the materials selected to construct the lifting frame 120 and the expected loads for the particular application. Finally, those skilled in the art will recognize that the lifting trusses need not assume triangular shapes as illustrated, but could be, for example, square, rectangular circular or semi-circular.

Fore 150 and aft 152 transverse beams (or a multi-beam structure as illustrated) are positioned fore and aft of the first 122 and second 123 lifting trusses and connected thereto. The fore transverse beam 150 has a first end 151 positioned proximate the intersection of the first member 124 and the third member 128 of the first lifting truss 122. In similar fashion, the aft transverse beam 152 has a first end 153 positioned proximate the intersection of the second member 125 and the third member 128 of the first lifting truss 122.

The fore 150 and aft 152 transverse beams have second ends 154, 155 that are positioned and connected to corresponding locations of the second lifting truss 123 in a manner similar to the positioning and connections of the first ends 151, 153 to the first lifting truss 122. The fore transverse beam 150 comprises a plurality of transverse beam elements 156 that are, in one illustrative embodiment, arranged in triangular cross sectional layout as shown. The transverse beam elements 156 are interconnected by a plurality of internal truss elements 157 to provide support for the transverse beam elements 156.

A rigging assembly 160 is secured to the fore transverse beam 150 and, similar to the above description, comprises a block and tackle assembly 161 that is capable of affecting a mechanical advantage when lifting the turbine 15 and blades 16. A pivot control cable 170 is attached to the aft transverse beam 152 and provides a structure to hold the lifting apparatus 120 in a steady position while the turbine 15 or blades 16 are being hoisted by the rigging assembly 160 or to pivot the lifting apparatus 120 to position the turbine 15 or blades into place as described above.

Similar to the description above, the lifting apparatus 120 is secured to the top bay assembly 117 of a structural tower. Secured to the top bay assembly are first 170 and second 171 radially extending beams. The first radially extending beam 170 has a first end 172 secured to an axial side beam 173 that is itself secured the top bay assembly 117. The first radially extending beam 170 has a second end 174 that extends substantially radially outward from the top bay assembly 117. An angle brace 175 is secured to and extends between the second end 174 and a lower end of the axial side beam 173. Secured to the top of the second end 174 of the first radially extending beam 170 is a bearing mounting bracket 176 for mounting of the bearing assembly 150.

While FIG. 13 illustrates the first 170 and second 171 radial beam members extending in true radial direction from an assumed central axis of the top bay assembly, those skilled in the art should appreciate that the members need not extend outward in true radial fashion but, instead, may be angled fore or aft with respect to such centerline. Further, the members need not be secured to the top bay assembly 117 separated by 180 degrees as illustrated but, instead, may be offset either fore or aft.

Figure 14:
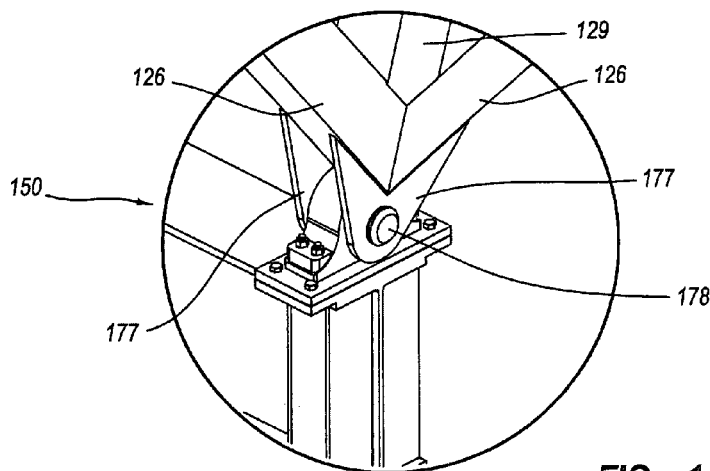
FIG. 14 illustrates a close-up view of a bearing assembly used to mount a lifting frame to a support frame member.

As illustrated in FIG. 14, the bearing assembly 150 for the first radially extending member 170 is mounted to the mounting bracket 176. The proximal ends 126 of the first 124 and second 125 members and the internal truss element 129 meet at a common vertex and are themselves secured to a pair of tab members 177. A pin 178 extends through the tab members 177 and the bearing assembly 150. When bearing assemblies 150 are positioned on the ends of the first 170 and second 171 radially extending members and incorporated into the lifting apparatus 120 as described, the lifting apparatus is pivotable about the pins extending through the bearing assemblies 150 in response to movement of the pivot control cable 170.

Figure 15:
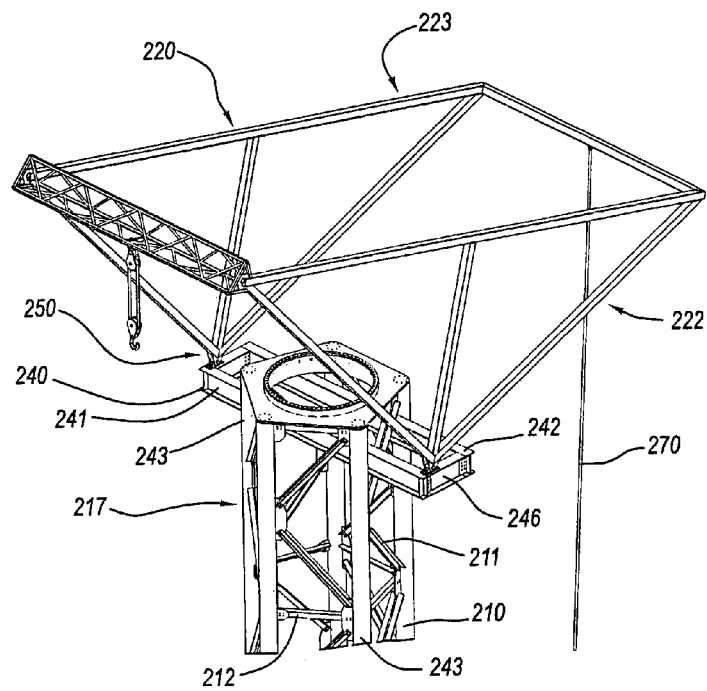
FIG. 15 illustrates an embodiment of the lifting frame of the present invention and the frame used to secure the lifting frame to a space frame tower.
Figure 16:
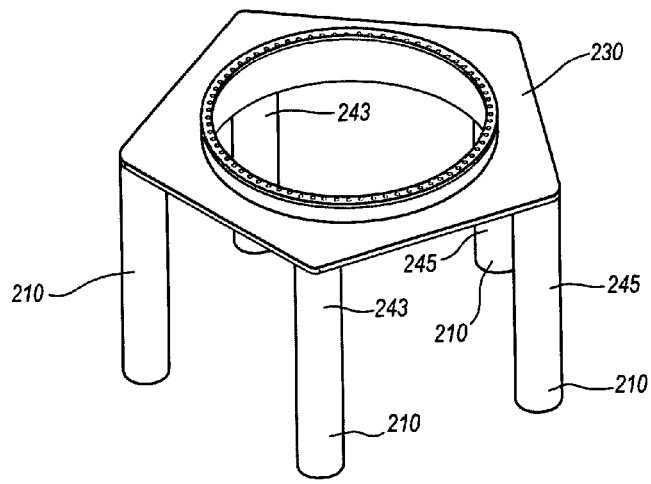
FIG. 16 illustrates a turbine mounting structure secured to longitudinal members of a space frame tower.
Figure 17:
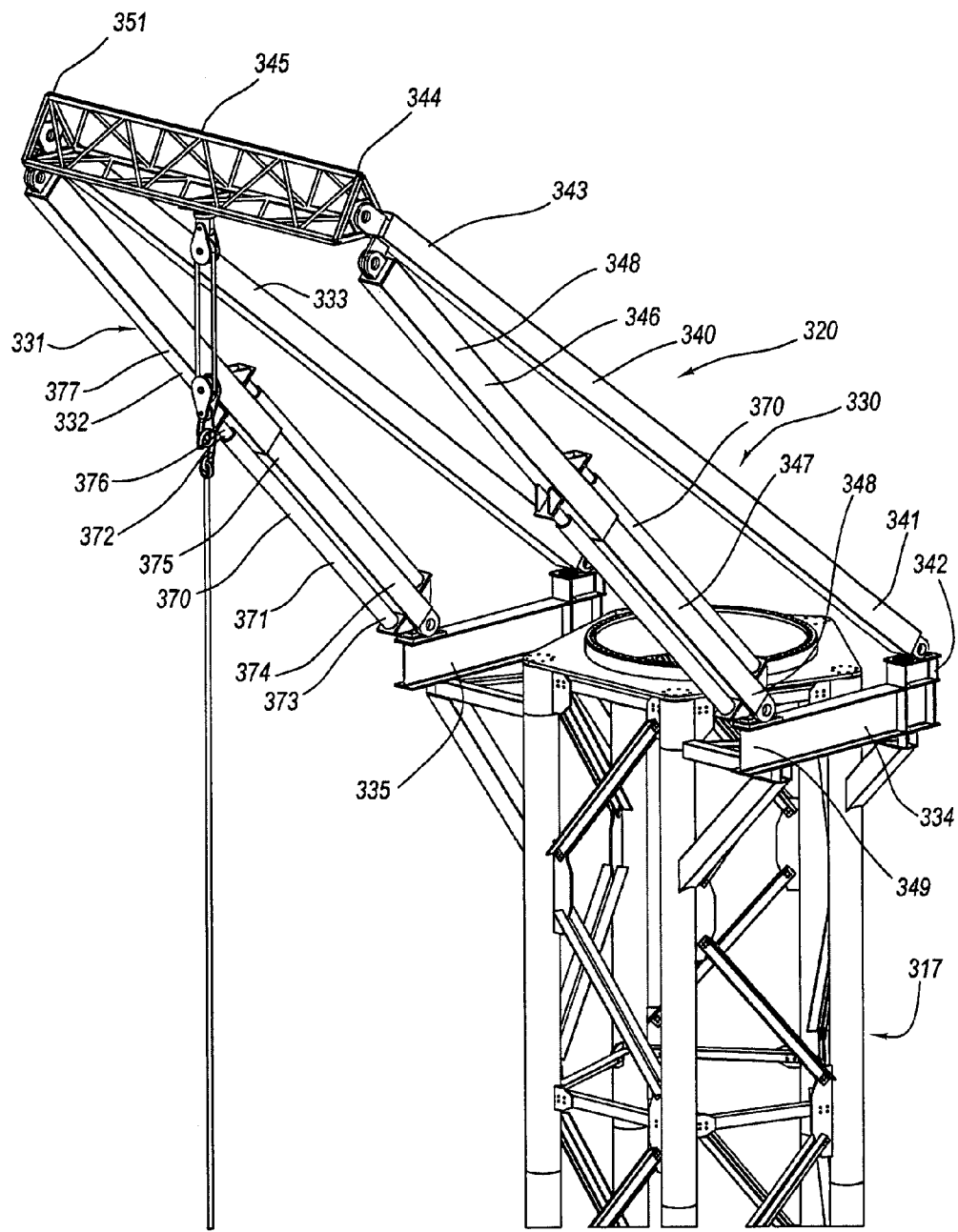
FIG. 17 illustrates a further embodiment of the lifting frame of the present invention.

Referring now to FIGS. 15 and 16, a further embodiment of a lifting apparatus of the present invention is illustrated, in this instance connected to and operational with the top bay assembly 217 of a space frame tower. As disclosed in U.S. patent application Ser. No. 11/433,147, a space frame tower for wind turbine applications comprises a plurality of upwardly extending longitudinal members 210 interconnected by diagonal 211 and horizontal 212 members or struts. Disclosed as part of the present invention is the use of a ring member 230 that is configured to accept and mate to a mounting structure positioned at the base of the turbine 15, and is further configured to connect to the uppermost ends of the upwardly extending longitudinal members 210 that comprise the top bay assembly 217. A support frame 240 is positioned beneath the ring member 230. The support frame 240 has a transverse dimension sufficient to extend through the top bay assembly 217 and support first 222 and second 223 lifting trusses of a lifting apparatus 220 constructed as previously described. The support frame 240 comprises fore 241 and aft 242 transverse support members.

Still referring to FIGS. 15 and 16, in one illustrative embodiment, the fore transverse support member 241 is secured to an opposing pair 243 of longitudinal members 210 and the aft transverse support member is secured to an adjacent opposing pair 245 of the longitudinal members 210. Supporting cross braces 246 are disposed at the ends of the fore 241 and aft 242 transverse support members. Bearing assemblies 250 are then disposed on the supporting cross braces 246 or the fore 241 and aft 242 transverse support members. When bearing assemblies 250 are positioned on the supporting cross braces 246 or the fore 241 and aft 242 transverse support members and incorporated into the lifting apparatus 220 as described previously, the lifting apparatus is pivotable about pins extending through the bearing assemblies 250 in response to movement of the pivot control cable 270.

Referring now to FIGS. 17-22, a further illustrative embodiment of a lifting apparatus 320 of the present disclosure, connected to and operational with a top bay assembly 317 of a space frame tower, is disclosed. The lifting apparatus 320 comprises first 330 and second 331 lifting trusses, each truss generally comprising a telescoping 332 and a non-telescoping 333 member. First 334 and second 335 supporting frame members are connected to and disposed on the sides of the top bay assembly 317. More specifically, the first lifting truss 330 comprises a non-telescoping member 340 having a first end 341 pivotally connected to an aft portion 342 of the first supporting frame member 334 and a second end 343 pivotally connected to a first end 344 of a transverse beam 345. The first lifting truss 330 further comprises a telescoping member 346 having an inner telescoping member 347 and an outer telescoping member 348. The inner telescoping member 347 has a first end 348 pivotally connected to a fore portion 349 of the first 334 supporting frame member. The outer telescoping member 348 has a first end 350 pivotally connected to the second end 338 of the non-telescoping member 340. The second lifting truss 331 comprises similar telescoping and non-telescoping members described above with respect to the first hydraulic lifting truss 330. The members are pivotally secured at one set of ends to the second supporting frame member 335. At the other ends, the non-telescoping member is connected to a second end 351 of the transverse beam 345, while the telescoping member is connected to the end of the non-telescoping member that is itself connected to the second end 351 of the transverse beam 345.

Those having skill in the art will appreciate that supporting frame members 334 and 335 have a length and whose ends may be extended fore or aft of the top bay assembly 317 so as to reduce undesirable bending moments or other loads occurring in the tower when hoisting the wind turbine or blades. While not explicitly illustrated in the figures, one approach to reducing the bending moment, at the expense of increasing the axial load, is to extend the ends of the supporting frame members 334 and 335 aft of the top bay assembly and attaching a counterbalance weight or cable tension to offset the hoisting loads being experienced due to hoisting of the turbine equipment. This approach, or variations thereof, may, moreover, be incorporated into any of the illustrative embodiments disclosed herein.

Figure 20:
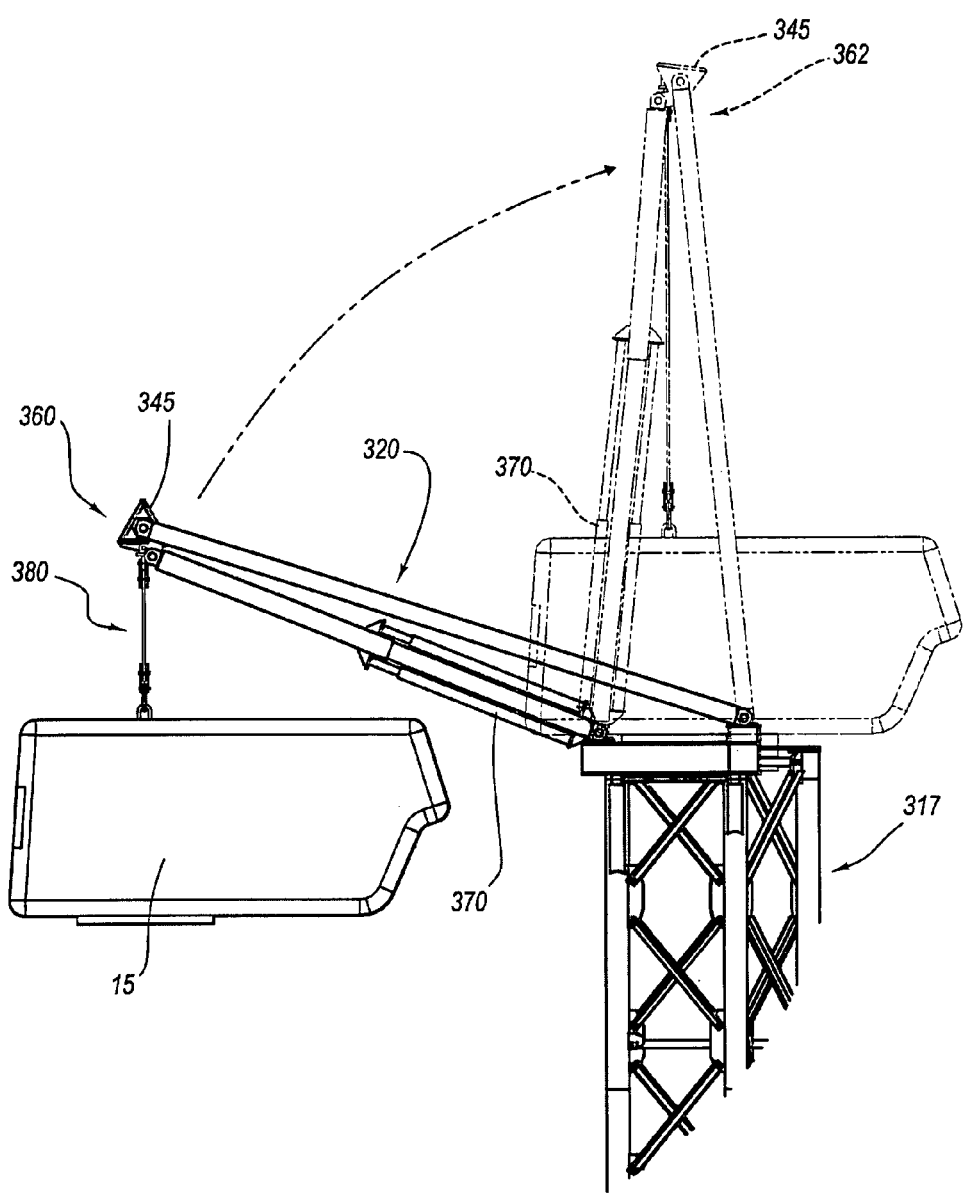
FIG. 20 illustrates the embodiment of the present invention depicted in FIG. 17 pivoting to bring the turbine into position for attachment to the structural tower.

As illustrated in FIGS. 17-20, when constructed in the fashion above described, the transverse beam 339 of the lifting apparatus 320 is pivotable between a first position 360 (see FIG. 20) extending fore of the top bay assembly 317 and a second position 362 (see FIG. 20) extending substantially vertically above the top bay assembly 317. Control of the pivoting movement arises through a pair of hydraulic rams 370 that are operably connected to the telescoping members of each of the first 330 and second 331 lifting trusses. Each hydraulic ram 370 includes a cylinder unit 371 and a piston unit 372. Each cylinder unit 371 includes an end 373 that is connected to the inner member 374 of a corresponding telescoping member 375 and each piston unit 372 includes an end 376 that is connected to the outer member 377 of a corresponding telescoping member 375. When the hydraulic rams 370 are in a retracted position, the lifting apparatus 320 assumes a first position 360 with the transverse beam 345 extending fore of the top bay assembly 317. As illustrated in FIGS. 18-20, this position facilitates the hoisting of the turbine 15 using a rigging assembly 380 in a manner similar to that described above.

Referring now specifically to FIG. 20, following hoisting of the turbine 15, the hydraulic rams 370 are extended causing the lifting apparatus to pivot such that the transverse beam 345 is raised above the top bay assembly 317 to a position where the turbine 15 can be lowered and secured to connecting hardware positioned atop the top bay assembly 317.

Figure 21:
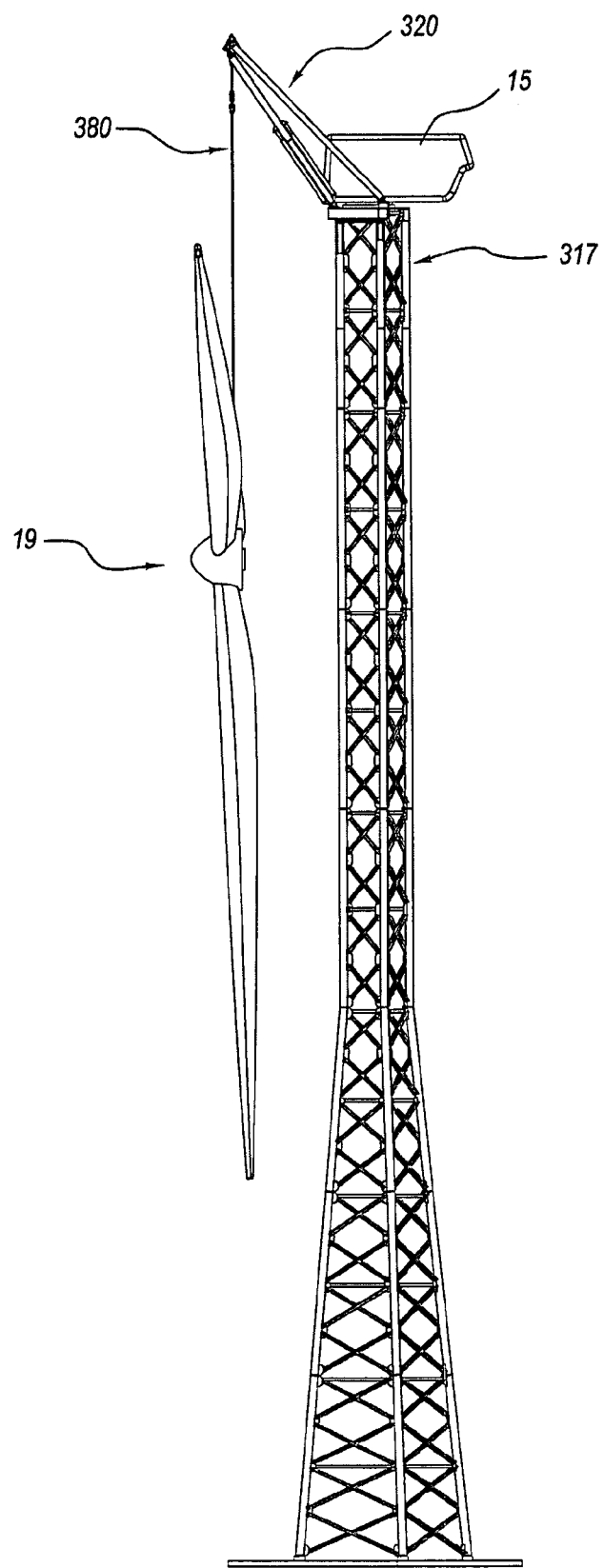
FIG. 21 illustrates the embodiment of the present invention depicted in FIG. 17 hoisting a blade assembly to the top of a tower.
Figure 22:
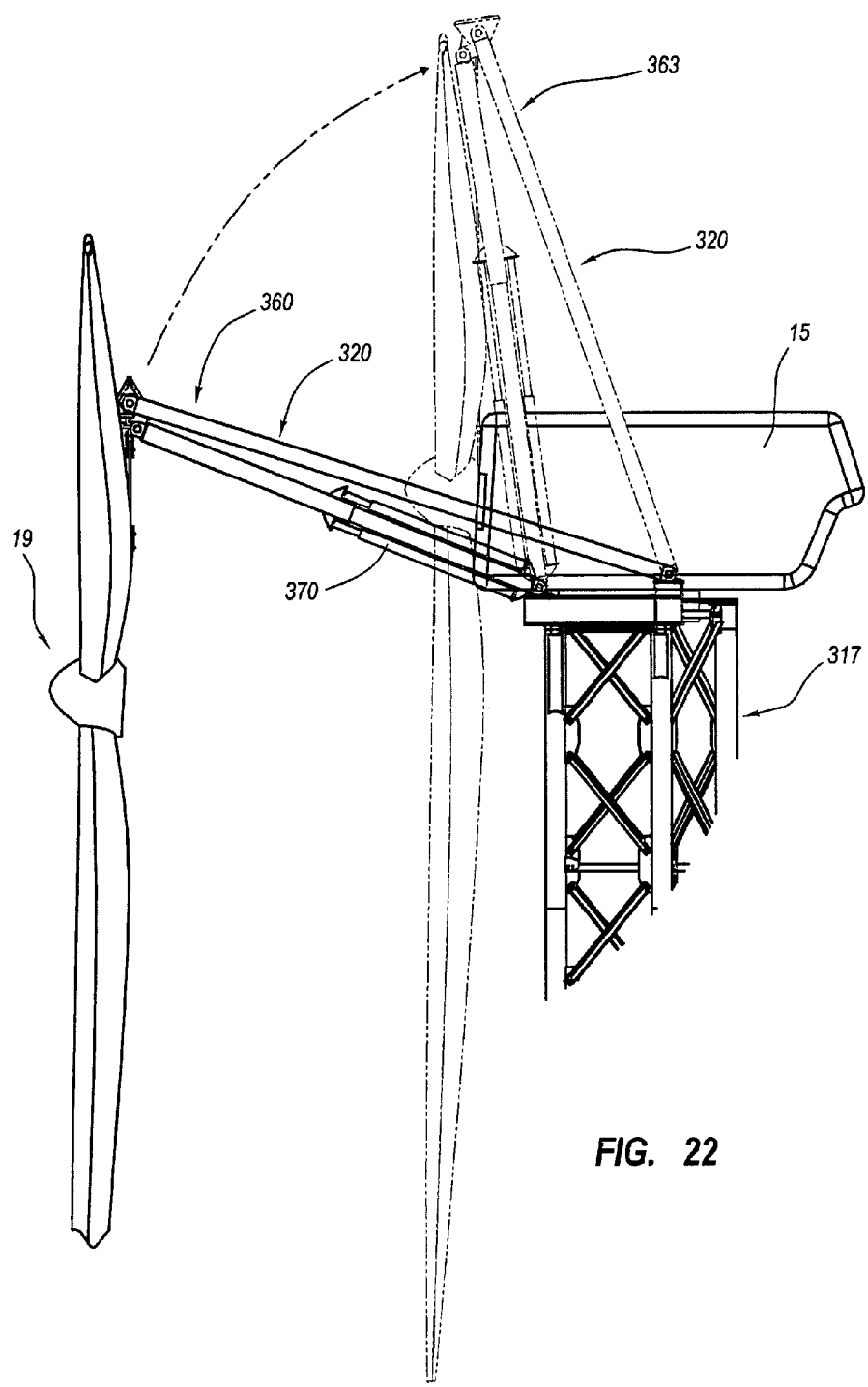
FIG. 22. illustrates the embodiment of the present invention depicted in FIG. 17 pivoting to bring the blade assembly into position for attachment to the structural tower.
Figure 23:
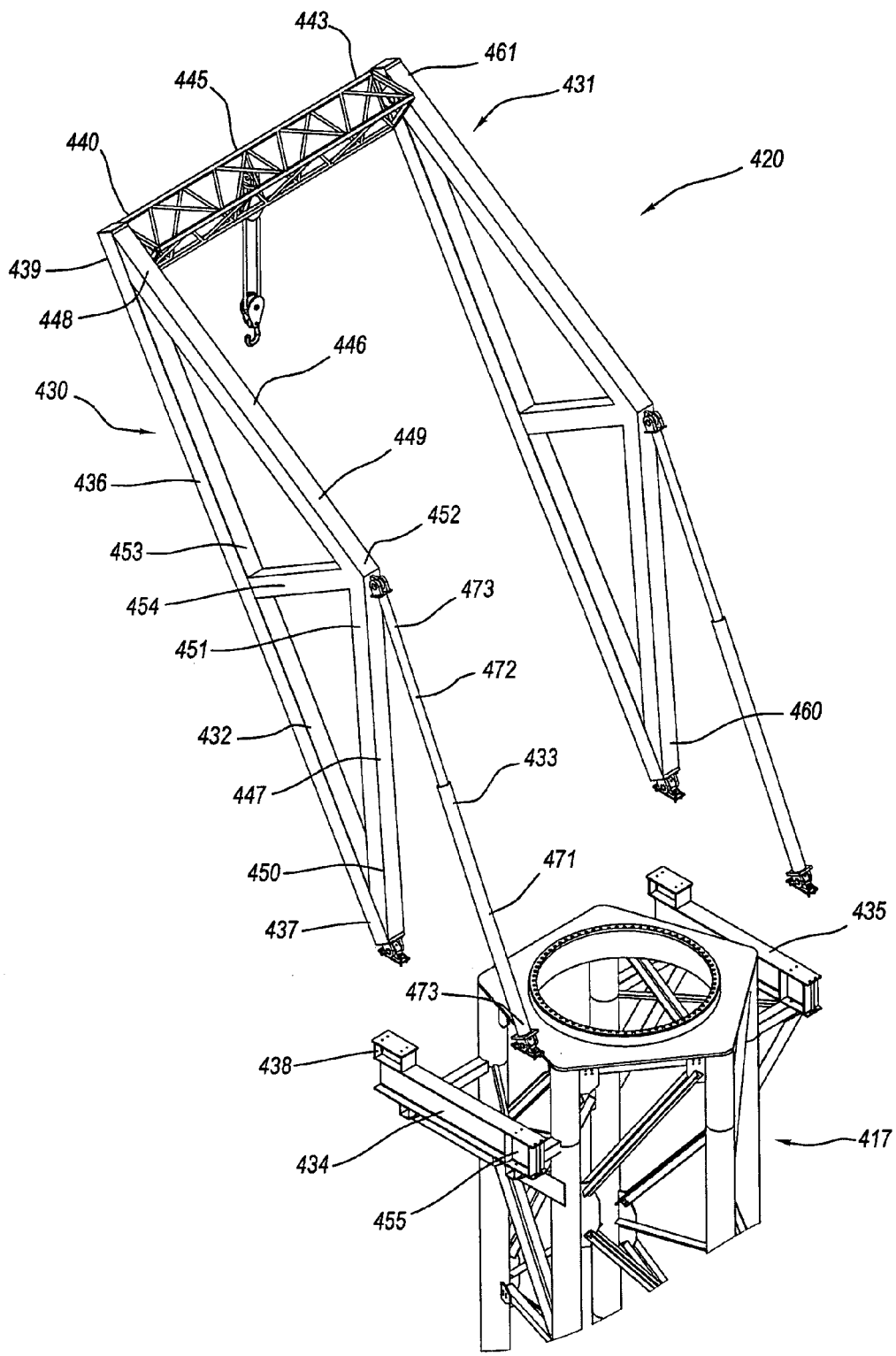
FIG. 23 illustrates a further illustrative embodiment of the lifting frame of the present invention.

Referring now to FIGS. 21 and 22, the blade assembly 19 is next hoisted with the lifting apparatus 320 assuming its first position 360 (see FIG. 22). Following hoisting of the blade assembly 19, the hydraulic rams 370 are extended causing the lifting apparatus to pivot to a second position 363 (see FIG. 22) where the blade assembly 19 can be secured to the driven shaft extending from the turbine 15. Following complete installation of the turbine 15 and blade assembly 19 and removal of the rigging apparatus 380, the lifting apparatus 320 is removed using the same crane employed to construct the tower and hoist and install the lifting apparatus 320 on the top bay assembly 317.

While the foregoing described illustrative embodiment considers a pair of hydraulic rams connected to each telescoping member, those having skill in the art should appreciate that fewer or additional hydraulic rams may be used depending on the loads developed in the hoisting and pivoting process. Furthermore, those having skill in the art should also appreciate that the telescoping members themselves might comprise a hydraulic ram, to the exclusion of or in addition to, the hydraulic pairs of rams described above and illustrated in the drawings.

Referring now to FIGS. 23-26, a further illustrative embodiment of a lifting apparatus 420 connected to and operational with a top bay assembly 417 of a space frame tower is disclosed. The lifting apparatus 420 comprises first 430 and second 431 lifting truss and hydraulic ram assemblies. Each truss and ram assembly generally comprises a lifting truss 432 and a hydraulic ram 433. First 434 and second 435 supporting frame members are connected to and disposed on the sides of the top bay assembly 417. More specifically, the lifting truss 432 of the first assembly 430 comprises a first member 436 having a first end 437 pivotally connected to a fore portion 438 of the first supporting frame member 434 and a second end 439 pivotally connected to a first end 440 of a transverse beam 445. The lifting truss 432 further comprises a second member 446 and a third member 447. The second member 446 has a first end 448 connected to the second end 439 of the first member and a second end 449. The third member 447 has a first end 450 connected to the first end 437 of the first member 436 and a second end 451 connected to the second end 449 of the second member 446 at a connecting joint 452. The second ends 449, 451 of the second 446 and third 447 members are spaced a distance from an intermediate portion of the first member 436, and the connecting joint 452 of the second ends 449, 451 of the second 446 and third 447 members and the intermediate portion 453 of the first member 446 are connected by an internal truss element 454.

Still referring to FIGS. 23-26, the hydraulic ram 433 includes a cylinder unit 471 and a piston unit 472. The cylinder unit 471 includes an end 473 that is pivotally connected to an aft portion 455 of the first 434 supporting frame member, while the piston unit 472 has an end that is pivotally connected to the lifting truss 432 proximate the connecting joint 452 of the second ends 449, 451 of the second 446 and third 447 members. The second truss and ram assembly 431 comprises a lifting truss and hydraulic ram similar to that described above with respect to the first truss and ram assembly 430. The lifting truss is pivotally connected at one end 460 to the second supporting frame member 435, while pivotally connected at the other end 461 to a second end 443 of the transverse beam 445.

Figure 26:
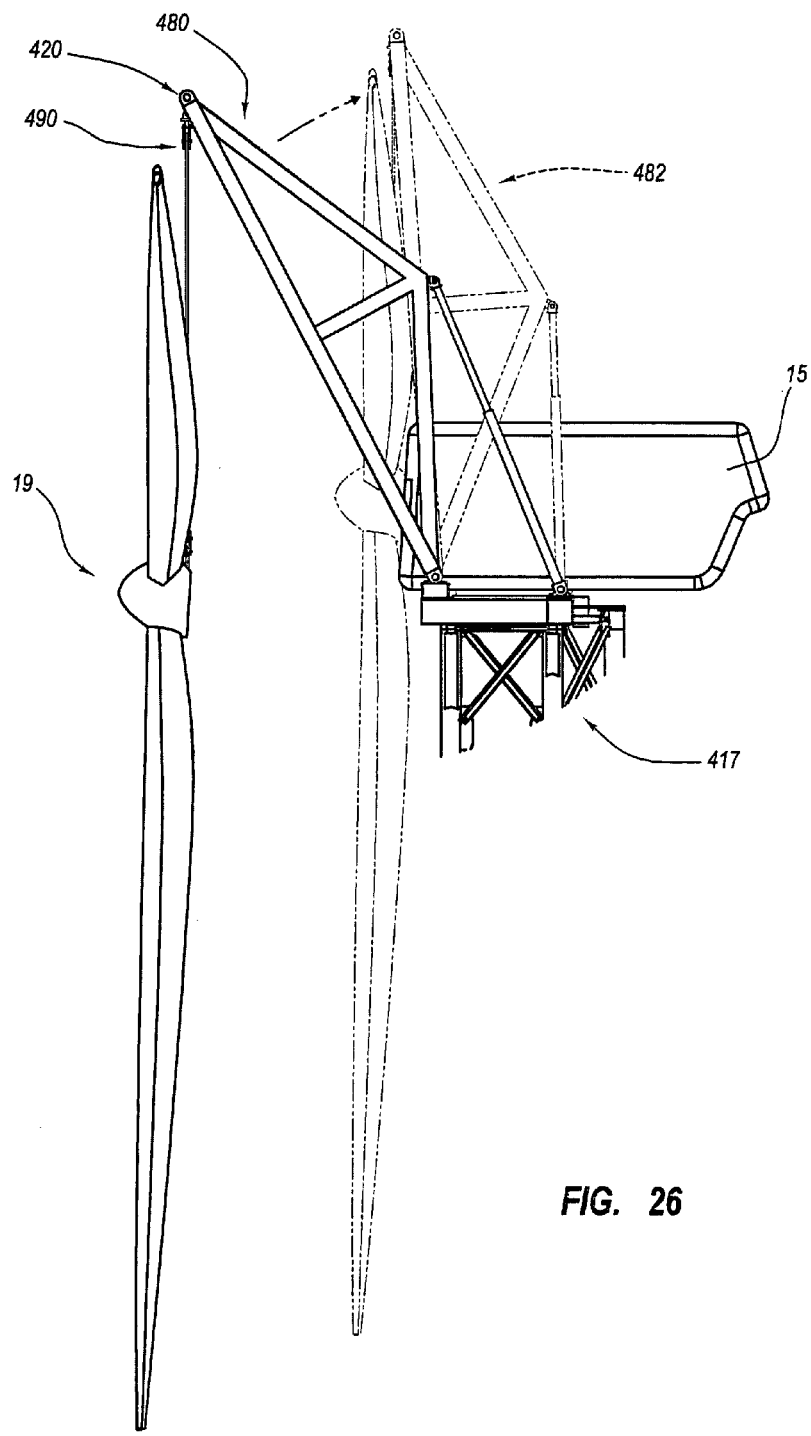
FIG. 26 illustrates the embodiment of the present invention depicted in FIG. 17 pivoting to bring the blade assembly into position for attachment to the structural tower.

As illustrated in FIG. 26, when constructed in the fashion above described, the transverse beam 445 of the lifting frame 420 is pivotable between a first position 480 extending fore of the top bay assembly 417 and a second position 482 extending substantially vertically above the top bay assembly 417. Referring now generally to FIGS. 23-26, control of the pivoting movement arises through the hydraulic rams 433. When the hydraulic rams 433 are in an extended position, the lifting device 420 assumes a position 480 with the transverse beam 445 extending fore of the top bay assembly 417. As illustrated, this position facilitates the hoisting of the turbine 15 using a rigging assembly 490 in a manner similar to that described above. Following hoisting of the turbine 15, the hydraulic rams 433 are retracted causing the lifting apparatus 420 to pivot such that the transverse beam 445 is raised above the top bay assembly 417 to a position where the turbine 15 can be lowered and secured to connecting hardware positioned atop the top bay assembly 417. The blade assembly 19 is next hoisted with the lifting apparatus 420 assuming its fore extending position. Following hoisting of the blade assembly 19, the hydraulic rams 433 are retracted causing the lifting apparatus 420 to pivot to a second position 482 where the blade assembly 19 can be secured to the driven shaft extending from the turbine 15. Following complete installation of the turbine 15 and blade assembly 19 and removal of the rigging apparatus 490, the lifting apparatus 420 is removed using the same crane employed to construct the tower and hoist and install the lifting apparatus 420 on the top bay assembly 417.

While the foregoing described illustrative embodiment considers a single hydraulic ram connected to each lifting truss, those having skill in the art should appreciate that additional hydraulic rams may be used depending on the loads developed in the hoisting and pivoting process. Furthermore, those having skill in the art should also appreciate that the shape and construction of the lifting truss is exemplary and can reasonably assume other shapes and constructions, such as those discussed above with regard to other embodiments of lifting frames.

It will be appreciated that the structures and apparatus disclosed herein are merely one example of a means for lifting a wind turbine from a level approximately adjacent to the foundation to a level above the uppermost level of the top bay assembly, and it should be appreciated that any structure, apparatus or system for lifting a wind turbine from a level approximately adjacent to the foundation to a level above the uppermost level of the top bay assembly which performs functions the same as, or equivalent to, those disclosed herein are intended to fall within the scope of this recited element, including those structures, apparatus or systems which are presently known, or which may become available in the future. Anything which functions the same as, or equivalently to, means for lifting a wind turbine from a level approximately adjacent to the foundation to a level above the uppermost level of the top bay assembly, falls within the scope of this element.

Figure 27:
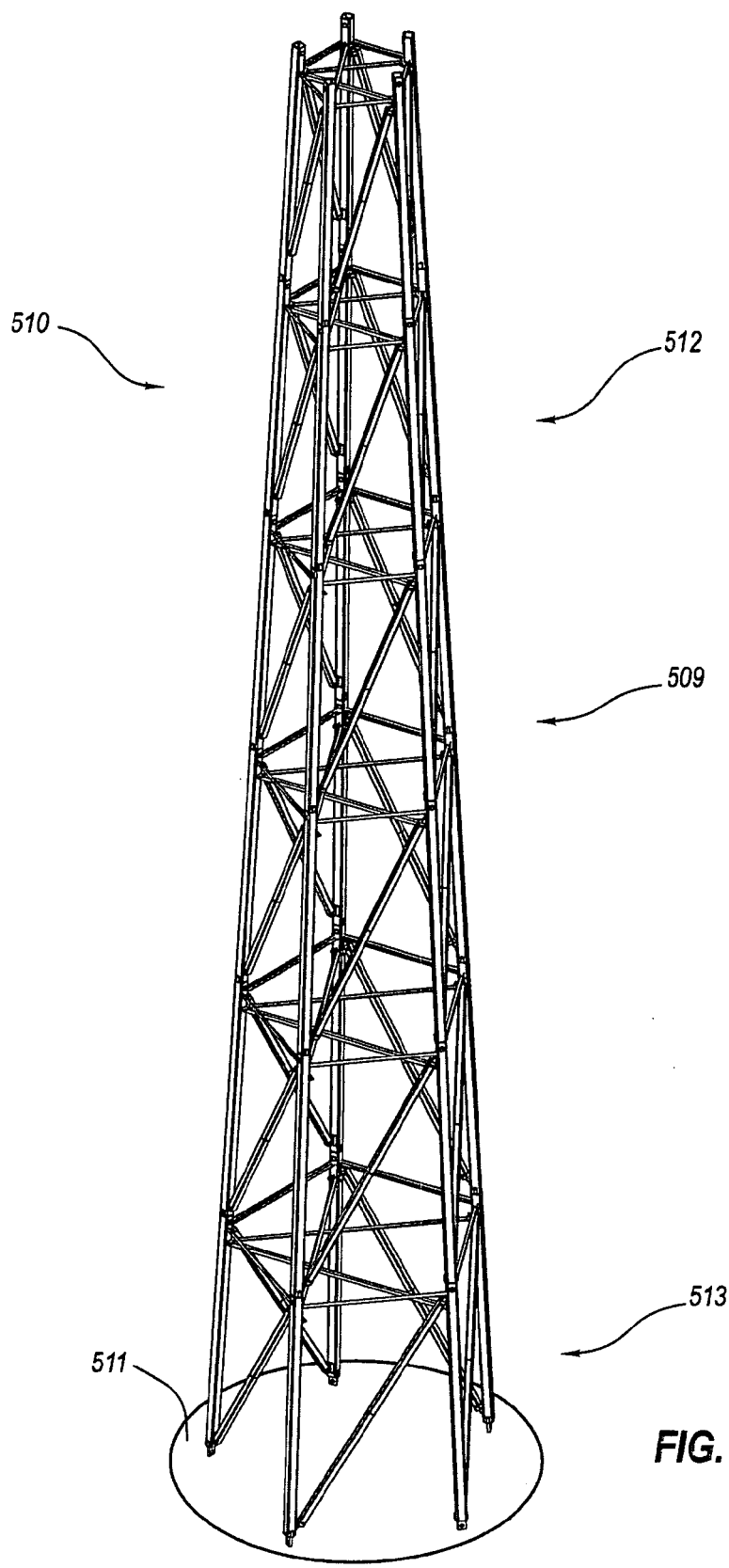
FIG. 27 illustrates a plurality of bay assemblies or sections of a partially constructed structural tower.

Referring now to FIGS. 27-37, a method for constructing a high elevation wind turbine tower and for lifting a wind turbine assembly to the top of a high elevation wind turbine tower is disclosed. Referring now specifically to FIG. 27, a plurality of bay assemblies or bay sections is illustrated assembled and comprising a lower section 509 of a structural tower 510. The lower section 509 includes a lowermost bay assembly 513 secured to a foundation 511 and one or more intermediate bay assemblies 512 constructed on top of the lowermost bay assembly 513. The lower section 509 is constructed using a crane of suitable size and height or, alternatively, may be constructed using a ginpole as hereinafter described with respect to assembly of the upper sections of the structural tower 510.

Figure 28:
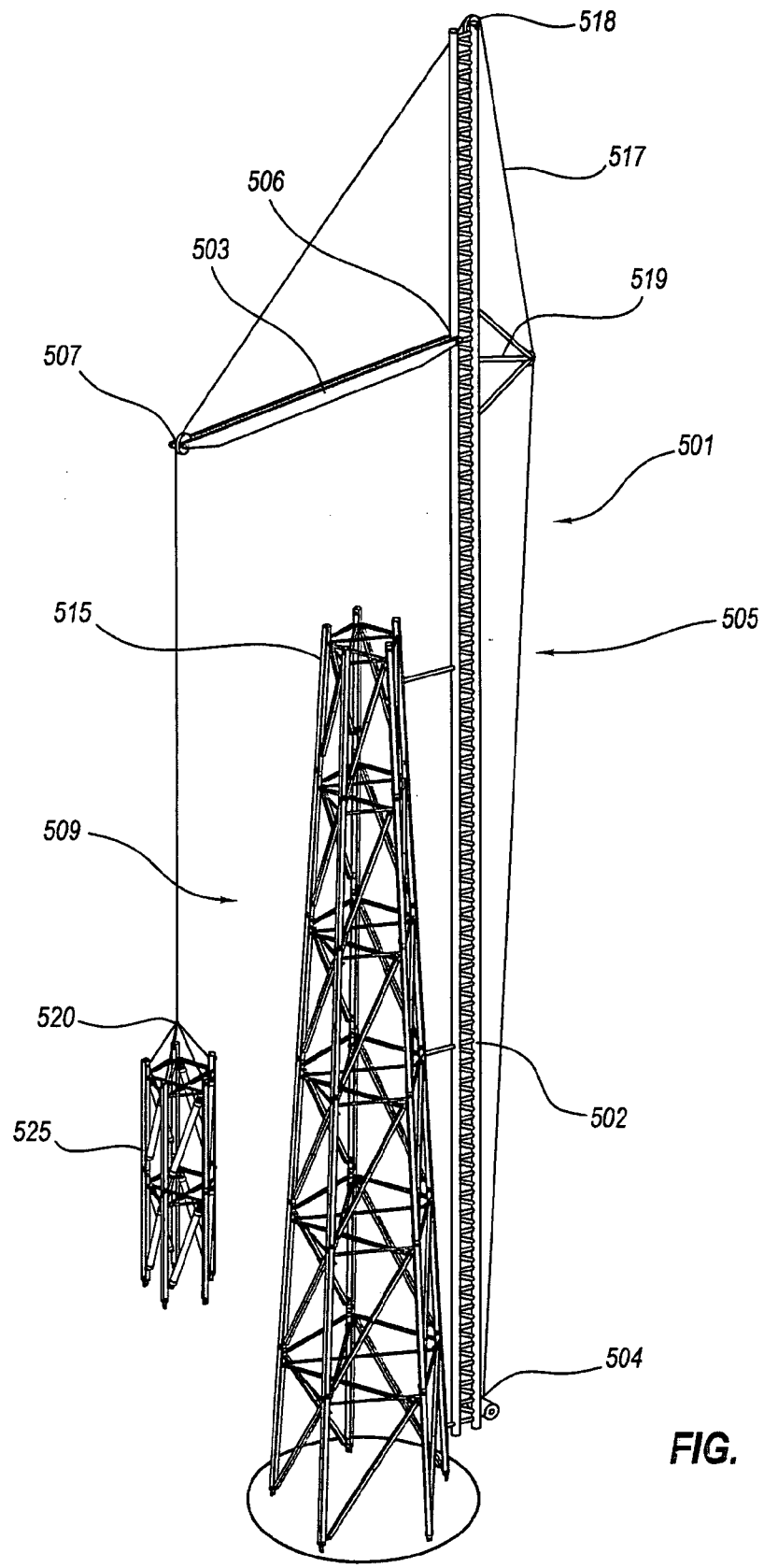
FIG. 28 illustrates the plurality of bay assemblies shown in FIG. 27 with a ginpole assembly attached to the bay assemblies and a cable attached to a free bay assembly readied for hoisting into position.

Referring now to FIG. 28, a ginpole 501 is illustrated attached to a side of the lower section 509. In one illustrative embodiment, the ginpole 501 includes a lengthwise beam 502 and a boom 503. The lengthwise beam 502 has a first end 504 configured for removable attachment to a first location on the structural tower 510—e.g., a location proximate the lowermost bay assembly 513. The lengthwise beam 502 further includes an intermediate portion 505 configured for removable attachment to a second location on the structural tower 510—e.g., a location proximate the upper portion of the lower section 509. In practice, the second location will be higher in elevation along the structural tower 510 than the first location, with the lengthwise span between the first and second locations being dependent, at least in part, on the overall length of the lengthwise beam 502.

The boom 503 includes a first end that is pivotally attached to the lengthwise beam 502 at a pivot point 506 located preferably above or proximate the intermediate portion 505 of the lengthwise beam 502. Pivotal attachment of the boom 503 to the lengthwise beam 502 permits the boom 503 to extend away from the lengthwise beam 502 a transverse distance sufficient to hoist additional bay assemblies for mounting without obstruction by the lowermost bay assemblies of the structural tower 510 where bay diameters may be relatively large compared with the diameters of the uppermost bay assemblies.

Figure 29:
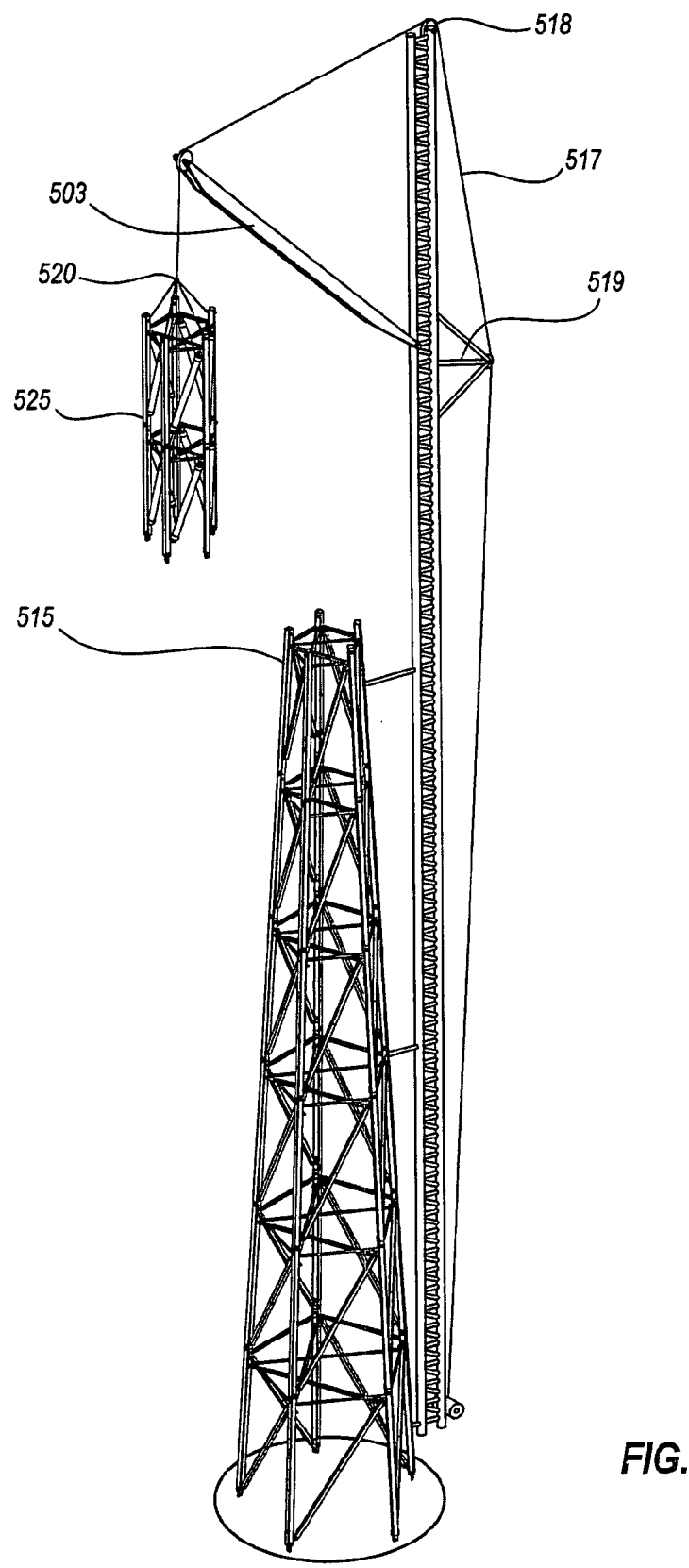
FIG. 29 illustrates the free bay assembly depicted in FIG. 28 being hoisted by the ginpole.
Figure 30:
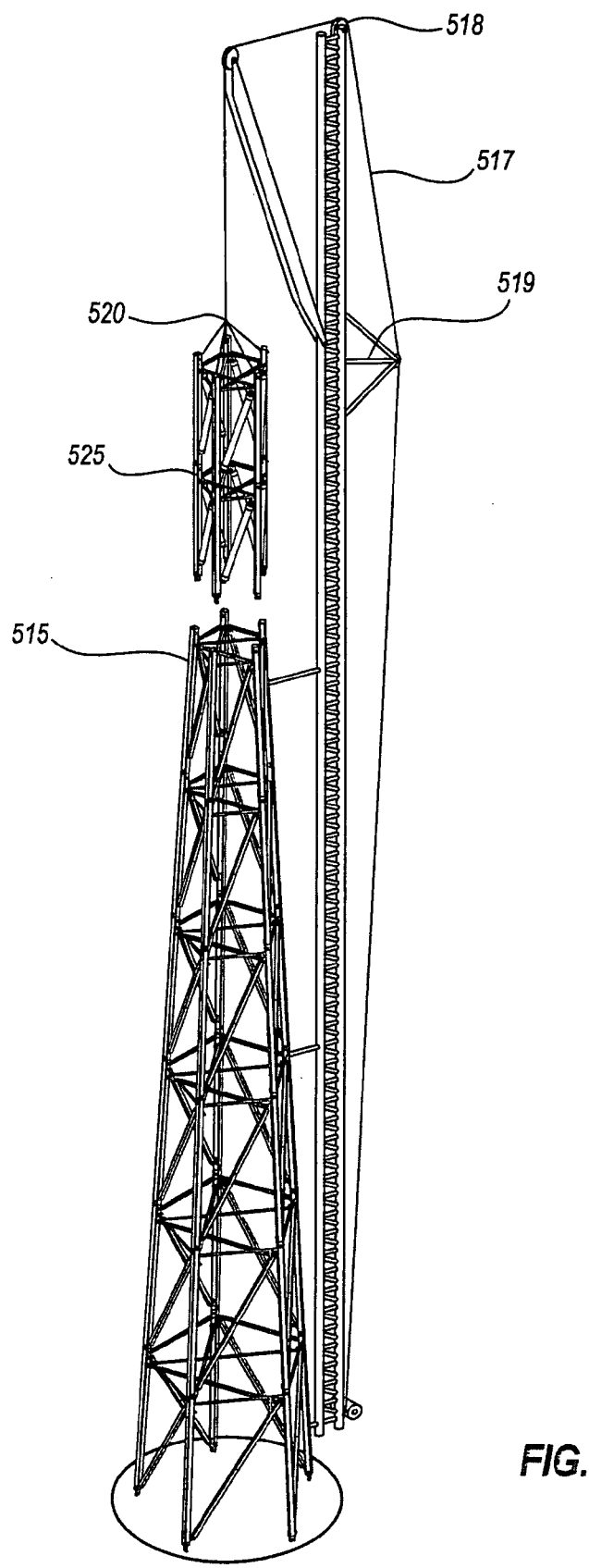
FIG. 30 illustrated the free bay assembly depicted in FIG. 28 being lowered upon an adjacent bay assembly.
Figure 31:
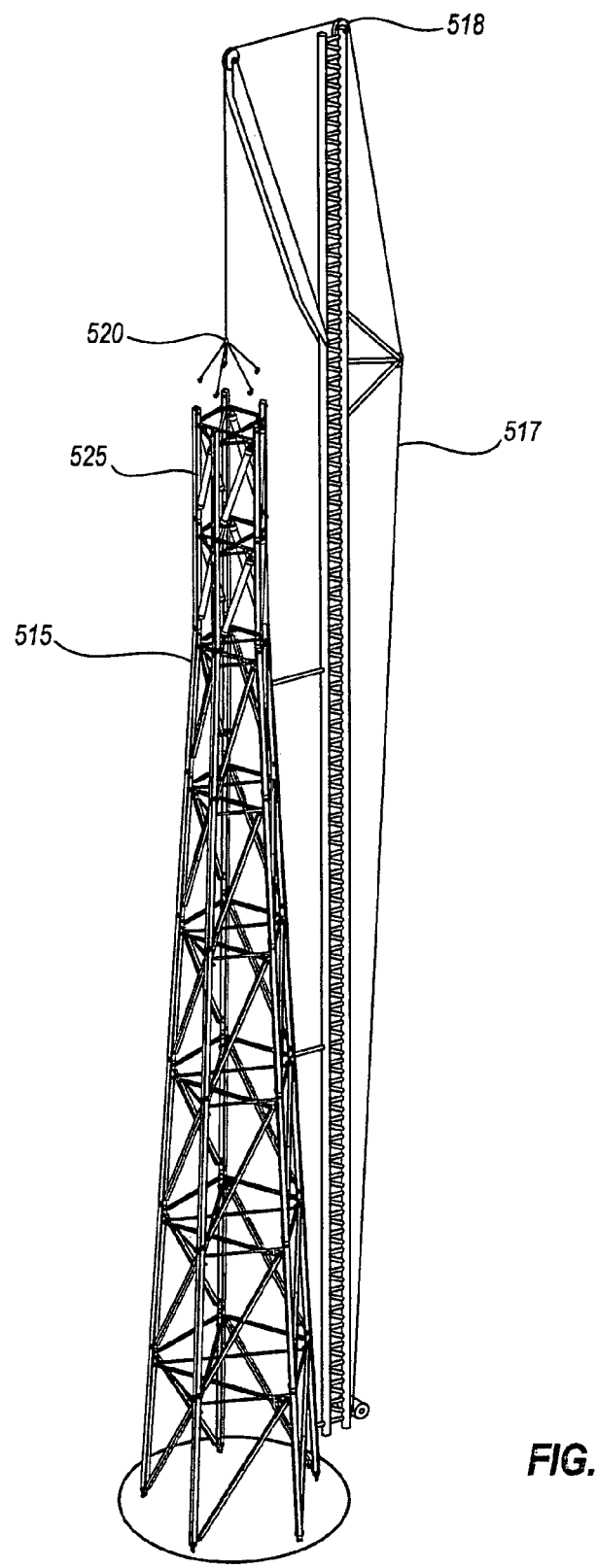
FIG. 31 illustrates the free bay assembly secured to an adjacent bay assembly and the ginpole cable released from the free bay assembly.

As further illustrated in FIGS. 28-30, a cable 517 extends from the first end 504 of the lengthwise beam 502 to a second end 518 of the lengthwise beam 502. In one embodiment, the cable 517 may be separated from the lengthwise beam 502 by a spreader assembly 519. The cable 517 extends from the second end 518 of the lengthwise beam 502 to a second end 507 of the boom 503 and, ultimately, a free end 520 of the cable 517 extends downward from the second end 507 of the boom 503 for removable attachment to a free bay assembly 525 configured for mounting upon a current uppermost bay assembly 515 of the partially constructed structural tower 510. When constructed is this or similar fashion, the boom 503 may be rotated about the pivot point 506 such that the boom 503 extends out over the axial cross section of the current uppermost bay assembly 515. The free end 520 of the cable 517 is then lowered for attachment to a free bay assembly 525. Once attached to the free bay assembly 525, the cable 517 is used to hoist the free bay assembly 525 upward for mounting on the current uppermost bay assembly 515. When hoisted to an elevation sufficient to clear the current uppermost bay assembly 515, the boom 502 is rotated about the pivot point 506 such that the free bay assembly 525 is translated into axial alignment with the current uppermost bay assembly 515. Once in axial alignment, the free bay assembly 525 is lowered by the cable 517 into contact with the current uppermost bay assembly 515 and secured thereto using pins, bolts or welds as described, for example, in U.S. patent application Ser. No. 11/433,147.

Following attachment of the free bay assembly 525 to the then-current uppermost bay assembly 515, the ginpole 501 is elevated to a new location on the partially completed structural tower 510. While various techniques for raising gin poles are known in the art, one illustrative embodiment advantageous for use with the present disclosure employs jump cabling as discussed below. The process of hoisting a free bay assembly 525 and securing it to a then-current uppermost bay assembly 515, interspersed with elevating the gin pole 501-(as needed) to a new location on the partially constructed tower 510, is repeated until an uppermost bay assembly is elevated and secured to the structural tower 510.

It will be appreciated that the structures and apparatus disclosed herein are merely one example of a means for securing an intermediate bay assembly on top of the base bay assembly and a means for securing a top bay assembly on top of the intermediate bay assembly, and it should be appreciated that any structure, apparatus or system for securing structural members of a tower which performs functions the same as, or equivalent to, those disclosed herein are intended to fall within the scope of this recited element, including those structures, apparatus or systems which are presently known, or which may become available in the future. Anything which functions the same as, or equivalently to, means for securing structural members of a tower which performs functions the same as, falls within the scope of this element.

Figure 32:
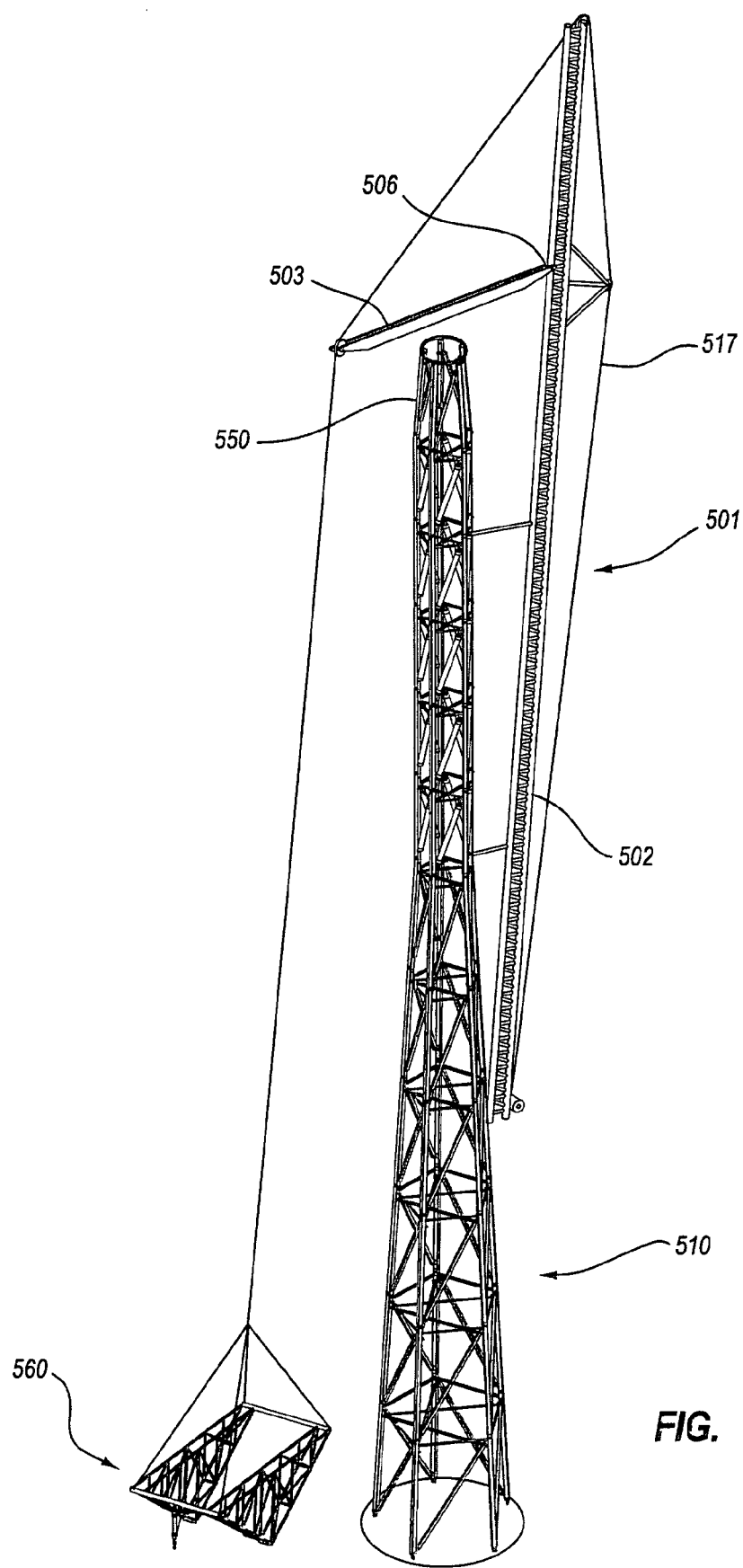
FIG. 32 illustrates the ginpole being used to hoist a lifting frame.

Referring now to FIG. 32, an uppermost bay assembly 550 is illustrated having been elevated and secured to structural tower 510. In addition, the ginpole 501 is illustrated being positioned ready to hoist a lifting frame or apparatus 560—e.g., the ginpole 501 is repositioned, if necessary, to a new elevation and the boom 503 is rotated about the pivot point 506 such that the boom 503 extends out over the axial cross section of the uppermost bay assembly 550 in position for hoisting the lifting apparatus 560.

Referring now to FIG. (35), the lifting apparatus 560 is illustrated having been hoisted to the top of the structural tower 510 (which can be substantially similar to tower 510 in FIG. 33) using the cable 517 and then lowered by the cable 517 into contact with the uppermost bay assembly 550 and secured thereto as described in one or more of the various embodiments above disclosed.

Figure 33:
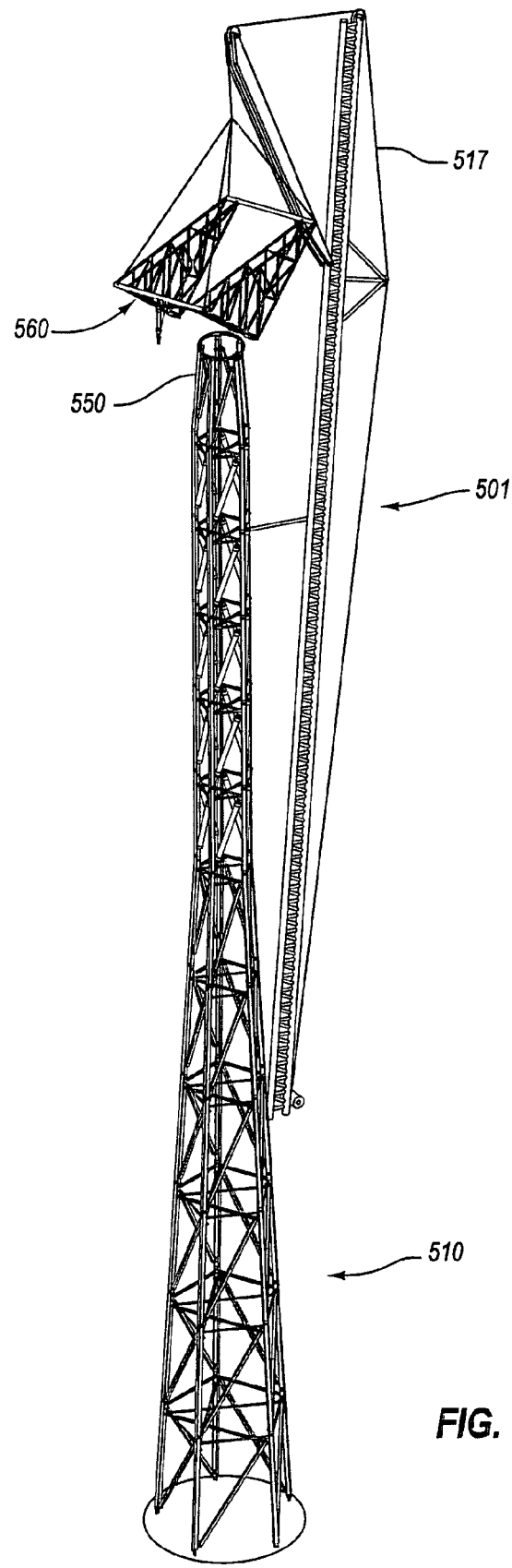
FIG. 33 illustrates the lifting frame being lowered onto an uppermost bay assembly.
Figure 34:
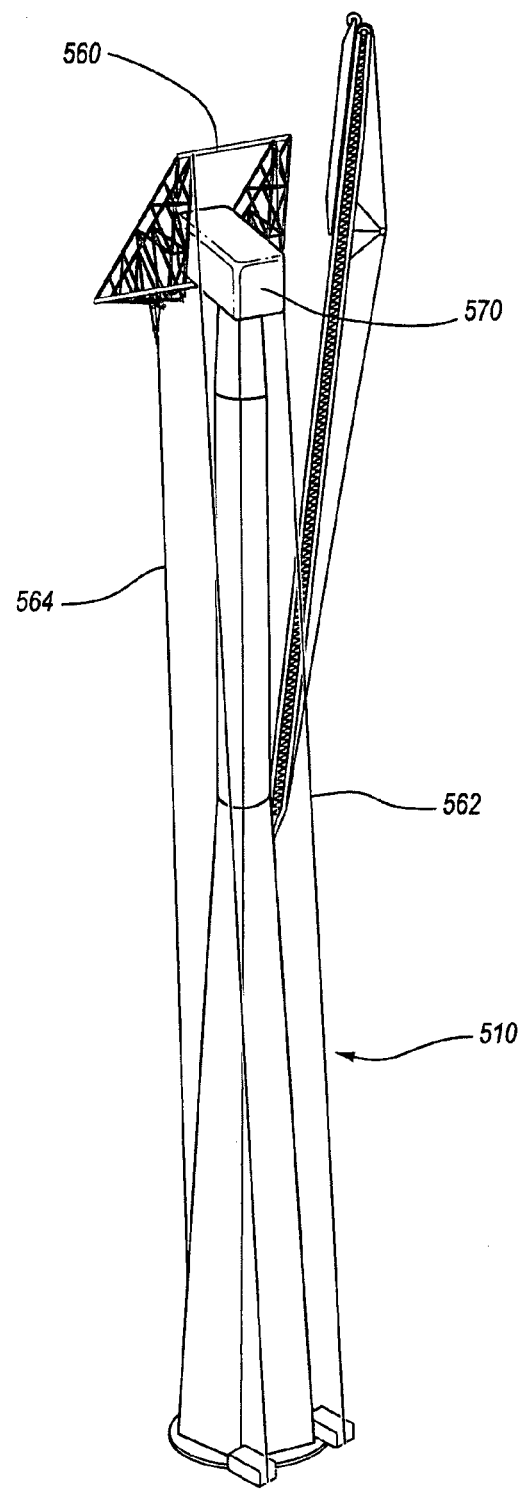
FIG. 34 illustrates the lifting frame being used to position a wind turbine on the uppermost bay assembly.
Figure 35:
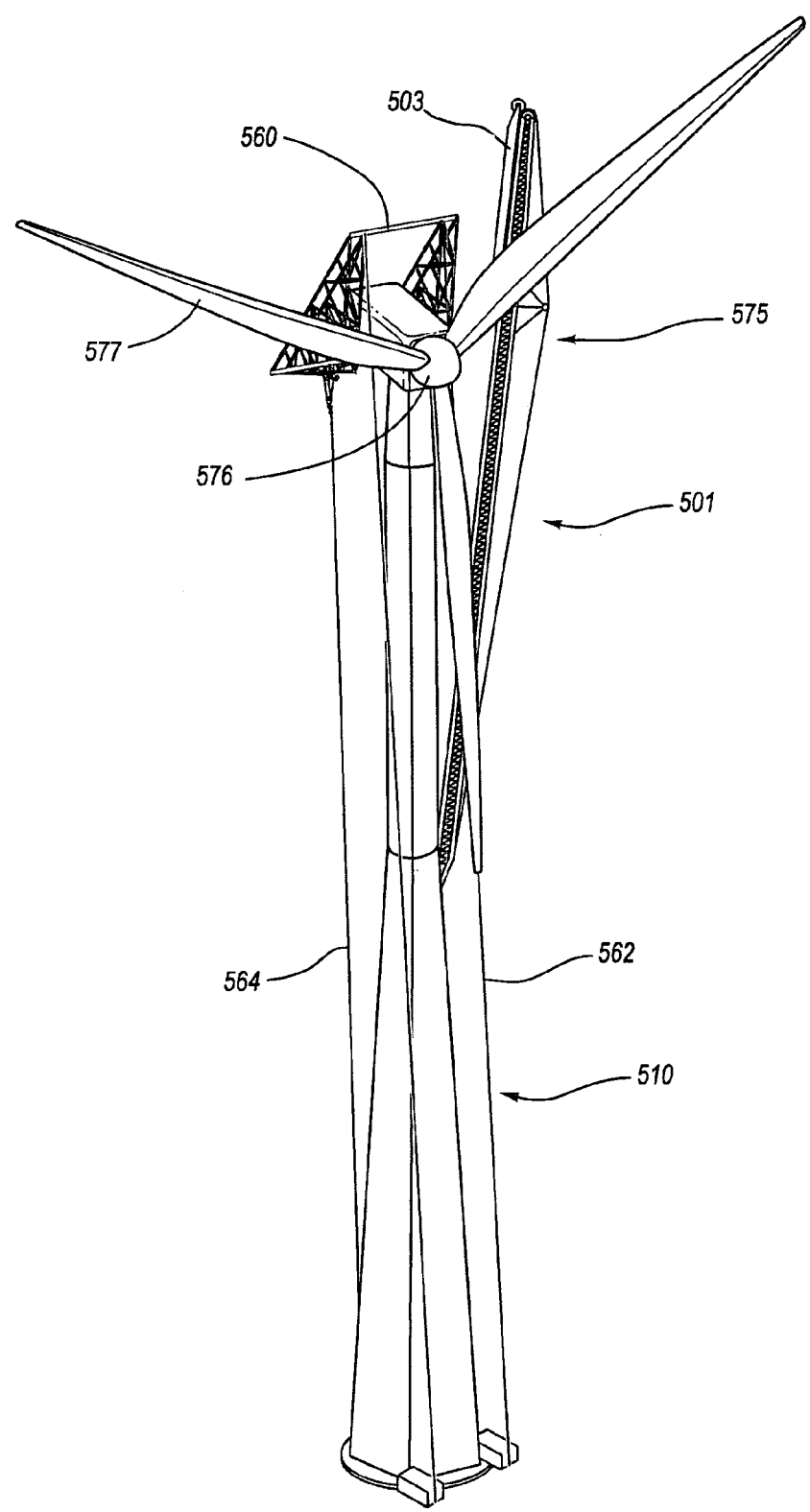
FIG. 35 illustrates the lifting frame being used to position a blade assembly unto the wind turbine.

Referring now to FIGS. 33 and 34, the lifting apparatus 560 is illustrated as having a rigging assembly 562 and pivot control cable 564 for hoisting and positioning a turbine 570 or blade assembly 575 into place as variously disclosed above. More specifically, once the lifting apparatus 560 is positioned and secured into place atop the uppermost bay assembly 550, any remaining cabling necessary for the hoisting and positioning operations is installed.

Once any cabling necessary for the hoisting and positioning operations is installed, the lifting apparatus 560 is then used to hoist the turbine 570 into position atop the uppermost bay assembly 550 as disclosed above. Thereafter, the lifting apparatus 560 is used to hoist and position the blade assembly 575 or, alternatively, the rotor 576 followed by individual blades 577, into position on the turbine 570 also as disclosed above. During the hoisting and positioning operations, the ginpole 501 and the boom 503 may be positioned away from the lifting apparatus (or completely removed from the tower) to avoid interfering with the lifting apparatus 560 or the turbine 570 or blade assembly 575.

Figure 36:
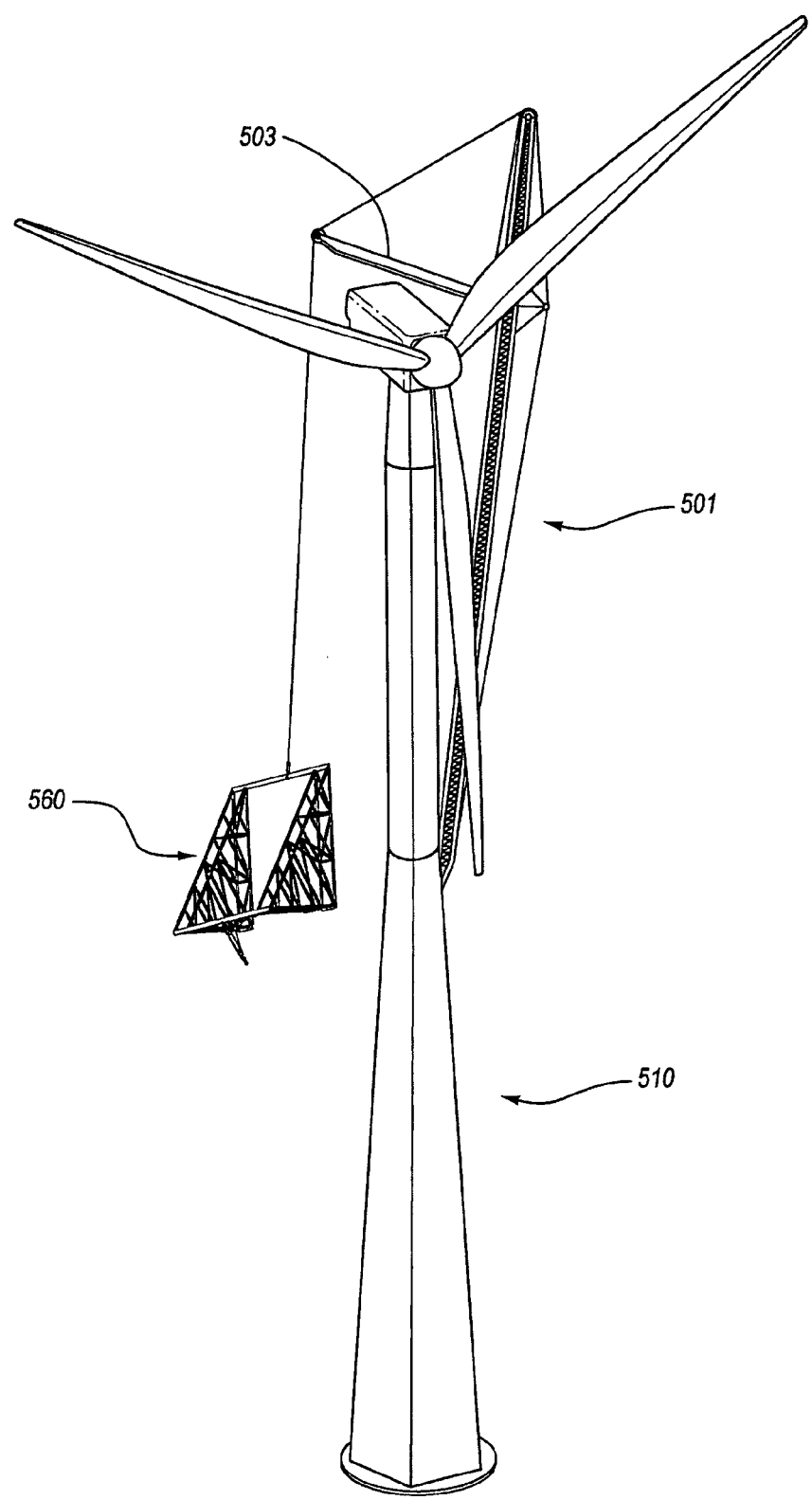
FIG. 36 illustrates the lifting frame being lowered to the ground using the ginpole.
Figure 37:
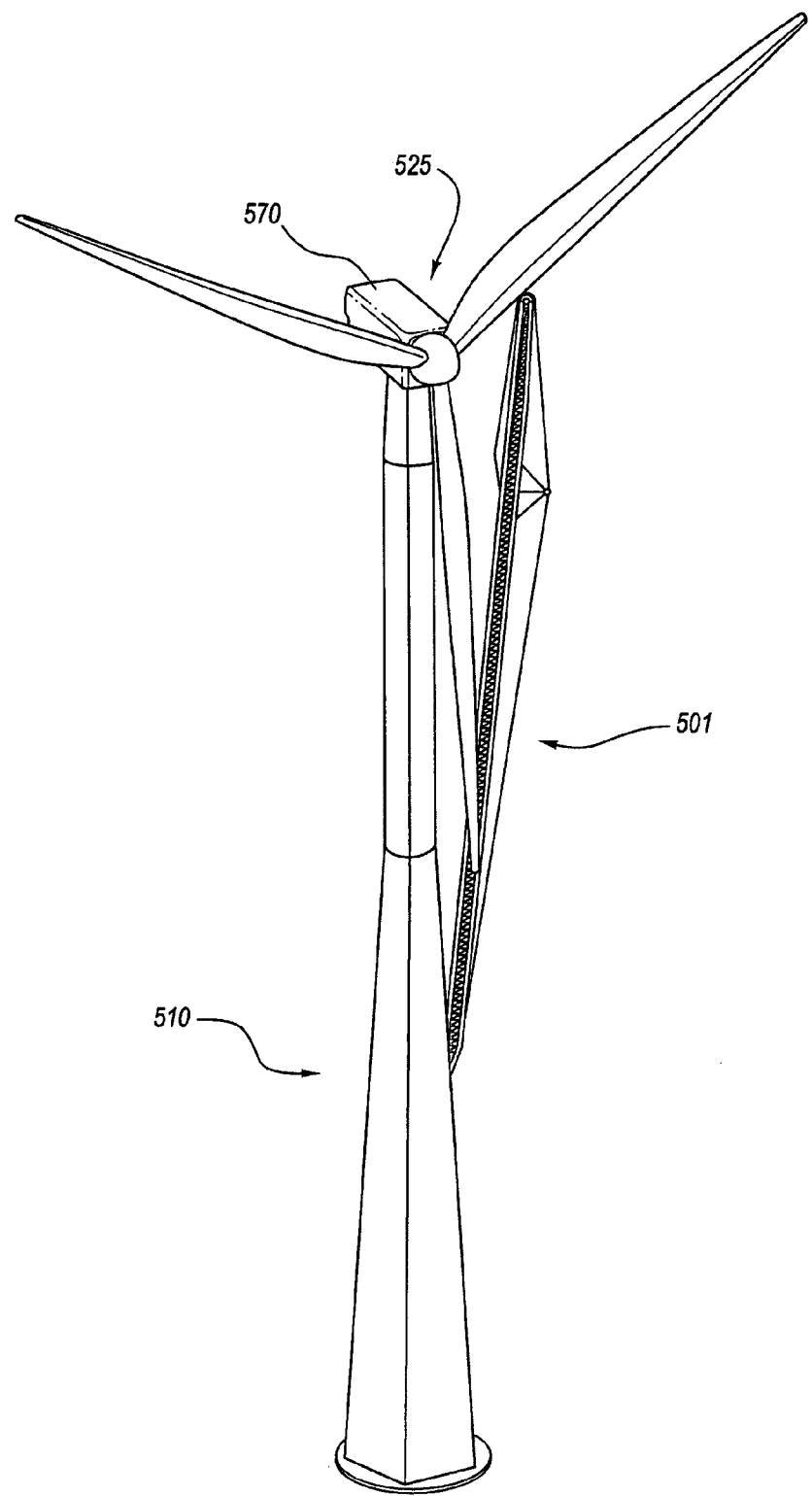
FIG. 37 illustrates the ginpole being lowered along side the assembled structural tower.

Referring now to FIGS. 36 and 37, following positioning of the turbine 570 and blade assembly 575 into their respective proper positions, the ginpole 501 is repositioned as necessary to lower the lifting apparatus 560 after it has been detached from the uppermost bay assembly 550. Following detachment and lowering of the lifting apparatus 560 from the tower 510, the ginpole 501 is lowered from the tower in the reverse order of being raised or a variation thereof.

Those skilled in the art and familiar with the disclosure provided herein and above will recognize various modifications to the above disclosed method of assembly using a ginpole 501 or similar apparatus. First, while the method is described with reference to a specific lifting apparatus 560, it is apparent that the method of construction may be equally accomplished using any of the lifting apparatus or modifications thereof disclosed herein. Second, it is also apparent that the steps involved in raising or lowering the ginpole 501 along the structural tower will depend, at least in part, on the length of the ginpole 501 or, specifically, the length of the longitudinal beam. In other words, a relatively long lengthwise beam 502 may permit hoisting and positioning of two or more free bay assemblies—either together or one at a time—between steps of raising the ginpole. Third, while a specific ginpole has been described as having a lengthwise beam and boom pivotally attached thereto, those skilled in the art will recognize that suitable alternative ginpole constructions may be used to carry out the hoisting and positioning operations. Fourth, while the method of assembly describes hoisting and positioning free bay assemblies using the ginpole, it is apparent that individual longitudinal, diagonal or horizontal members, or combinations thereof, may be hoisted and positioned into place using a ginpole. Indeed, the hoisting and positioning of individual components or sub-assemblies of the free bay assemblies would permit the use of smaller ginpoles in the construction process. Fifth, it is apparent that the method described above in constructing a tower and hoisting and positioning of the turbine and blade assembly can be reversed in steps to disassemble a tower or to repair or replace a turbine or blade assembly or even an individual blade that may become damaged during operation of the wind turbine. In addition, it should be apparent that a ginpole itself can be used—exclusive of a lifting frame or apparatus—to not only hoist and position the free bay assemblies, but also to hoist and position the turbine and blade assembly as well.

Figure 38:
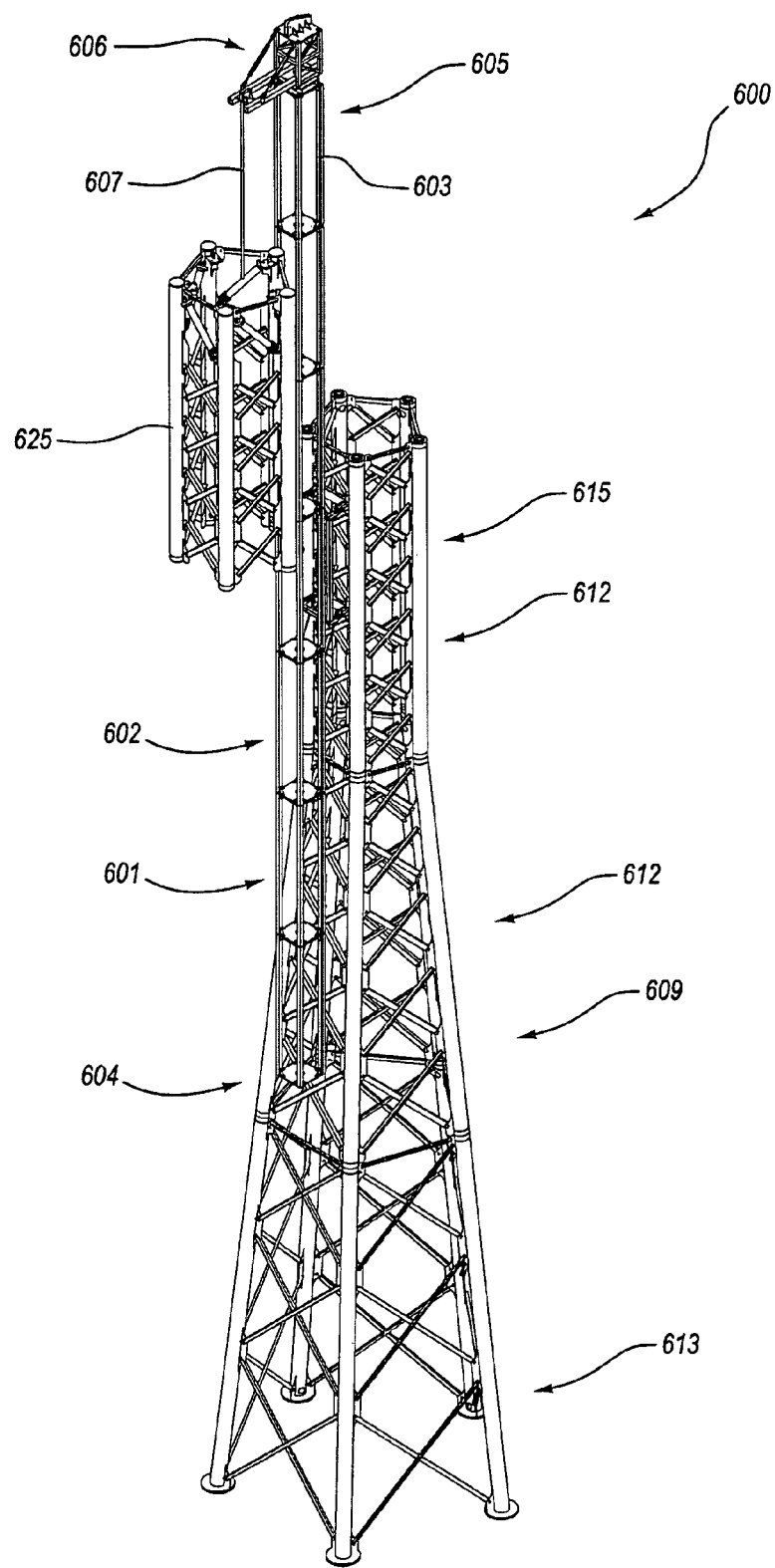
FIG. 38 illustrates an alternative illustrative embodiment of a ginpole being used to hoist a free bay assembly into position.

Referring now to FIGS. 38-44, an alternative method for assembling a structural tower having a wind turbine and blade assembly is disclosed. In one embodiment, as illustrated in FIG. 38, one or more bay assemblies or bay sections are assembled and comprise a lower section 609 of a structural tower 610. The lower section 609 includes a lowermost bay assembly 613 secured to a foundation (not explicitly illustrated) and may include one or more intermediate bay assemblies 612 constructed on top of the lowermost bay assembly 613. The lower section 609 (which may be considered to comprise the lowermost bay assembly 613 and, if desired, one or more intermediate bay assemblies 612) is constructed using a crane of suitable size and height.

Referring still to FIG. 38, a ginpole 601 is next attached to a side of the partially constructed structural tower 610. In one embodiment, the ginpole 601 includes a lengthwise beam 602 comprising a plurality of members 603 secured together by a plurality of diagonal or horizontal members (not explicitly illustrated). The lengthwise beam 602 has a first end 604 and a second end 605 that extends upwardly from the first end 604. A rooster head 606 is rotatably secured to the second end 605 of the ginpole 601. A cable 607 extends from the rooster head 606 for raising or lowering free bay assemblies or the lifting apparatus of the present invention. The ginpole 601 is removably attached to the structural tower 610 using means generally known in the art (although a specific illustrative embodiment is described below).

Figure 39:
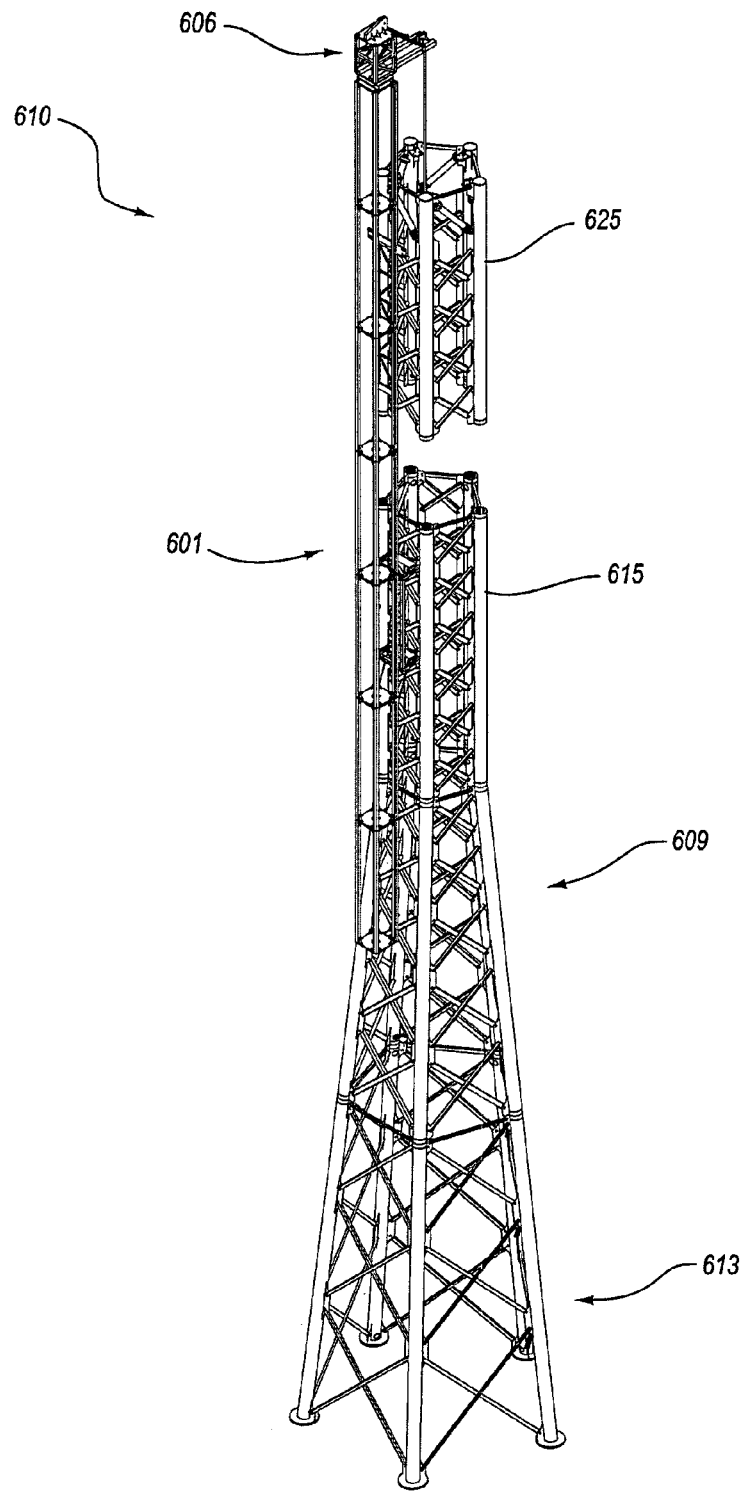
FIG. 39 illustrates the free bay assembly depicted in FIG. 38 being lowered upon an adjacent bay assembly.
Figure 40:
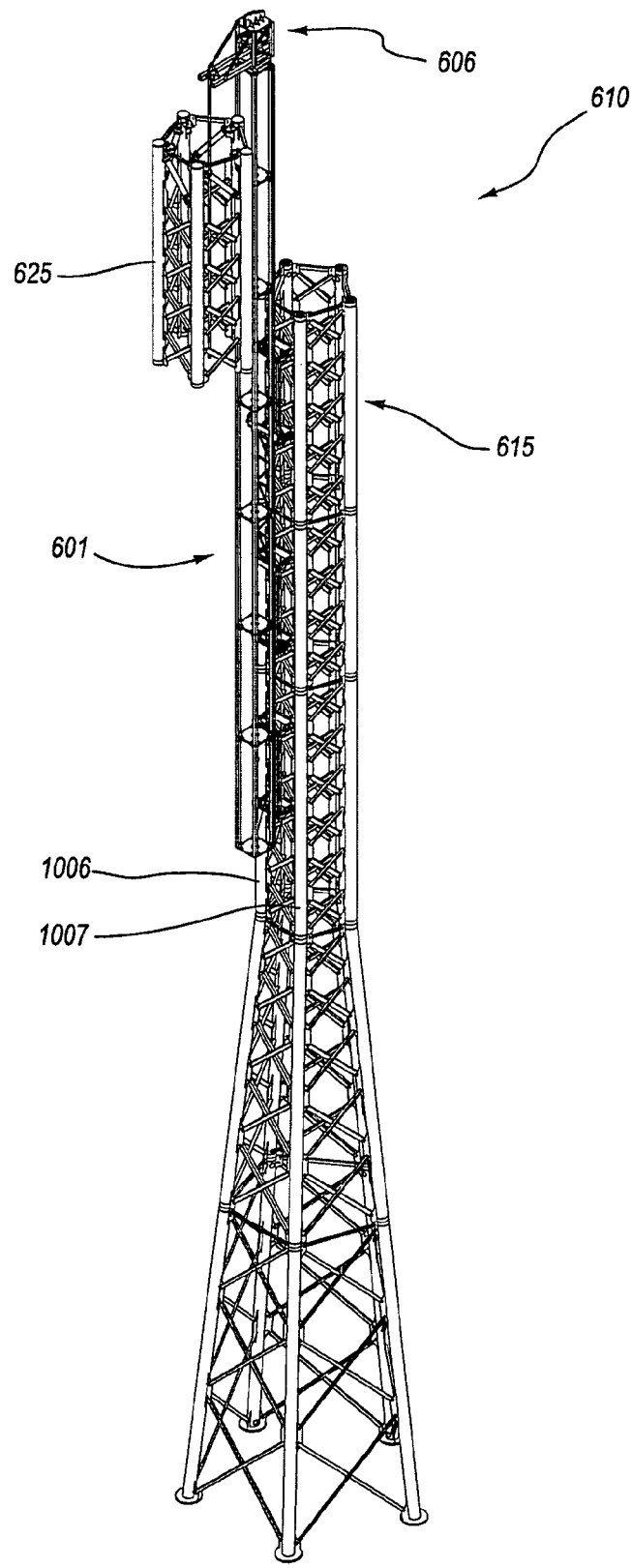
FIG. 40 illustrates a further free bay assembly being hoisted into position by the ginpole depicted in FIG. 38.

Referring again to FIGS. 38-44, a sequence of steps is illustrated for assembling the structural tower and assembling a wind turbine and blade assembly thereon using the ginpole 601. As described above, a lower portion 609 of the structural tower 610 is assembled and secured to a foundation using a crane or other suitable means. A gin pole 601 is then attached to the structural tower, typically using the same crane to hoist the ginpole into an initial location on the partially assembled structural tower 610. Once the ginpole is attached to the tower, the rooster head 606 is swiveled outward from the tower such that the cable 607 may be lowered and attached to a free bay assembly 625 positioned on the ground. The free end of the cable 607 is then lowered for attachment to the free bay assembly 625. Once attached to the free bay assembly 625, the cable 607 is used to hoist the free bay assembly 625 upward for mounting on the current uppermost bay assembly 615. When hoisted to an elevation sufficient to clear the current uppermost bay assembly 615, the rooster head 606 is rotated about the ginpole 601 such that the free bay assembly 625 is translated into axial alignment with the current uppermost bay assembly 615. Once in axial alignment, the free bay assembly 625 is lowered by the cable 607 into contact with the current uppermost bay assembly 615 and secured thereto using pins, bolts or welds as described, for example, in U.S. patent application Ser. No. 11/433,147. Following attachment of the free bay assembly 625 to the then-current uppermost bay assembly 615, the ginpole 601 may be elevated to a new location on the partially completed structural tower 610 and the process repeated as illustrated in FIGS. 38-40.

Figure 41:
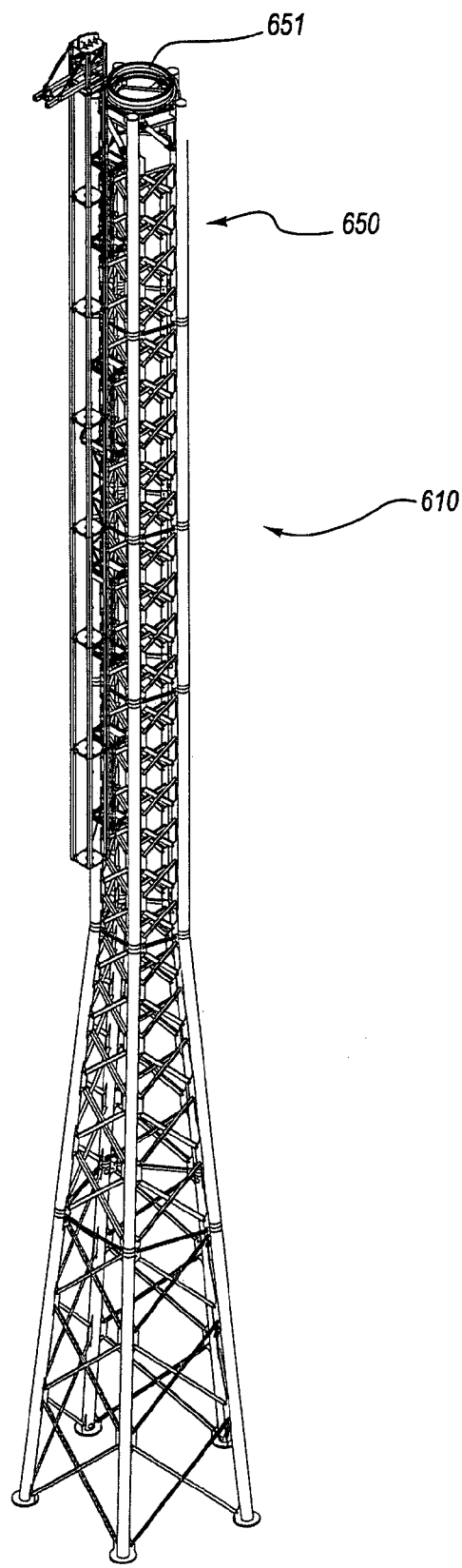
FIG. 41 illustrates an uppermost bay assembly secured to the structural tower after being positioned by the ginpole depicted in FIG. 38.
Figure 42:
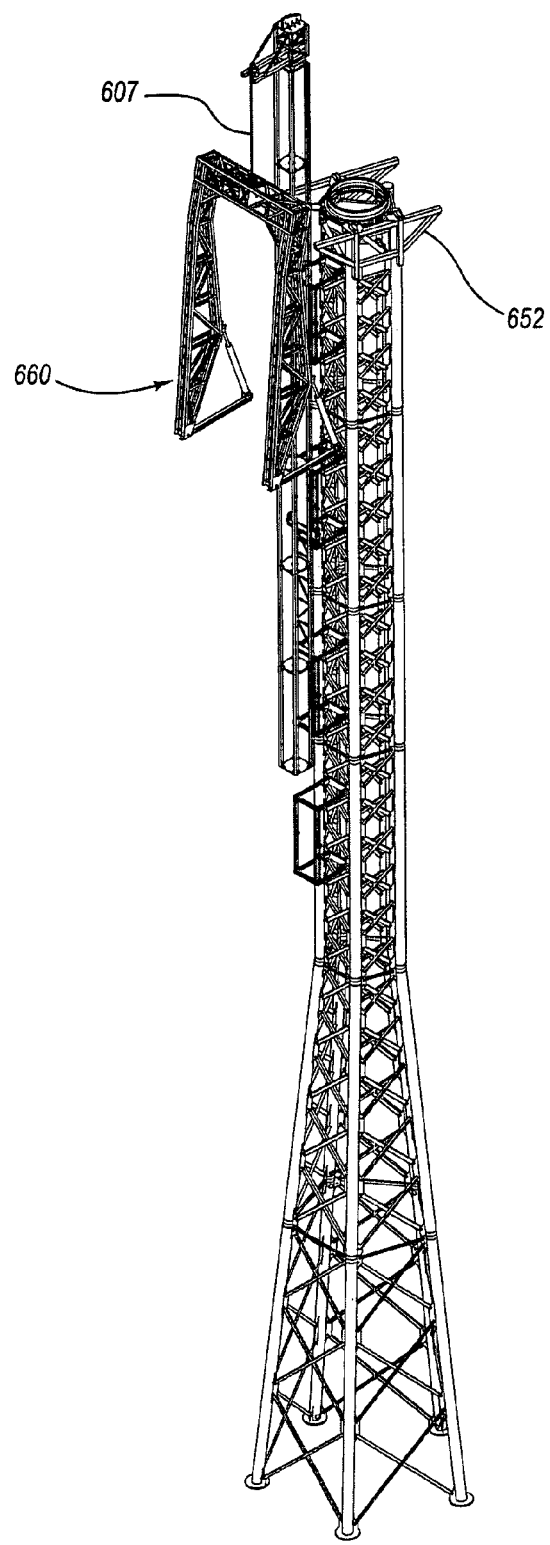
FIG. 42 illustrates a lifting frame being hoisted into position using the ginpole depicted in FIG. 38.

Referring now to FIG. 41, an uppermost bay assembly 650 is illustrated having been elevated and secured to structural tower 610. As discussed previously, the uppermost bay assembly 650 may include or have attached thereto a ring member 651 upon which a turbine may be rotatably positioned. Referring now to FIG. 42, the ginpole 601 is again raised following placement of the uppermost bay assembly 650. The rooster head 606 is then repositioned for hoisting of a lifting apparatus 660. The lifting apparatus 660 is then hoisted to the top of the structural tower 610 using the cable 607 where it may be lowered by the cable 607 into contact with the uppermost bay assembly 650 and secured thereto as described in one or more of the various embodiments above disclosed. In the representative embodiment illustrated in FIG. 42, the lifting frame 660 is lowered upon and secured to a support frame 652 that is itself secured to the uppermost bay assembly 650.

Figure 43:
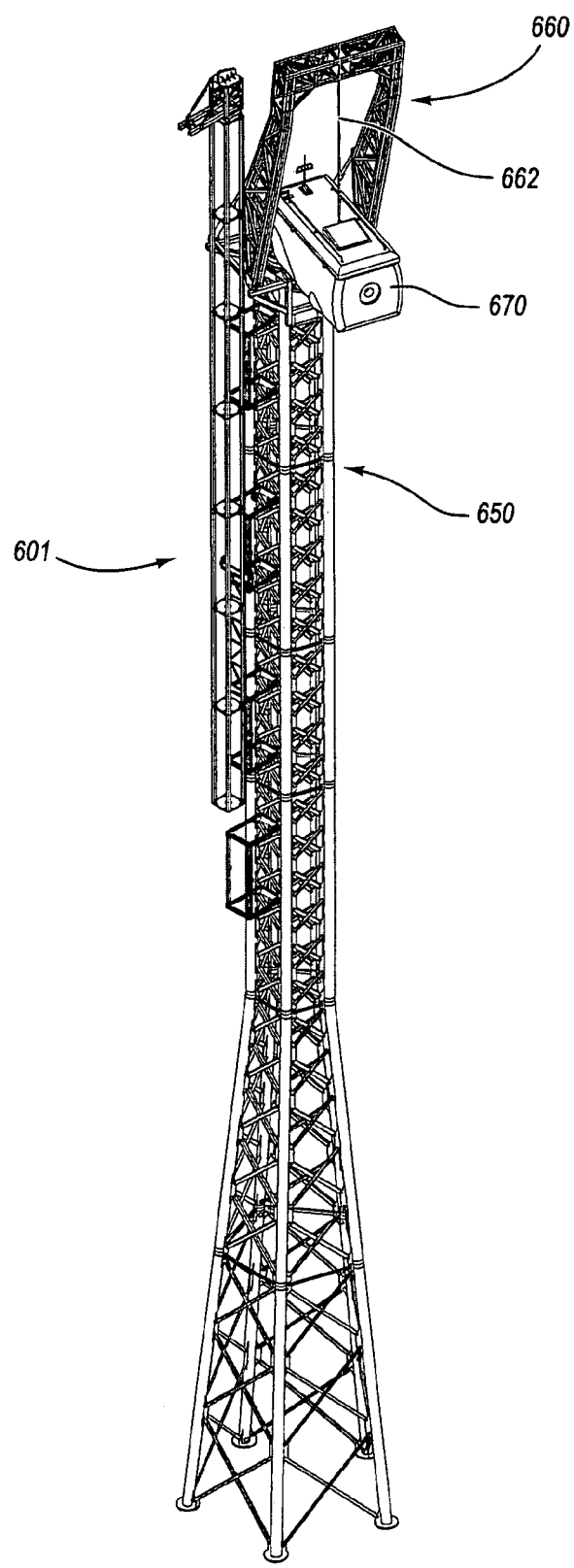
FIG. 43. illustrates the lifting frame depicted in FIG. 42 being used to position a wind turbine unto the structural tower.
Figure 44:
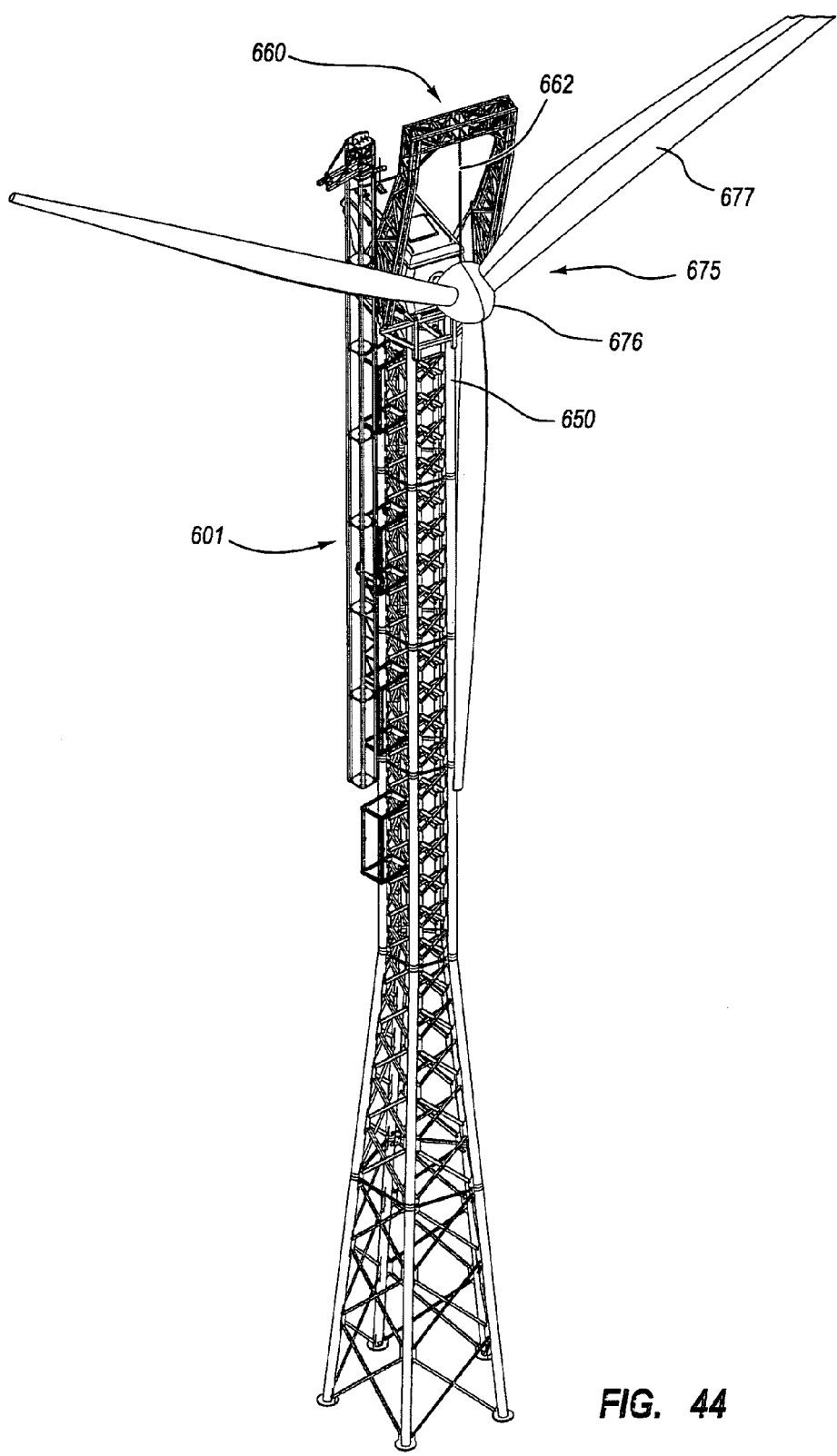
FIG. 44 illustrates the lifting frame depicted in FIG. 42 being used to position a blade assembly unto the wind turbine.
Figure 45:
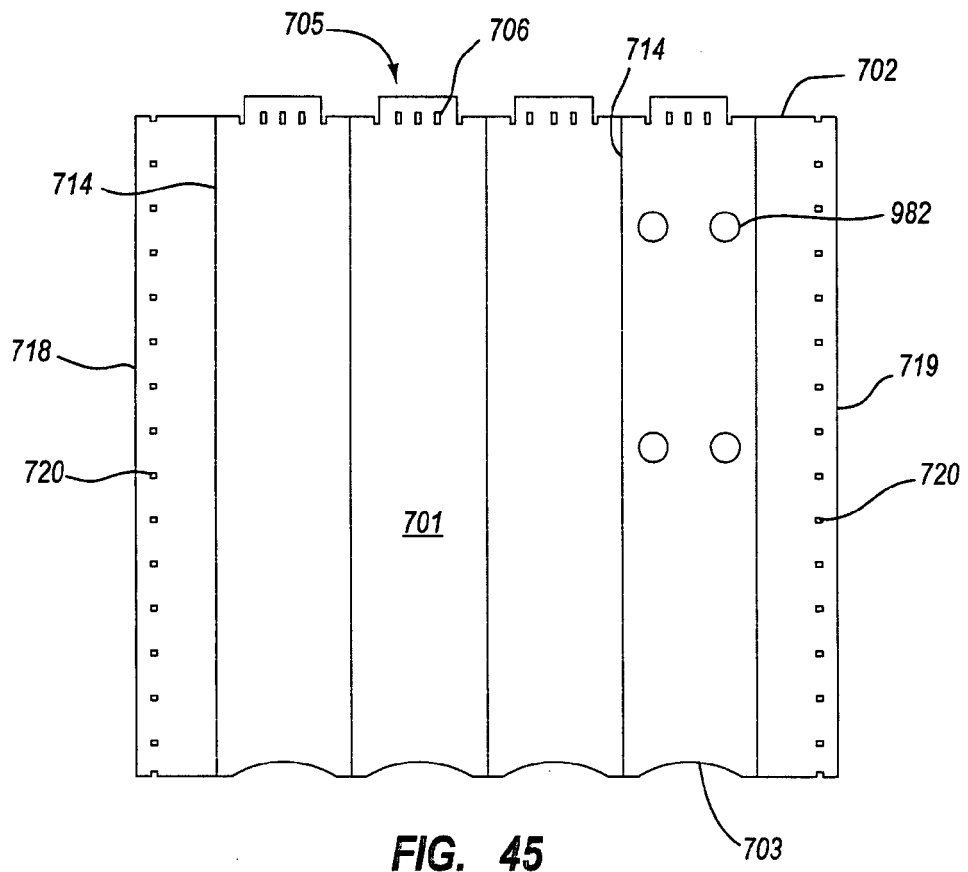
FIG. 45 illustrates a plan view of an illustrative cladding sheet sized to enclose one or more bay assemblies of a structural tower.

Referring now to FIGS. 43 and 44, the lifting apparatus 660 is illustrated as having a rigging assembly 662 for hoisting and positioning a turbine 670 or blade assembly 675 into place as variously disclosed above. More specifically, once the lifting apparatus 660 is positioned and secured into place atop the uppermost bay assembly 650, any remaining cabling necessary for the hoisting and positioning operations is installed. The lifting apparatus 660 is then used to hoist the turbine 670 into position atop the uppermost bay assembly 650 as disclosed above. Thereafter, the lifting apparatus 660 is used to hoist and position the blade assembly 675 or, alternatively, the rotor 676 followed by individual blades 677, into position on the turbine 670 also as disclosed above. During the hoisting and positioning operations, the ginpole 601 may be positioned away from the lifting apparatus (or completely removed from the tower) to avoid interfering with the lifting apparatus 660 or the turbine 670 or blade assembly 675. Alternatively the gin pole 601 can be positioned for use together with the lift apparatus 660 to lift or control the lift of the turbine 670 and/or blade assembly 675 or individual blades or other turbine components. Following positioning of the turbine 670 and blade assembly 675 into their respective proper positions, the ginpole 601 is repositioned as necessary to lower the lifting apparatus 660 and the support frame 652 after they has been detached from the uppermost bay assembly 650. Following detachment and lowering of the lifting apparatus 660 and support frame 652 from the tower 610, the ginpole 601 is lowered from the tower in the reverse order of being raised or a variation thereof.

Figure 46:
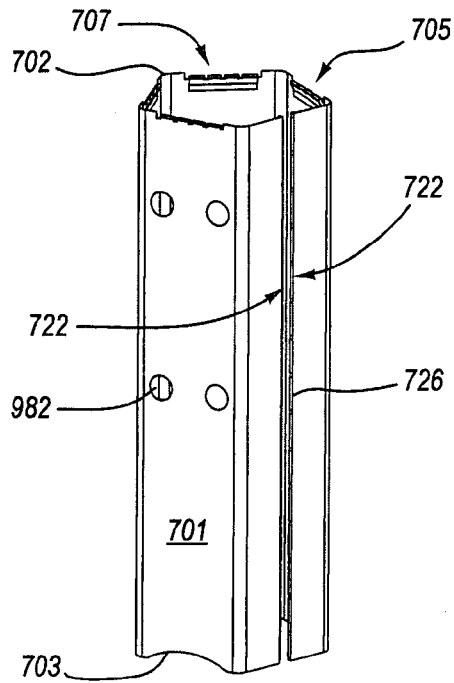
FIG. 46 illustrates a perspective view of the cladding sheet depicted in FIG. 45 configured for assembly about one or more bay assemblies of a structural tower.

In yet a further illustrative embodiment of the present disclosure, a cladding system and a method for constructing a high elevation wind turbine tower having a surrounding cladding system and for lifting a wind turbine assembly to the top of a high elevation wind turbine tower is disclosed. Referring to. FIGS. 45-48, an embodiment of a cladding system for the structural tower is described. Specifically, in one aspect of the present disclosure the cladding system comprises a cladding sheet 701 that is sized to cover substantially the outer surface of a bay assembly. In one illustrative embodiment, the cladding sheet 701 has an upper edge 702 and a lower edge 703. The upper edge 702 includes one or more tab segments 705 each having one or more edge perforations 706 extending through the cladding sheet 701. As illustrated in FIG. 46, the tab segments 705 are configured to fold inward over themselves thereby creating one or more openings 707 along the length of the tab segment 705 that correspond to the one or more edge perforations 706.

Figure 47:
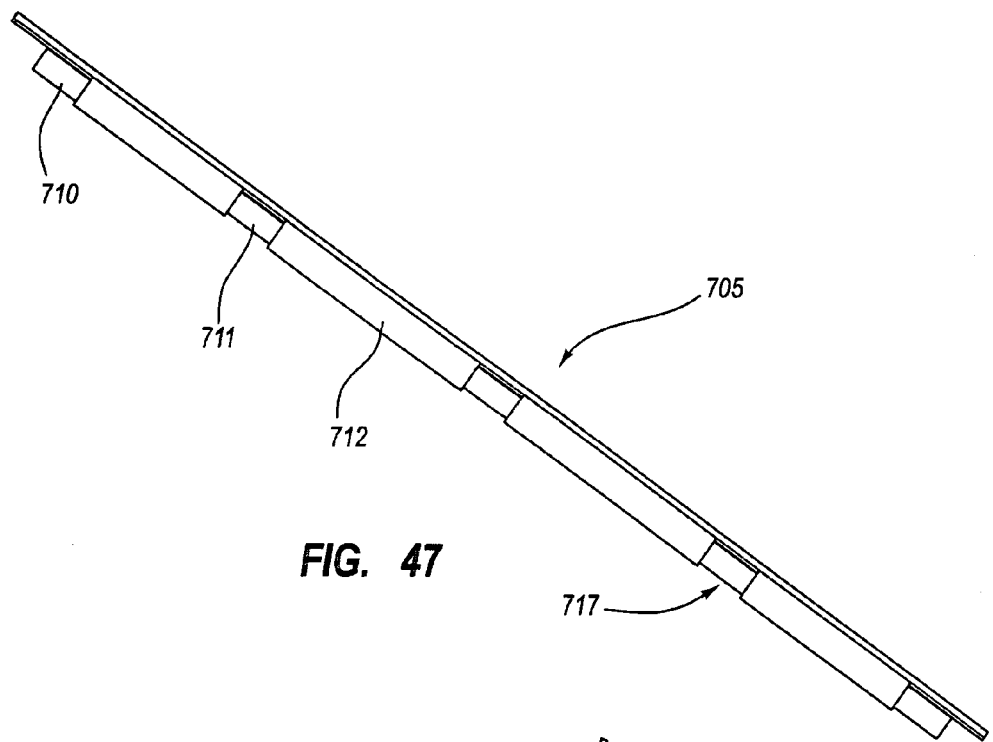
FIG. 47 illustrates a pipe or rod enclosed by a tab section having perforations of the cladding sheet depicted in FIG. 45.

Referring to FIG. 47, a pipe or rod 710, fabricated from a material such as steel or plastic, is positioned at the edge of the fold, creating one or more sections of exposed pipe or rod 711 that are contained by sleeve sections 712 that contain the rod or pipe 710. In this manner, when the cladding sheet 701 is wrapped about the bay assembly as described below, the pipe or rod 710 provides structural support for the cladding sheet 701 and a structure for attaching the cladding sheet 701 to one or more members comprising the bay assembly, such as one of the bay assemblies described herein. The exposed sections 711 of pipe or rod may, for example, be secured to a corresponding horizontal member of a bay assembly using bolts, screws or welds or simply tied to the horizontal member using rope or wire.

Still referring to FIGS. 45-48, the cladding sheet 701 has opposed left 718 and right 719 edge segments, each having a plurality of edge perforations 720 extending through the cladding sheet 701. Similar to the description above, the left 718 and right 719 edge segments are configured to fold inward over themselves thereby creating one or more openings 722 along the length of the edge segments that correspond to the one or more edge perforations 720. In a manner similar to that described above, a steel or plastic pipe or rod 725 is positioned at the edge of the fold (see FIG. 48), creating one or more sections of exposed pipe or rod that are enclosed by sleeve sections 726 that contain the rod or pipe 725. In this manner, when the cladding sheet 701 is wrapped about the bay assembly as described below, the pipe or rod 725 provides structural support for the cladding sheet 701 and structure for attaching the opposed left 718 and right 719 edge segments of the cladding sheet 701 to one another, thereby securing the cladding sheet tightly about the corresponding bay section or sections.

Figure 48:
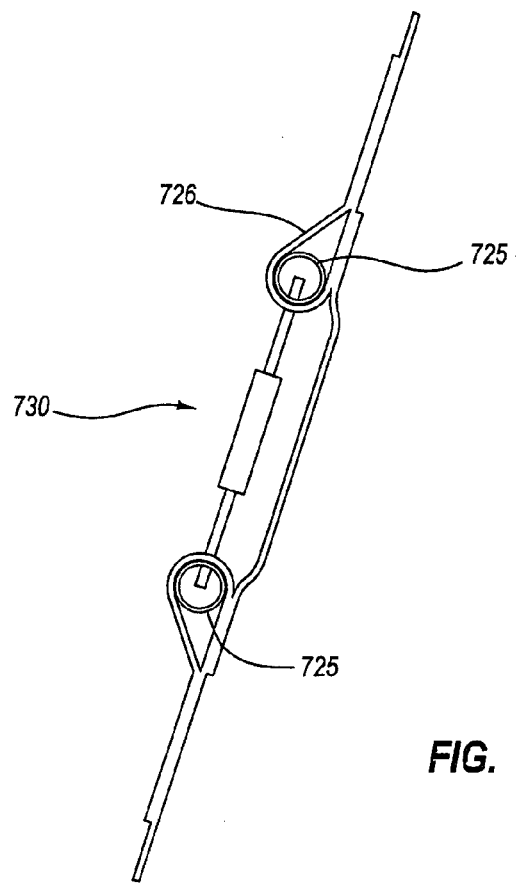
FIG. 48 illustrates an exemplar turnbuckle positioned to secure the side edges of the cladding sheet depicted in FIG. 45.

In one illustrative embodiment, the exposed sections of pipe or rod 725 are secured to corresponding exposed sections using a turnbuckle 730 as illustrated in FIG. 48. In one embodiment, a turnbuckle 730 is placed at each corresponding pair of openings 722 and is attached to the sections of pipe or rod 725 that are exposed by the corresponding pairs of openings 722.

Still referring to FIGS. 45-48, the cladding sheet 701 may have crease segments 714 that assist the folding of the cladding sheet to the desired shape of a particular bay assembly. As illustrated in FIG. 46, for example, the cladding sheet 701 is folded about or in the region of the crease segments 714 to form a five-sided covering for one or more five-sided bay sections of a structural tower.

The cladding sheet 701 may be preformed to slide over the top of an assembled bay assembly or, alternatively, wrapped around an assembled bay assembly. Using either approach, once the cladding sheet 701 is positioned on the bay assembly, the exposed sections 711 of pipe or rod that are fashioned at the tab segments 705 are fastened to the bay assembly using suitable means and the series of turnbuckles 730 are tightened to securely fasten the cladding sheet 701 to the bay assembly. Additionally the folds or crease areas can, within the scope of the present disclosure, contain a double layer of cladding where in contact or close proximity to the main bay leg. The main bay leg could also be wrapped, covered, or have a friction or wear reducing coating or sheet applied to it so that the cladding does not wear or reduce life beyond the life expectancy of the areas of the cladding that are not in close proximity to the bay leg structure. As will be shown below, when assembling the tower using the cladding sheets, the lower edge 703 may extend a distance (e.g., 6 to 12 inches) over the top edge 702 of an adjacent bay assembly covered by a cladding sheet 701.

The cladding sheet 701 may be constructed from a variety of materials, including various metals, steel, aluminum, PVC-coated fabrics and PTFE-coated glass fabrics. When factors such as weather and wind stresses are considered, a preferred choice for the sheet material is the PVC-coated fabric of 28 to 30 ounces per square yard exhibiting a tensile strength of approximately 250 pounds per linear inch. These materials work well with the cladding sheet above described and are readily applied to various other sheet configurations. Further, these materials are well suited for securing the fold-over regions at the tab segments 705 and left 718 and right 719 edge segments using, for example, RF welding, stitching or, in the case of aluminum or other metals, spot or TIG welding. The materials are also suitable for forming apertures such as the edge 706 or side 720 perforations in the cladding sheet.

Those skilled in the art will appreciate that cladding structures represented in FIGS. 45-56 provide a tower structure with an outer covering which functions to protect the internal area of the tower from wind, snow, rain and other undesirable materials but which does not provide any significant temperature control, since such temperature control is not generally required. Desirably, such cladding structures can provide for air venting of the internal area of the tower and can provide additional security for equipment located within the tower, for example near the base of the tower, and also desirably provides additional security for controlling access to the structures which may be present to allow humans and equipment to ascend and descend the tower.

Figure 49:
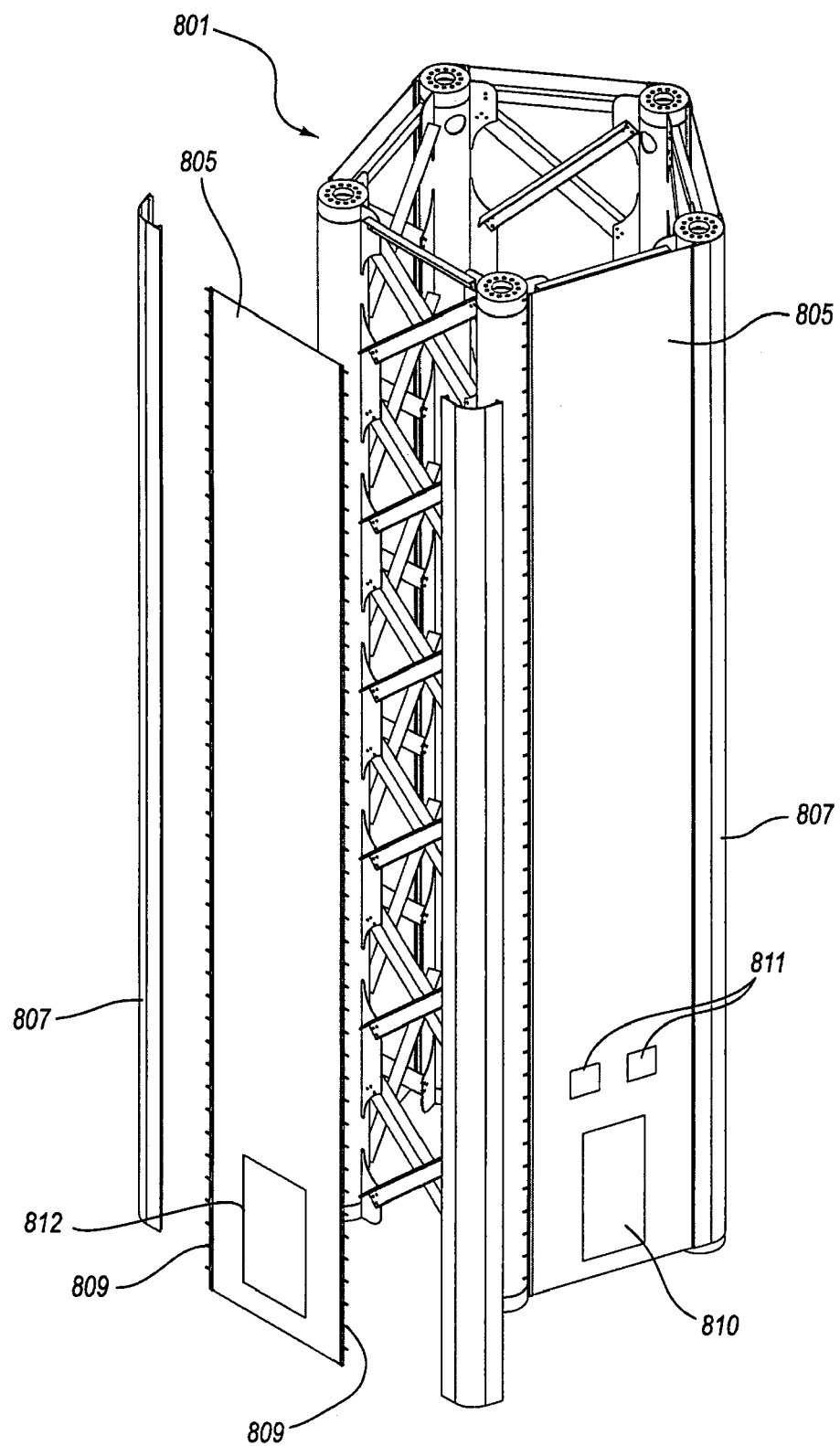
FIG. 49 illustrates an alternative illustrative embodiment of a cladding system sized to enclose one or more bay assemblies of a structural tower.

As represented in FIG. 49, a personnel access door 810 can be provided. Moreover as represented in FIG. 49, access ports 811 can be provided in the cladding material. Moreover, a equipment port 812 large enough for passage of a small forklift or maintenance vehicle can particularly be provided inside the tower base perimeter.

The cladding materials represented herein, also referred to as concealing materials, can desirably be architectural fabric, such as PVC or fiberglass material, sheet metal, organic fibers, or any number of materials know to those skilled in the art having the desirable characteristics. The concealing material can be continuous arranged around the perimeter of the tower structure or it can be segmented, all within the scope of the present disclosure. Moreover, the concealing material can be applied or attached to the outside of the structural tower members. In this fashion, the concealing material both conceals the visible spaces and also conceals the structural members of the tower from a position outside of the tower. The concealing material can also be applied or attached to the structural tower members so that the structural tower members are visible to a person standing outside of the tower but the visible spaces have been filled so that there are no visible spaces left.

While the embodiments disclosed above provides a suitable cover for each bay assembly (or plurality of assemblies), other embodiments provide equally suitable coverage. Referring to again FIG. 49, for example, a bay assembly 801 having a multi-faceted cladding system is shown. The multi-faceted cladding system comprises a plurality of cladding strips 805 and corner brackets 807. Each cladding strip 805 includes a plurality of bolts 809 that are embedded in or otherwise attached to the two sides of each cladding strip and whose threads extend outward from the two sides of each strip 809. The bolts are sized and spaced to extend through corresponding holes in each corner bracket 807. Assembly takes place in a manner similar to that described above. For example, the system of strips and corner brackets may be loosely assembled, with nuts partially threaded onto the bolts 809, and then slid over the top of the bay assembly 801, after which the nuts are tightened, thereby securing the cladding system to the bay assembly. Alternatively, all faces but one of the cladding system may be secured to the bay assembly, thereby leaving a face of the bay assembly open allowing interaction between a ginpole and the bay structure. Once the structural tower is assembled and the ginpole lowered and removed, the remaining strips may be assembled to each bay assembly and tightened as discussed above. Related alternatives include, of course, cladding systems sized to cover all faces but one, or any other number of faces—e.g., two or three—whereby the system includes various numbers of cladding sheets and corner brackets or rod or pipe and turnbuckle assemblies as described above.

Figure 50:
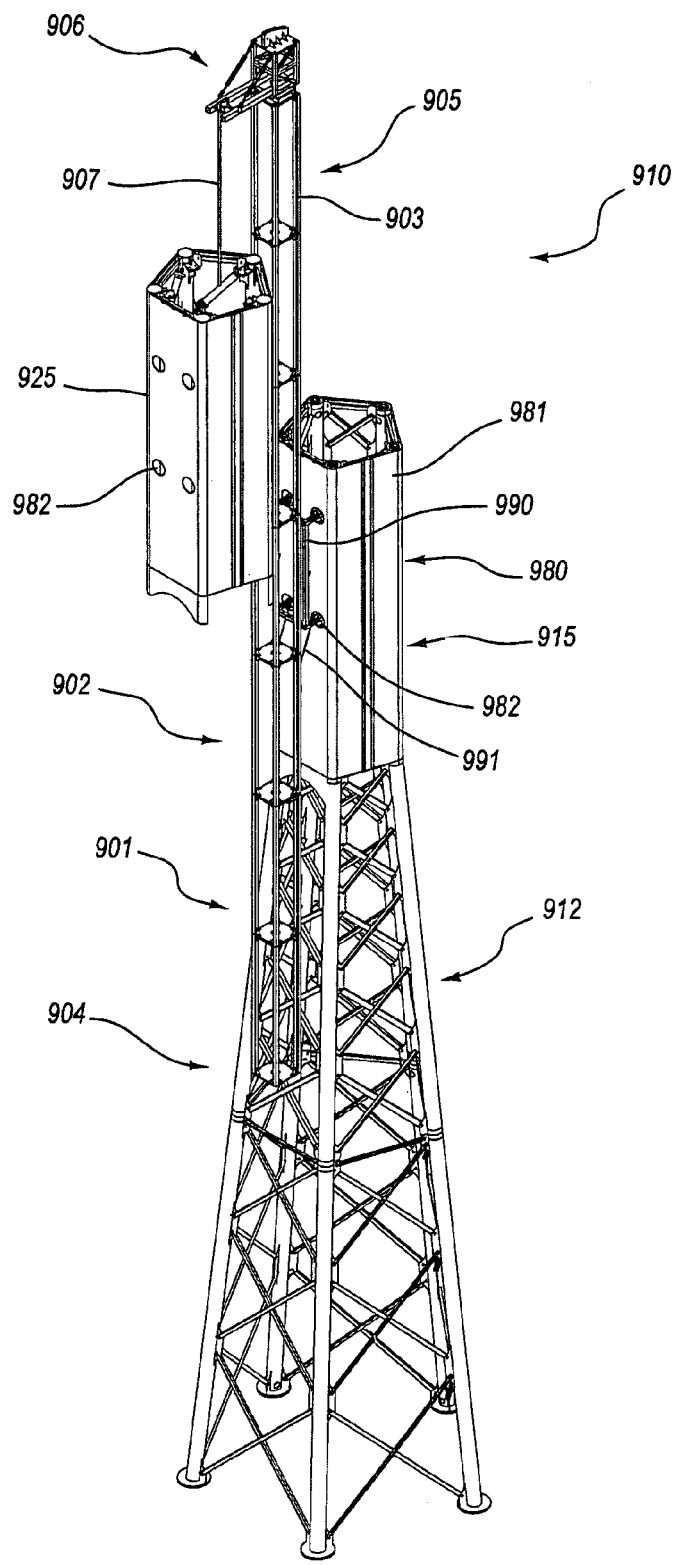
FIG. 50 illustrates an alternative illustrative embodiment of a ginpole being used to hoist a free bay assembly including cladding into position.

Referring now to FIGS. 50-56, a cladding system and a method for constructing a high elevation wind turbine tower having a surrounding cladding system and for lifting a wind turbine assembly to the top of a high elevation wind turbine tower is disclosed. In one illustrative embodiment, as illustrated in FIG. 50, one or more bay assemblies or bay sections are assembled and comprise a lower section 909 of a structural tower 910. The lower section 909 includes a lowermost bay assembly 913 secured to a foundation (not illustrated) and may include one or more intermediate bay assemblies 912 constructed on top of the lowermost bay assembly 913. An upper intermediate bay assembly 980 includes a cladding system 981. In one embodiment, the cladding system 981 surrounds the entire bay assembly in a manner described above and includes one or more apertures sized and positioned to permit interaction between the ginpole and the structural members of the bay assembly (described more fully below). The lower section 909 (which may be considered to comprise the lowermost bay assembly 913 and, if desired, one or more intermediate bay assemblies 912 and bay assemblies including cladding systems) is constructed using a crane of suitable size and height.

Referring still to FIG. 50, a ginpole 901 is next attached to a side of the partially constructed structural tower 910. In one illustrative embodiment, the ginpole 901 includes a lengthwise beam 902 comprising a plurality of members 903 secured together by a plurality of diagonal or horizontal members (not illustrated). The lengthwise beam 902 has a first end 904 and a second end 905 that extends upwardly from the first end 904. A rooster head 906 is rotatably secured to the second end 905 of the ginpole 901. A cable 907 extends from the rooster head 906 for raising or lowering free bay assemblies or the lifting apparatus of the present invention. The ginpole 901 is removably attached to the structural tower 910 using structures generally known in the art (although a specific illustrative embodiment is described below).

Referring again to FIGS. 50-56, a sequence of steps is illustrated for assembling the structural tower and assembling a wind turbine and blade assembly thereon using the ginpole 901. The sequence of steps is generally as described above, excepting the bay assemblies include cladding systems and structures—e.g., apertures or open faces—designed to permit interaction between the ginpole and the bay assemblies of the partially completed structural tower 910.

As described above, a lower portion 909 of the structural tower 910 is assembled and secured to a foundation using a crane or other suitable means. A gin pole 901 is then attached to the structural tower, typically using the same crane to hoist the ginpole into an initial location on the partially assembled structural tower 910. Once the ginpole is attached to the tower, the rooster head 906 is swiveled outward from the tower such that the cable 907 may be lowered and attached to a free bay assembly 925 positioned on the ground. The free end of the cable 907 is then lowered for attachment to the free bay assembly 925. Once attached to the free bay assembly 925, the cable 907 is used to hoist the free bay assembly 925 upward for mounting on the current uppermost bay assembly 915. When hoisted to an elevation sufficient to clear the current uppermost bay assembly 915, the rooster head 906 is rotated about the ginpole 901 such that the free bay assembly 925 is translated into axial alignment with the current uppermost bay assembly 915. Once in axial alignment, the free bay assembly 925 is lowered by the cable 907 into contact with the current uppermost bay assembly 915 and secured thereto using pins, bolts or welds as described, for example, in U.S. patent application Ser. No. 11/433,147.

Figure 51:
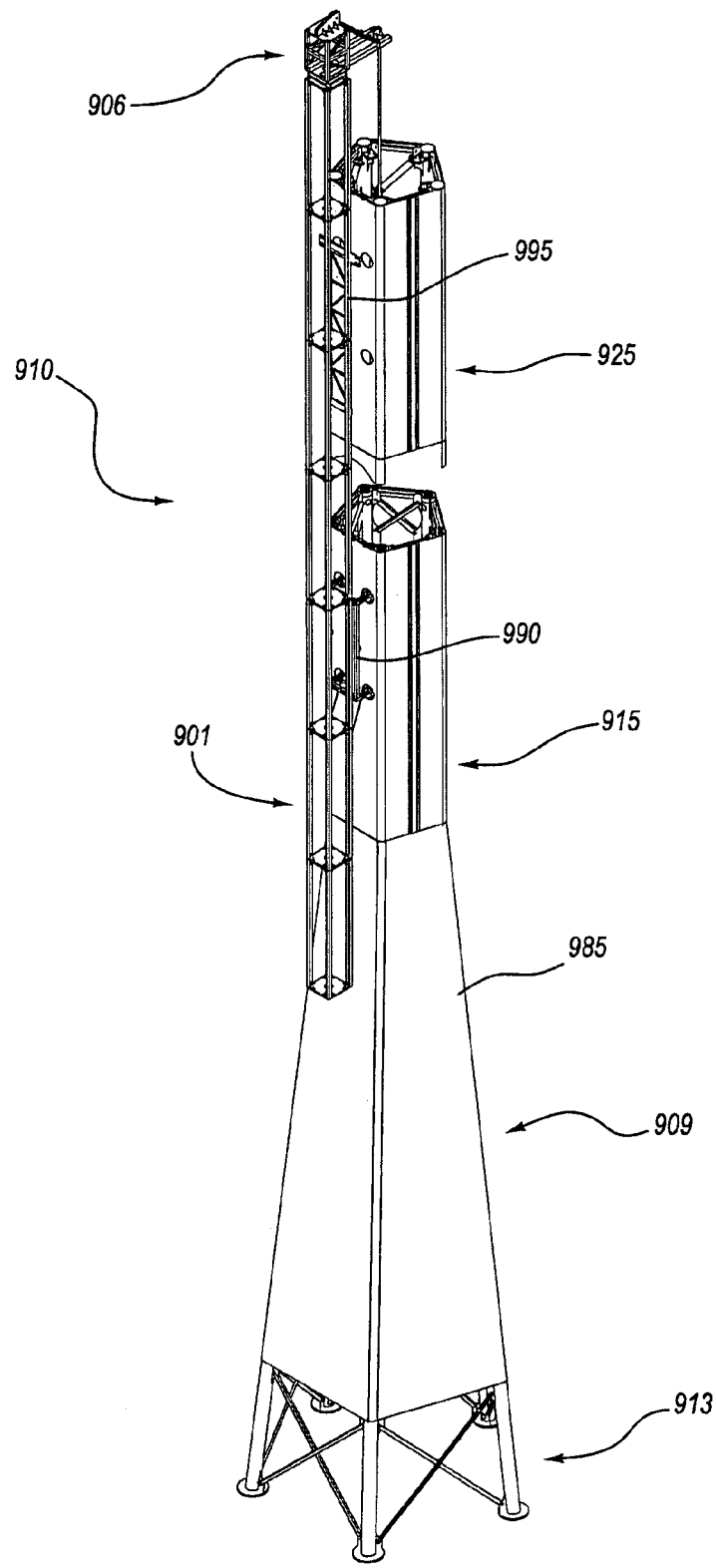
FIG. 51 illustrates the free bay assembly including cladding depicted in FIG. 50 being lowered upon an adjacent bay assembly.
Figure 52:
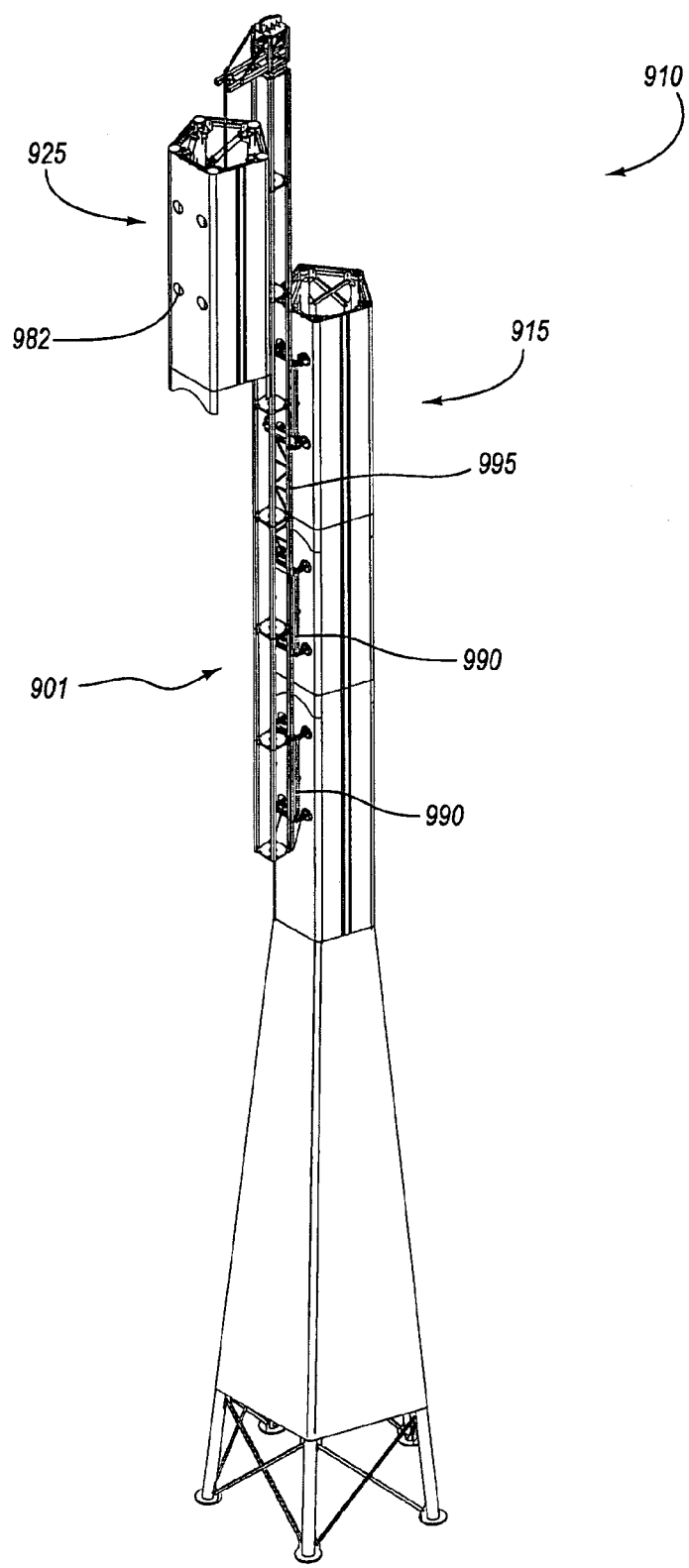
FIG. 52 illustrates a further free bay assembly including cladding being hoisted into position by the ginpole depicted in FIG. 50.

Following attachment of the free bay assembly 925 to the then-current uppermost bay assembly 915, the ginpole 901 may be elevated to a new location on the partially completed structural tower 910 and the process repeated as illustrated in FIGS. 50-52. If desired, a cladding system 985 for the lower section 909 may be assembled. In one embodiment, the cladding system for the lower section 909 includes an aluminum skin fastened to each face of the lower section 909.

Figure 53:
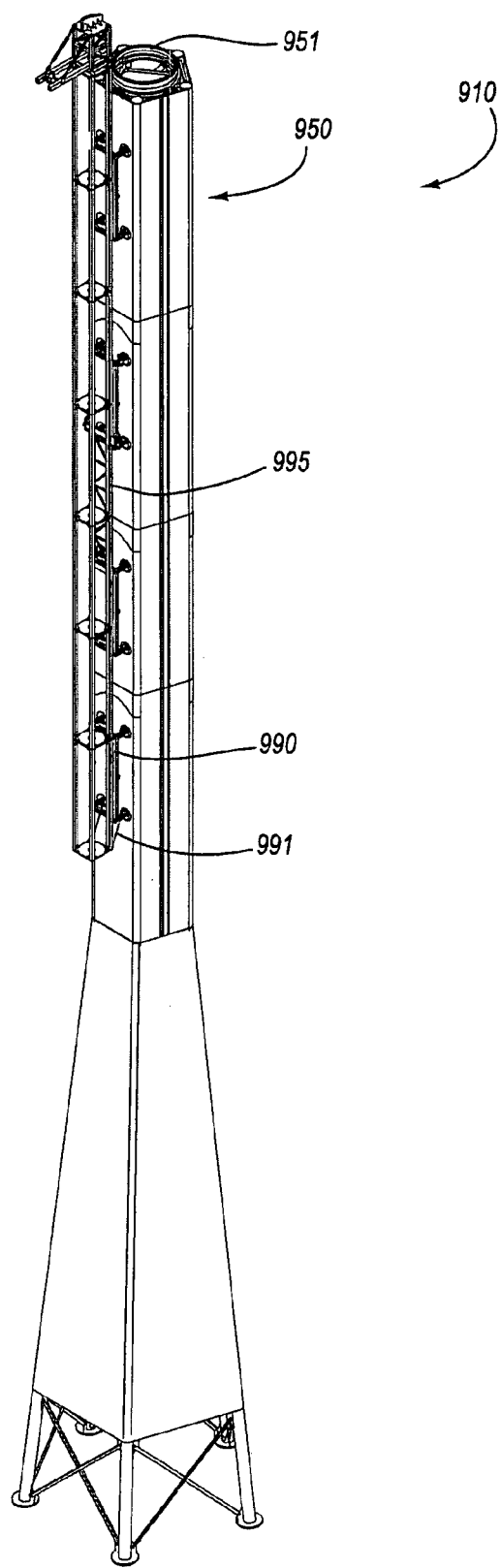
FIG. 53 illustrates an uppermost bay assembly including cladding secured to the structural tower after being positioned by the ginpole depicted in FIG. 50.

Referring now specifically to FIG. 53, an uppermost bay assembly 950 is illustrated having been elevated and secured to structural tower 910. As discussed previously, the uppermost bay assembly 950 may include or have attached thereto a ring member 951 upon which a turbine may be rotatably positioned.

Figure 54:
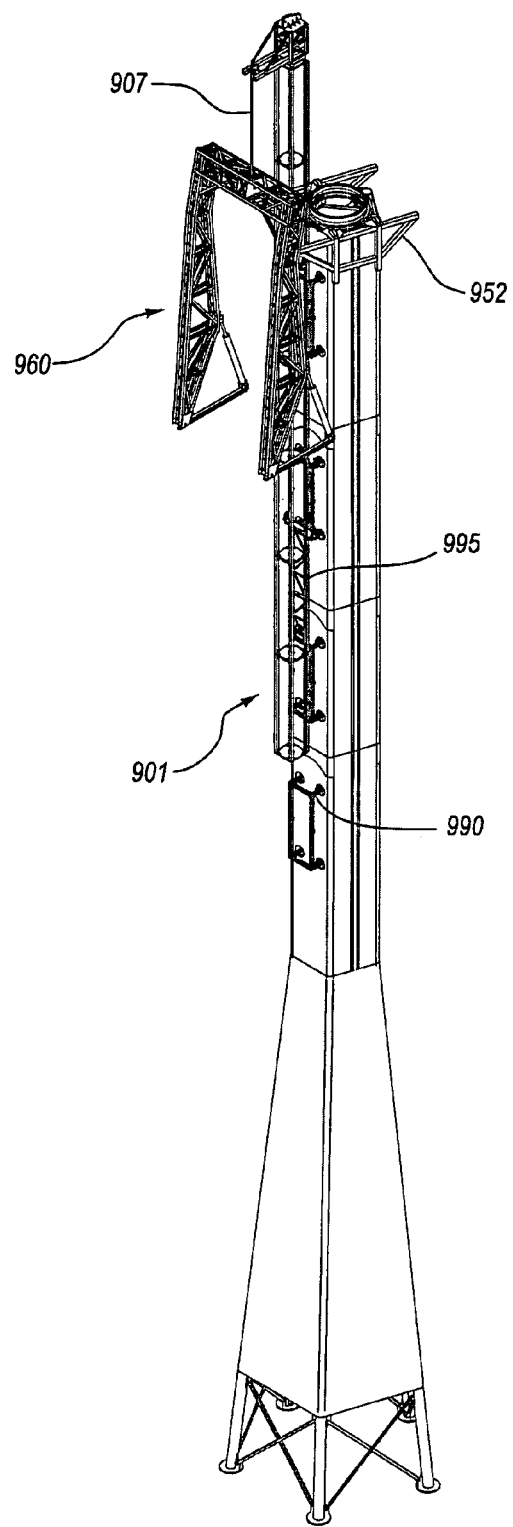
FIG. 54 illustrates an exemplary lifting frame being hoisted into position using the ginpole depicted in FIG. 50.

Referring now specifically to FIG. 54, the ginpole 901 is again raised following placement of the uppermost bay assembly 950. The rooster head 906 is then repositioned for hoisting of a lifting apparatus 960. The lifting apparatus 960 is then hoisted to the top of the structural tower 910 using the cable 907 where it may be lowered by the cable 907 into contact with the uppermost bay assembly 950 and secured thereto as described in one or more of the various embodiments above disclosed. In the embodiment illustrated in FIG. 54, the lifting frame 960 is lowered upon and secured to a support frame 952 that is itself secured to the uppermost bay assembly 950.

Figure 55:
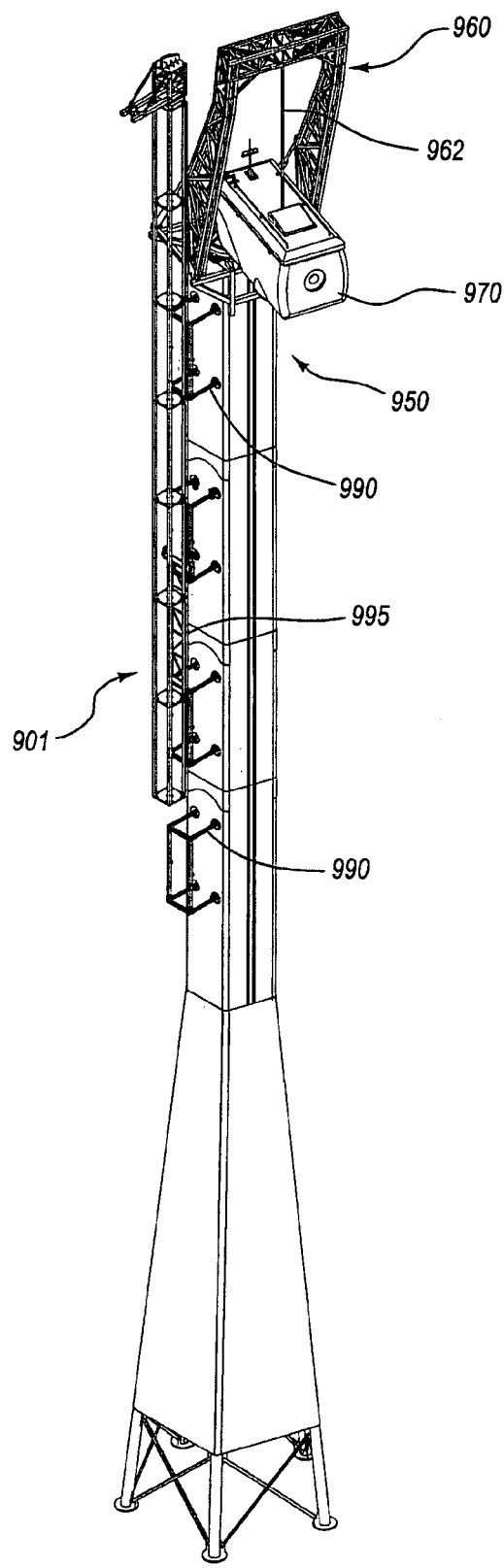
FIG. 55 illustrates the lifting frame depicted in FIG. 54 being used to position a wind turbine unto the structural tower.
Figure 56:
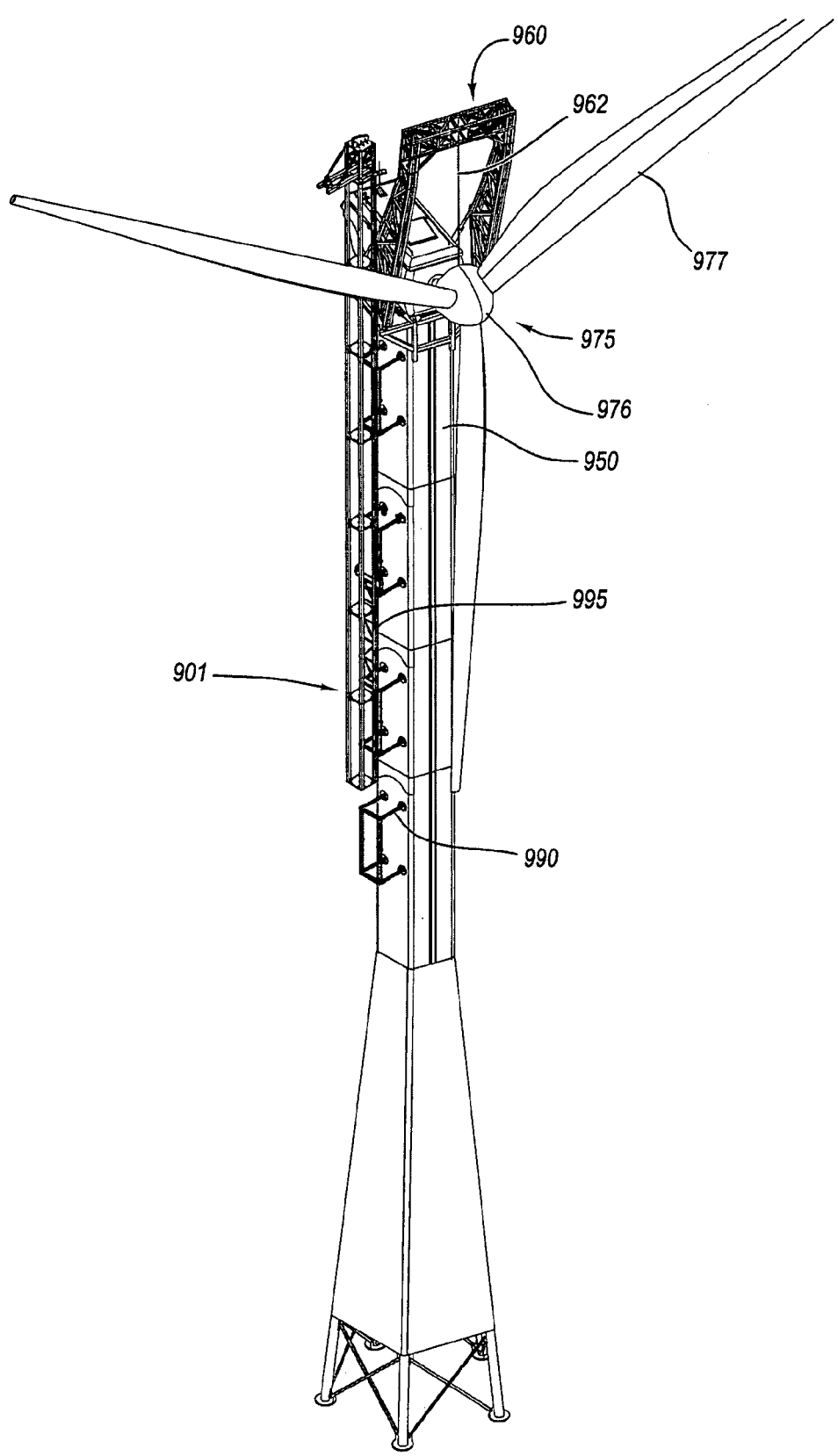
FIG. 56 illustrates the lifting frame depicted in FIG. 54 being used to position a blade assembly unto the wind turbine.

Referring now to FIGS. 55 and 56, the lifting apparatus 960 is illustrated as having a rigging assembly 962 for hoisting and positioning a turbine 970 or blade assembly 975 into place as variously disclosed above. More specifically, once the lifting apparatus 960 is positioned and secured into place atop the uppermost bay assembly 950, any remaining cabling necessary for the hoisting and positioning operations is installed. The lifting apparatus 960 is then used to hoist the turbine 970 into position atop the uppermost bay assembly 950 as disclosed above. Thereafter, the lifting apparatus 960 is used to hoist and position the blade assembly 975 or, alternatively, the rotor 976 followed by individual blades 977, into position on the turbine 970 also as disclosed above. During the hoisting and positioning operations, the ginpole 901 may be positioned away from the lifting apparatus (or completely removed from the tower) to avoid interfering with the lifting apparatus 960 or the turbine 970 or blade assembly 975. Following positioning of the turbine 970 and blade assembly 975 into their respective proper positions, the ginpole 901 is repositioned as necessary to lower the lifting apparatus 960 and the support frame 952 after they has been detached from the uppermost bay assembly 950. Following detachment and lowering of the lifting apparatus 960 and support frame 952 from the tower 910, the ginpole 901 is lowered from the tower in the reverse order of being raised or a variation thereof.

Figures 57, 58:
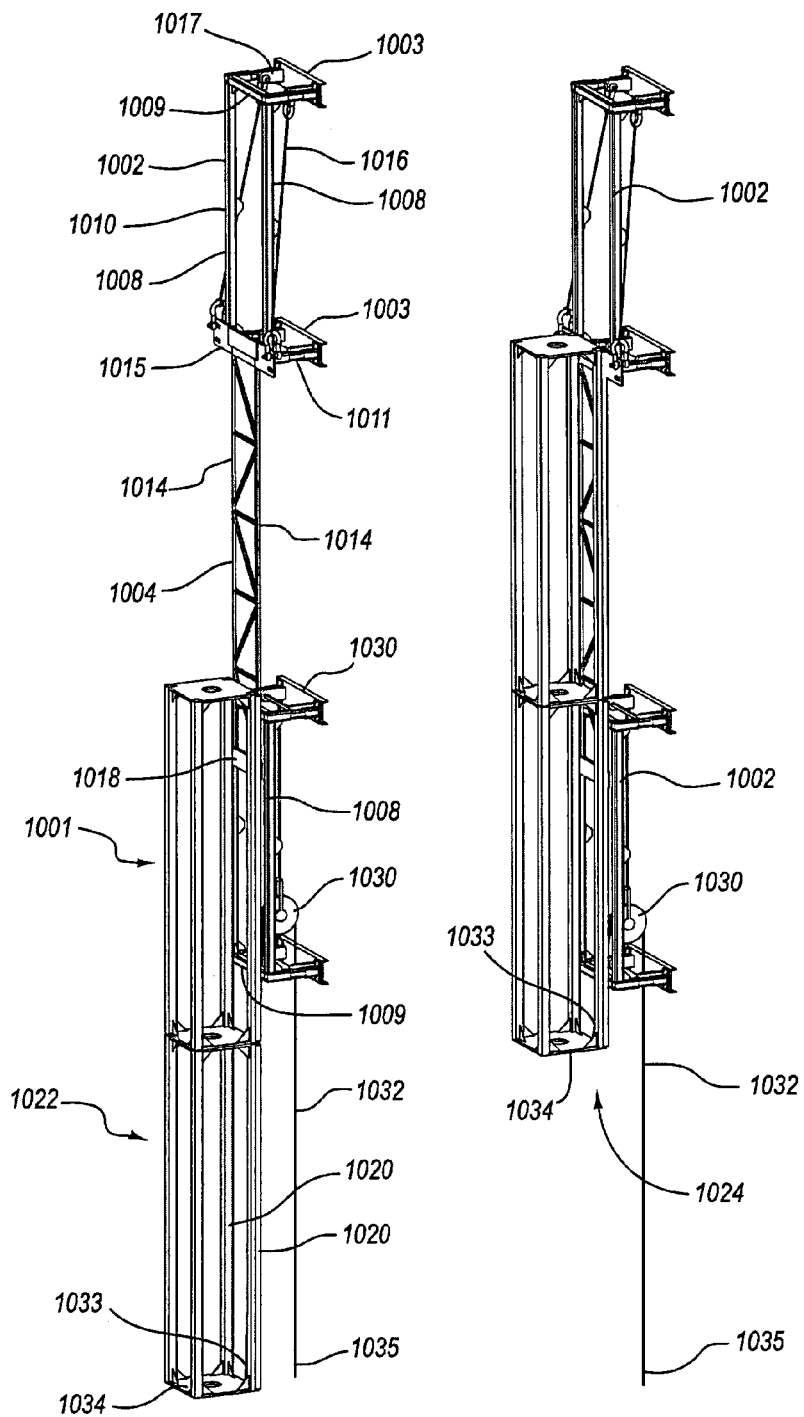
FIG. 57 illustrates an exemplary jump track assembly for use with an exemplary ginpole of the present invention showing the ginpole in a lower position.
FIG. 58 illustrates a jump track assembly for use with a ginpole of the present invention showing the ginpole in a raised position.

While various techniques for raising gin poles are known in the art, one illustrative embodiment advantageous for use with the present disclosure employs one or more standoff brackets and a jump track. Referring to FIGS. 57 and 58, for example, a ginpole 1001 may be slidably attached to a structural tower using one or more standoff brackets 1002 and a jump track 1004 that slidably connects the ginpole 1001 with the standoff brackets 1002. More specifically, each standoff bracket 1002 includes a pair of mounting brackets 1003. The mounting brackets 1003 are configured for mounting to one or more members of a bay assembly—e.g., an adjacent pair of horizontal members 1006 and 1007 as illustrated in FIGS. 57 and 58.

The mounting brackets 1003 may be mounted to the horizontal members using tabs welded to the members and bolts securing the brackets to the tabs or some similarly suitable means of mounting. Pairs of lengthwise members 1008 and transverse members 1009, forming a square or rectangular box-shaped frame 1010, are adjustably attached to the mounting brackets 1003 using telescoping members 1011 positioned at the corners of the box-shaped frame 1010. The telescoping members 1011 permit adjustment of the standoff distance between the box-shaped frame 1010 and the bay assembly.

Removably attached to a pair of assembled standoff brackets 1002 mounted to one or more bay sections of a structural tower is the jump track 1004. The jump track 1004 includes a pair of longitudinal rails that are separated by diagonal members. A plate member 1015 is secured by welding or other suitable means to the upper end of the jump track 1004. The plate member 1015 includes apertures on opposing sides for attachment for attachment to a pair of slings 1016. In one embodiment, the slings 1016 are secured by clevis pins attached at one end of the slings with the pins extending through a pair of corresponding tab members 1017 welded to the mounting brackets 1003. A similar pair of clevis pins is used to attach the plate member 1015 to the opposite end of the slings 1016. A second plate member 1018 is similarly secured by welding or other suitable means to the lower end of the jump track 1004.

Both the upper 1015 and lower 1018 plate members may be bolted or otherwise secured to the box-shaped frames of the standoff brackets 1002 such that the jump track is removably attached in fixed relation to the structural tower. Further the telescoping members can be configured so the telescoping or moving parts are outside of the cladding and at a distance such that the telescoping part, stand off bracket, and operator interface does not cause contact with the cladding. The tab members 1017 are located such that the mounting bracket 1003 is located on the inside of the cladding with no contact to the cladding, and the tab 1017 extends through the opening on the cladding beyond the plane of the cladding to a distance to prevent contact between the cladding and the sling 1016.

Referring still to FIGS. 57-58, the ginpole 1001 is illustrated as being slidably attached to the rails 1014 of the jump track 1004. In one illustrative embodiment, slidable attachment of the ginpole 1001 to the rails 1014 is achieved using a pair of tabs running lengthwise on each one of the pair of inner facing longitudinal members 1020 of the ginpole 1004 that form a male receiving track sized to receive the corresponding rails 1014 of the jump track 1004. In this fashion, the ginpole 1001 is constrained to slide only up or down the length of the jump track 1004.

Referring to FIG. 57, the ginpole is illustrated in a first—unraised—position 1022 on the jump track 1004. In one illustrative embodiment, the ginpole 1001 is secured in the first position 1022 using a pair of support slings (not explicitly illustrated) that have first ends secured to a standoff bracket 1002 and second ends secured to the ginpole 1001. Hoisting the ginpole 1001 to a second—raised—position 1024 (see FIG. 58) is accomplished using a block and tackle or similar rigging assembly. In one embodiment, a rigging assembly includes a pulley 1030 removably secured to a standoff bracket 1002. A cable 1032 has a first end 1033 secured to a base portion 1034 of the ginpole 1001 and a second end 1035 extending to a winch (not explicitly illustrated) or other suitable cable winding structure.

When it is desired to raise the ginpole 1001 from the first 1022 to second 1024 position, the pair of support slings are released and the cable 1032 is pulled to hoist the ginpole 1001 to the second position 1024. The support slings are then reattached, at which point the ginpole 1001 is positioned to perform the next lifting operation of a free bay assembly or lifting frame.

Referring again to FIGS. 50-56, the ginpole 901 is illustrated secured to a standoff bracket 990. Support slings 991 are used maintain the ginpole 901 in a fixed position with respect to the standoff bracket 990. The apertures 982 extending through the cladding permit the standoff bracket 990 to be attached to the bay assembly as described above without removing the cladding. As the stages of assembly are completed, additional standoff brackets 990 are added and the jump track 995 is used to hoist the ginpole 901 as required. Once the wind turbine 970 and blade assembly 975 are finally positioned on the structural tower 910, the lifting frame is lowered 960 is lowered using the ginpole.

Still referring to FIGS. 50-56, following lowering of the lifting frame 960, the ginpole is lowered in reverse order of raising using the jump track 995 and the hoisting cable discussed above with respect to FIGS. 57-58. As the ginpole 901 is lowered, each standoff bracket 990 may be removed from its mounting position and lowered to the ground using the ginpole 901 or a separate cable. The apertures through the cladding may then be sealed using a suitable sized porthole cover of similar covering means.

In the foregoing Detailed Description, various features of the present disclosure are grouped together in single illustrative embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of erecting a high-elevation multiple-bay structural tower and associated wind turbine equipment on a foundation, the method comprising the steps of:
   securing a base bay assembly to the foundation;
   wherein said base bay comprises a plurality of legs and where cross-members interconnect the legs to form said base bay;
   attaching a ginpole to the base bay assembly;
   positioning an intermediate bay assembly on top of the base bay assembly using the ginpole;
   wherein said intermediate bay assembly comprises a plurality of legs having cross-members inter-connecting the legs to form said intermediate bay assembly;
   positioning a top bay assembly on top of the intermediate bay assembly using the ginpole;
   wherein said top bay assembly comprises a plurality of legs having cross-members interconnecting the legs to form said intermediate bay assembly;
   positioning an apparatus for lifting a wind turbine proximate the top bay assembly using the ginpole;
   wherein said apparatus for lifting is configured to be located at a single position on the tower during the duration of its use; and
   positioning a wind turbine on top of the top bay assembly using the apparatus for lifting a wind turbine.

2. The method of claim 1, further comprising the step of attaching the ginpole to the intermediate bay assembly prior to positioning the top bay assembly on top of the intermediate bay assembly.

3. The method of claim 1, further comprising the step of attaching the ginpole to both the base bay assembly and the intermediate bay assembly prior to positioning the top bay assembly on top of the intermediate bay assembly.

4. The method of claim 1, further comprising the steps of sequentially positioning a plurality of intermediate bay assemblies on top of the base bay assembly prior to positioning the top bay assembly on top of an uppermost intermediate bay assembly.

5. The method of claim 4, further comprising the step of raising the ginpole following the positioning of each intermediate bay assembly comprising the plurality of bay assemblies.

6. The method of claim 1, wherein the base bay assembly comprises a plurality of bay assemblies.

7. The method of claim 6, wherein the step of attaching the ginpole to the base bay assembly includes the steps of attaching the ginpole to one or more of the bay assemblies comprising the plurality of bay assemblies.

8. The method of claim 1, wherein the ginpole comprises a lengthwise beam.

9. The method of claim 8, wherein the ginpole further comprises a boom.

10. The method of claim 9, wherein the boom is pivotally attached to the lengthwise beam.

11. The method of claim 1, wherein the apparatus for lifting a wind turbine includes: a support frame connected to the top bay assembly of the tower; a first lifting truss pivotally connected to the support frame, the first lifting truss having a distal end extending away from the support frame; a rigging assembly connected proximate the distal end and configured for hoisting a turbine to the upper end of the tower; and an hydraulic ram having a first end connected to the support frame and a second end connected to the first lifting truss.

12. A method according to claim 1, further comprising pivotally coupling the apparatus for lifting to the top bay assembly.

13. A method of according to claim 12, wherein the apparatus for lifting is pivotally coupled to the top bay assembly through at least one of a pivot shaft, a beam member, a bearing assembly and a support frame.

14. A method according to claim 1, wherein the apparatus for lifting comprises a first lifting truss and a second lifting truss, the first and second lifting trusses configured to be pivotally coupled to the top bay assembly.

15. A method according to claim 14, wherein at least one of the first and second lifting trusses includes a plurality of structural members forming a triangular structure.

16. A method according to claim 14, further comprising at least one beam extending between the first and second lifting trusses.

17. A method according to claim 16, further comprising a rigging assembly attached to the at least one beam, the rigging assembly being configured to provide a mechanical advantage when lifting the wind turbine.

18. A method according to claim 14, further comprising an actuatable cylinder attached to at least one of the first truss and the second truss, the actuatable cylinder being configured to control the pivotal movement of the at least one of the first and second trusses.

19. A method according to claim 14, wherein at least one of the first and second lifting trusses includes a telescoping member.

20. A method according to claim 19, further comprising an actuatable cylinder attached to the telescoping member, the actuatable cylinder being configured to control the pivotal movement of the at least one of the first and second trusses.

21. A method of erecting a multiple-bay structural tower and associated wind turbine equipment, the method comprising the steps of:
   assembling a base bay assembly; assembling one or more upper bay assemblies on top of the base bay assembly wherein said base bay assembly and upper bay assemblies comprises a plurality of legs and where cross-members interconnect the legs to form said base bay;
   attaching a ginpole to one or more of the base bay assemblies and the one or more upper bay assemblies;
   positioning an apparatus for lifting a wind turbine proximate an uppermost bay assembly using the ginpole;
   wherein said apparatus for lifting is configured to be located at a single location on the tower during the duration of its use; and
   positioning a wind turbine on top of the uppermost bay assembly using the apparatus for lifting a wind turbine.

22. The method of claim 21, further comprising the step of attaching the ginpole to at least one of the upper bay assemblies prior to assembling the uppermost bay assembly.

23. The method of claim 21, further comprising the step of attaching the ginpole to both the base bay assembly and to at least one of the upper bay assemblies prior to assembling the uppermost bay assembly.

24. The method of claim 21, further comprising the steps of sequentially assembling the one or more upper bay assemblies on top of the base bay assembly prior to assembling the uppermost bay assembly.

25. The method of claim 24, further comprising the step of raising the ginpole following the assembly of each upper bay assembly comprising the one or more upper bay assemblies.

26. The method of claim 21, wherein the base bay assembly comprises a plurality of bay assemblies.

27. The method of claim 26, wherein the step of attaching the ginpole to the base bay assembly includes the steps of attaching the ginpole to one or more of the bay assemblies comprising the plurality of bay assemblies.

28. The method of claim 21, wherein the ginpole comprises a lengthwise beam.

29. The method of claim 21, wherein the apparatus for lifting a wind turbine includes: a support frame connected to the top bay assembly of the tower; a first lifting truss pivotally connected to the support frame, the first lifting truss having a distal end extending away from the support frame; a rigging assembly connected proximate the distal end and configured for hoisting a turbine to the upper end of the tower; and an hydraulic ram having a first end connected to the support frame and a second end connected to the first lifting truss.

30. The method of claim 21, wherein the one or more upper bay assemblies include a cladding system.

31. The method of claim 30, wherein the cladding system includes an aperture sized and configured to permit access to the members comprising the bay assembly.

32. The method of claim 31, wherein the cladding system includes a plurality of apertures.

33. The method of claim 31, wherein the aperture is a strip running lengthwise along the cladding system.

34. The method of claim 31, further comprising the step of attaching the ginpole to at least one of the upper bay assemblies prior to assembling the uppermost bay assembly and wherein the ginpole includes a standoff bracket extending through the aperture.

35. A system for erecting a high-elevation multiple-bay structural tower and associated wind turbine equipment on a foundation, the system comprising:
 a base bay assembly securable to the foundation;
 wherein said base bay comprises a plurality of legs and wherein cross-members interconnect the legs to form said base bay;
 a ginpole attached to at least two of the legs of the base bay assembly;
 at least one intermediate bay assembly positioned on top of the base bay assembly;
 wherein said intermediate bay assembly comprises a plurality of legs having cross-members inter-connecting the legs to form said intermediate assembly;
 the intermediate bay assembly being releasably securable to the ginpole at a plurality of points;
 a top bay assembly securable to the top of the intermediate bay assembly;
 wherein said top bay assembly comprises a plurality of legs having cross-members inter-connecting the legs to form said intermediate bay assembly;
 the top bay assembly being releasably securable to the ginpole at a plurality of points;
 a lifting means for a wind turbine placed proximate the top bay assembly using the ginpole;
 wherein said lifting means is configured to be located at a single location on the tower during the duration of its use; and
 a means for positioning a wind turbine on top of the top bay assembly using the lifting means for a wind turbine.

36. The system of claim 35, wherein the ginpole is releasably secured to the top bay assembly on top of the intermediate bay assembly.

37. The system of claim 35, wherein the ginpole is selectively attached to the base bay assembly and the intermediate bay assembly prior to positioning the top bay assembly on top of the intermediate bay assembly.

38. The system of claim 35, further comprising means for sequentially positioning a plurality of intermediate bay assemblies on top of the base bay assembly prior to positioning the top bay assembly on top of an uppermost intermediate bay assembly.

39. The system of claim 38, further comprising means for raising the ginpole following the positioning of each intermediate bay assembly comprising the plurality of bay assemblies.

40. The system of claim 35, wherein the base bay assembly comprises a plurality of bay assemblies.

41. The system of claim 40, further comprising means for attaching the ginpole to one or more of the structures selected from the group consisting of: the base bay assembly; the intermediate bay assembly; and, the top bay assembly.

42. The system of claim 35, wherein the ginpole comprises a lengthwise beam.

43. The system of claim 42, wherein the ginpole further comprises a boom.

44. The system of claim 42, wherein the boom is pivotally attached to the lengthwise beam.

45. The system of claim 35, wherein the means for lifting a wind turbine includes: a support frame connected to the top bay assembly of the structural tower; a first lifting truss pivotally connected to the support frame, the first lifting truss having a distal end extending away from the support frame; a rigging assembly connected proximate the distal end and configured for hoisting a turbine to the upper end of the tower; and an hydraulic ram having a first end connected to the support frame and a second end connected to the first lifting truss.

46. An apparatus for erecting a high-elevation multiple-bay structural tower and associated wind turbine equipment on a foundation, the apparatus comprising:
 means for securing a base bay assembly to the foundation wherein said base bay assembly comprises a plurality of legs and wherein cross-members interconnect the legs to form said base bay assembly;
 means for securing an intermediate bay assembly on top of the base bay assembly wherein said intermediate bay assembly comprises a plurality of legs and wherein cross-members interconnect the legs to form said intermediate bay assembly; means for securing a top bay assembly on top of the intermediate bay assembly;
 means for securing a top bay assembly on top of the intermediate bay assembly wherein said top bay assembly comprises a plurality of legs and wherein cross-members interconnect the legs to form said top bay assembly;
 means for lifting a wind turbine from a level approximately adjacent to the foundation to a level above the uppermost level of the top bay assembly, the means for lifting being configured for attaching to a plurality of legs and being pivotally connected to a plurality of legs in the top bay assembly such that the means for lifting having a first position wherein the turbine equipment can be raised along the exterior side of the structural tower and a second position to a location substantially above the uppermost level of the top bay assembly such that the wind turbine can be operationally secured on top of the top bay assembly; and wherein said means for lifting is configured to be located at a single location on the tower during the duration of its use.

47. An apparatus according to claim 46 wherein the means for lifting comprises: a support frame connected to the top bay assembly of the tower; a first lifting truss pivotally connected to the support frame, the first lifting truss having a distal end extending away from the support frame; a rigging assembly connected proximate the distal end and configured for hoisting a turbine to the upper end of the tower; and an hydraulic ram having a first end connected to the support frame and a second end connected to the first lifting truss.

48. An apparatus according to claim 46 wherein the means for lifting comprises a rigging assembly and a pivot control cable.

49. An apparatus according to claim 46 further comprising hoisting means for raising the means for lifting to the top bay assembly.

* * * * *